(12) United States Patent
Islam et al.

(10) Patent No.: US 10,615,862 B2
(45) Date of Patent: Apr. 7, 2020

(54) SYSTEM AND METHOD FOR BEAM ADJUSTMENT REQUEST

(71) Applicant: QUALCOMM Incorporated, San Diego, CA (US)

(72) Inventors: Muhammad Nazmul Islam, Edison, NJ (US); Tao Luo, San Diego, CA (US); Juergen Cezanne, Ocean Township, NJ (US); Sundar Subramanian, Bridgewater, NJ (US); Ashwin Sampath, Skillman, NJ (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/867,603

(22) Filed: Jan. 10, 2018

(65) Prior Publication Data

US 2018/0138962 A1 May 17, 2018

Related U.S. Application Data

(63) Continuation-in-part of application No. 15/335,353, filed on Oct. 26, 2016.
(Continued)

(51) Int. Cl.
*H04W 72/04* (2009.01)
*H04B 7/06* (2006.01)
(Continued)

(52) U.S. Cl.
CPC ......... *H04B 7/0695* (2013.01); *H04B 7/0408* (2013.01); *H04B 7/0421* (2013.01);
(Continued)

(58) Field of Classification Search
None
See application file for complete search history.

(56) References Cited

U.S. PATENT DOCUMENTS

| 5,724,048 A | 3/1998 | Remondiere et al. |
| 6,208,858 B1 | 3/2001 | Antonio et al. |

(Continued)

FOREIGN PATENT DOCUMENTS

| AU | 2014230299 A1 | 9/2015 |
| EP | 3122094 A1 | 1/2017 |

(Continued)

OTHER PUBLICATIONS

International Search Report and Written Opinion—PCT/US2018/013356—ISA/EPO—dated May 22, 2018.
(Continued)

*Primary Examiner* — Suhail Khan
(74) *Attorney, Agent, or Firm* — Arent Fox, LLP; Clint R. Morin

(57) ABSTRACT

One apparatus may determine a first set of parameters associated with a first RACH procedure, the first set of parameters being associated with beam failure recovery for a first UE in a cell. The apparatus may send the first set of parameters to the first UE. Another apparatus may receive the first set of parameters associated with a first RACH procedure. The other apparatus may receive, from the first apparatus, a second set of parameters associated with a second RACH procedure. The other apparatus may generate a RACH preamble based on the first set of parameters or based on the second set of parameters. The other apparatus may send, to the first apparatus, the generated RACH preamble.

30 Claims, 27 Drawing Sheets

Related U.S. Application Data

(60) Provisional application No. 62/341,051, filed on May 24, 2016, provisional application No. 62/338,484, filed on May 18, 2016, provisional application No. 62/337,829, filed on May 17, 2016, provisional application No. 62/333,120, filed on May 6, 2016, provisional application No. 62/329,180, filed on Apr. 28, 2016, provisional application No. 62/322,168, filed on Apr. 13, 2016, provisional application No. 62/567,161, filed on Oct. 2, 2017, provisional application No. 62/557,082, filed on Sep. 11, 2017, provisional application No. 62/447,386, filed on Jan. 17, 2017.

(51) Int. Cl.
  *H04W 74/00* (2009.01)
  *H04B 7/0408* (2017.01)
  *H04L 5/00* (2006.01)
  *H04L 27/26* (2006.01)
  *H04B 7/0417* (2017.01)
  *H04W 74/08* (2009.01)
  *H04W 88/08* (2009.01)
  *H04L 27/00* (2006.01)

(52) U.S. Cl.
  CPC ........ *H04L 5/0032* (2013.01); *H04L 27/2692* (2013.01); *H04W 72/046* (2013.01); *H04W 74/002* (2013.01); *H04L 5/001* (2013.01); *H04L 5/0023* (2013.01); *H04L 2027/0095* (2013.01); *H04W 74/0833* (2013.01); *H04W 88/08* (2013.01)

(56) References Cited

U.S. PATENT DOCUMENTS

| | | | |
|---|---|---|---|
| 7,310,537 | B2 | 12/2007 | Wichman et al. |
| 2010/0296472 | A1 | 11/2010 | Lee et al. |
| 2011/0065448 | A1 | 3/2011 | Song et al. |
| 2011/0107169 | A1 | 5/2011 | Loehr et al. |
| 2011/0149842 | A1 | 6/2011 | Cordeiro et al. |
| 2011/0211490 | A1 | 9/2011 | Nikula et al. |
| 2013/0064239 | A1 | 3/2013 | Yu et al. |
| 2013/0083774 | A1 | 4/2013 | Son et al. |
| 2013/0155847 | A1 | 6/2013 | Li et al. |
| 2013/0182683 | A1 | 7/2013 | Seol et al. |
| 2013/0235742 | A1 | 9/2013 | Josiam et al. |
| 2013/0301619 | A1 | 11/2013 | Singh et al. |
| 2014/0044044 | A1 | 2/2014 | Josiam et al. |
| 2014/0146697 | A1 | 5/2014 | Kim et al. |
| 2014/0177607 | A1 | 6/2014 | Li et al. |
| 2014/0192917 | A1 | 7/2014 | Nam et al. |
| 2014/0198696 | A1 | 7/2014 | Li et al. |
| 2014/0211731 | A1 | 7/2014 | Inoue et al. |
| 2014/0369245 | A1 | 12/2014 | Pecen et al. |
| 2014/0376466 | A1 | 12/2014 | Jeong et al. |
| 2015/0009951 | A1 | 1/2015 | Josiam et al. |
| 2015/0045048 | A1 | 2/2015 | Xu et al. |
| 2015/0049663 | A1* | 2/2015 | Mukherjee ............ H04W 16/26 370/315 |
| 2015/0049824 | A1 | 2/2015 | Kim et al. |
| 2015/0103784 | A1 | 4/2015 | Lorca |
| 2015/0181546 | A1* | 6/2015 | Freda ................ H04W 56/0015 370/336 |
| 2015/0271814 | A1 | 9/2015 | Park et al. |
| 2015/0288439 | A1 | 10/2015 | Kim et al. |
| 2015/0350992 | A1 | 12/2015 | Han et al. |
| 2015/0359003 | A1 | 12/2015 | Kim et al. |
| 2016/0095003 | A1 | 3/2016 | Yu et al. |
| 2016/0099763 | A1 | 4/2016 | Chen et al. |
| 2016/0105872 | A1 | 4/2016 | Kuo |
| 2016/0119887 | A1* | 4/2016 | Charipadi ........... H04W 56/001 370/335 |
| 2016/0134456 | A1 | 5/2016 | Maltsev et al. |
| 2016/0157267 | A1 | 6/2016 | Frenne et al. |
| 2016/0174258 | A1 | 6/2016 | Wang et al. |
| 2016/0190686 | A1 | 6/2016 | Gao et al. |
| 2016/0192401 | A1 | 6/2016 | Park et al. |
| 2016/0211902 | A1 | 7/2016 | Park et al. |
| 2016/0353424 | A1 | 12/2016 | Stirling-Gallacher et al. |
| 2016/0353510 | A1 | 12/2016 | Zhang et al. |
| 2016/0380685 | A1 | 12/2016 | Kasher et al. |
| 2016/0380742 | A1 | 12/2016 | Suzuki et al. |
| 2017/0012692 | A1 | 1/2017 | Kim et al. |
| 2017/0111886 | A1 | 4/2017 | Kim et al. |
| 2017/0207845 | A1 | 7/2017 | Moon et al. |
| 2017/0272223 | A1 | 9/2017 | Kim et al. |
| 2017/0288763 | A1 | 10/2017 | Yoo et al. |
| 2017/0295502 | A1 | 10/2017 | Stirling-Gallacher et al. |
| 2017/0295508 | A1 | 10/2017 | Stirling-Gallacher et al. |
| 2017/0302355 | A1 | 10/2017 | Islam et al. |
| 2017/0302414 | A1 | 10/2017 | Islam et al. |
| 2017/0303264 | A1 | 10/2017 | Islam et al. |
| 2017/0303265 | A1 | 10/2017 | Islam et al. |
| 2017/0332300 | A1 | 11/2017 | Choi et al. |
| 2018/0019790 | A1 | 1/2018 | Mondal et al. |
| 2018/0049055 | A1 | 2/2018 | Wiberg et al. |
| 2018/0062711 | A1 | 3/2018 | Mizusawa |
| 2018/0138590 | A1 | 5/2018 | Uchida et al. |
| 2018/0139791 | A1 | 5/2018 | Bai et al. |
| 2018/0219605 | A1 | 8/2018 | Davydov et al. |
| 2018/0220416 | A1 | 8/2018 | Islam et al. |
| 2018/0249433 | A1 | 8/2018 | Shin et al. |
| 2018/0287722 | A1 | 10/2018 | Takano |
| 2018/0323852 | A1 | 11/2018 | Islam et al. |
| 2019/0028980 | A1* | 1/2019 | Feuersaenger .... H04W 74/0833 |
| 2019/0068266 | A1 | 2/2019 | Chang et al. |
| 2019/0081676 | A1 | 3/2019 | Wei et al. |
| 2019/0349152 | A1 | 11/2019 | Islam et al. |

FOREIGN PATENT DOCUMENTS

| | | |
|---|---|---|
| WO | 2014117352 A1 | 8/2014 |
| WO | 2015032101 A1 | 3/2015 |
| WO | 2015060681 A1 | 4/2015 |
| WO | 2015141065 A1 | 9/2015 |
| WO | 2015147717 A1 | 10/2015 |
| WO | 2016018168 A1 | 2/2016 |
| WO | 2016086144 A1 | 6/2016 |
| WO | 2017173961 A1 | 10/2017 |

OTHER PUBLICATIONS

Partial International Search Report—PCT/US2018/013356—ISA/EPO—dated Apr. 6, 2018.
International Search Report and Written Opinion—PCT/US2017/025764—ISA/EPO—dated Jun. 19, 2017.
"3rd Generation Partnership Project; Technical Specification Group Radio Access Network; Evolved Universal Terrestrial Radio Access (E-UTRA); Multiplexing and channel coding (Release 11)", 3GPP Standard; 3GPP TS 36.212, 3rd Generation Partnership Project (3GPP), Mobile Competence Centre; 650, Route Des Lucioles; F-06921 Sophia-Antipolis Cedex; France, vol. RAN WG1, No. V11.3.0, Jun. 17, 2013 (Jun. 17, 2013), pp. 1-84, XP050692826, [retrieved on Jun. 17, 2013] sections 5.3.2, 5.3.2.2. 5.3.2.5.
JP2015105519 for U.S. Appl. No. 15/565,518 (Corresponds to US20180062711) (Year: 2015).

* cited by examiner

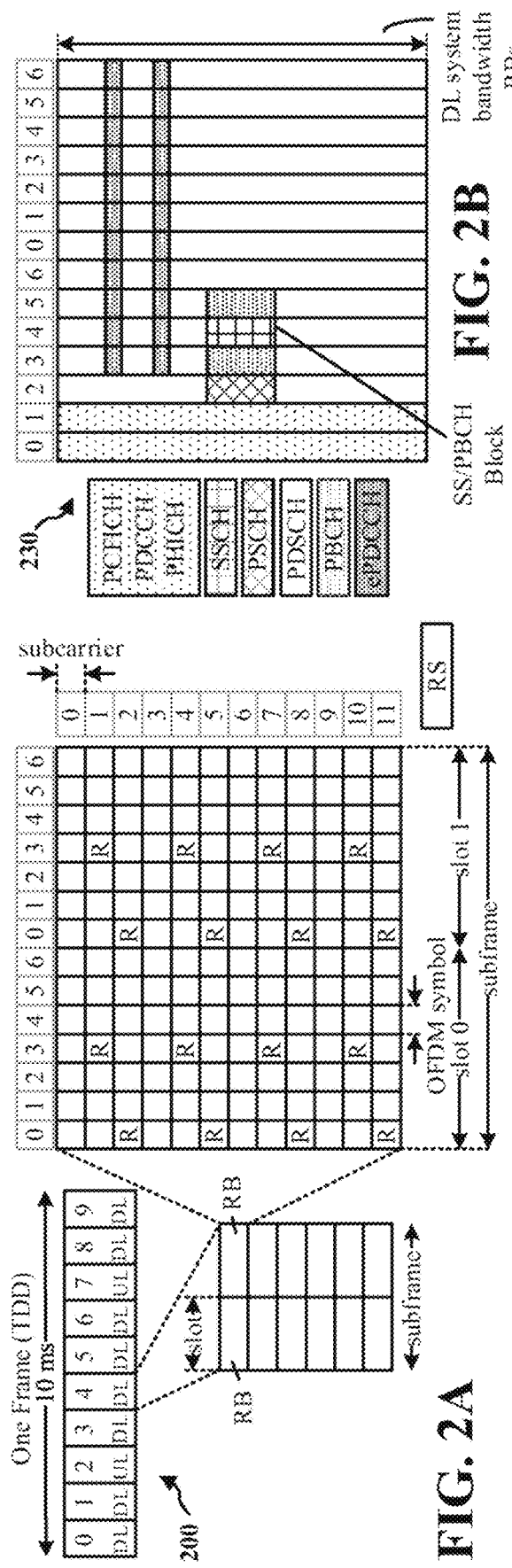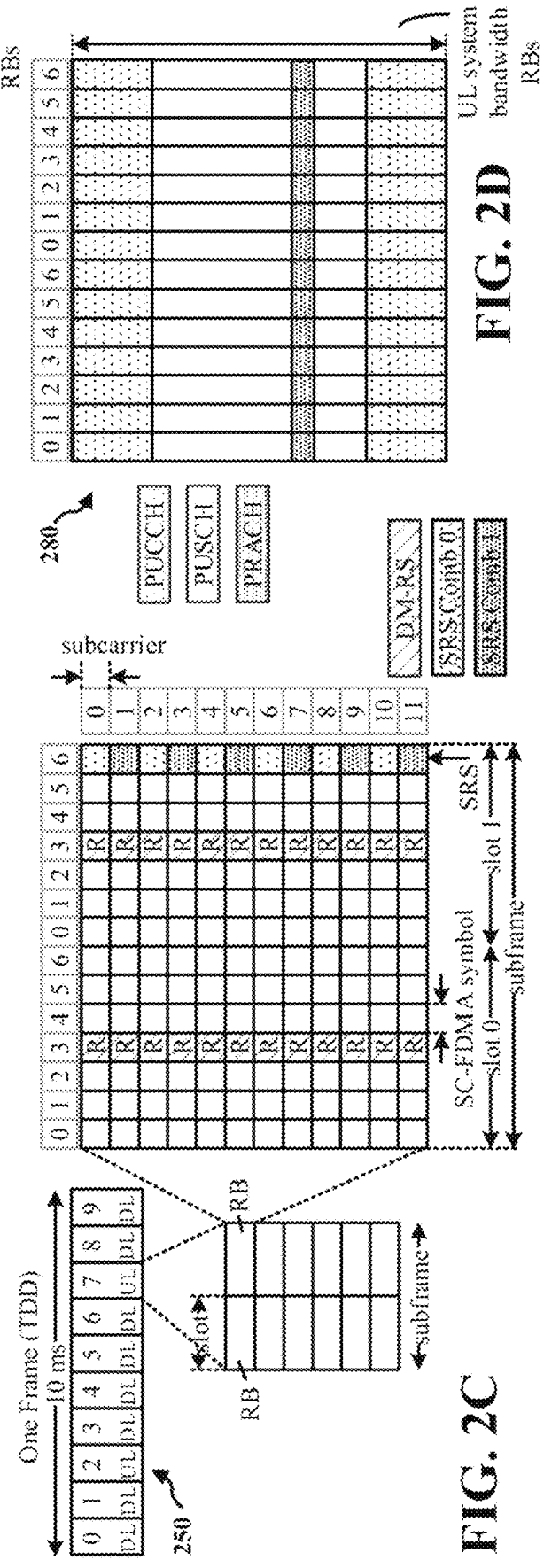
FIG. 2A  FIG. 2B  FIG. 2C  FIG. 2D

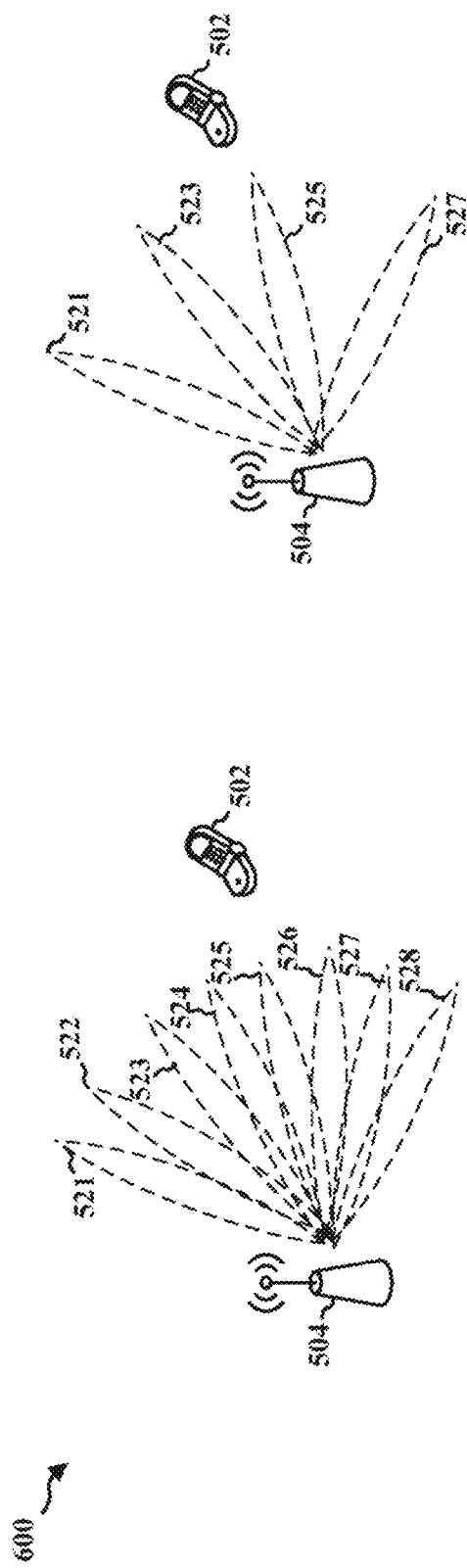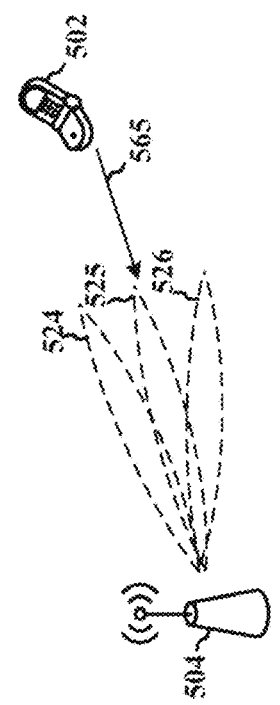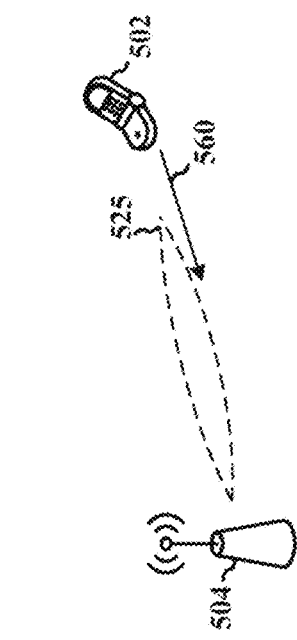
FIG. 6A
FIG. 6B
FIG. 6C
FIG. 6D

SYSTEM AND METHOD FOR BEAM ADJUSTMENT REQUEST

CROSS-REFERENCE TO RELATED APPLICATIONS

The application is a Continuation-in-Part of U.S. Non-Provisional application Ser. No. 15/335,353, entitled "SYSTEM AND METHOD FOR BEAM ADJUSTMENT REQUEST" and filed on Oct. 26, 2016, which claims priority of U.S. Provisional Application No. 62/341,051, entitled "TRANSMIT REQUEST FOR BEAM TRACKING" and filed on May 24, 2016, U.S. Provisional Application Ser. No. 62/338,484, entitled "TRANSMIT REQUEST FOR BEAM TRACKING" and filed on May 18, 2016, U.S. Provisional Application Ser. No. 62/337,829, entitled "TRANSMIT REQUEST FOR BEAM TRACKING" and filed on May 17, 2016, U.S. Provisional Application Ser. No. 62/333,120, entitled "TRANSMIT REQUEST FOR BEAM TRACKING" and filed on May 6, 2016, U.S. U.S. Provisional Application Ser. No. 62/329,180, entitled "TRANSMIT REQUEST FOR BEAM TRACKING" and filed on Apr. 28, 2016, U.S. Provisional Application Ser. No. 62/322,168, entitled "TRANSMIT REQUEST FOR BEAM TRACKING" and filed on Apr. 13, 2016, the disclosures of which are expressly incorporated by reference herein in their entireties.

This application also claims the benefit of U.S. Provisional Application Ser. No. 62/567,161, entitled "SYSTEM AND METHOD FOR BEAM ADJUSTMENT REQUEST" and filed on Oct. 2, 2017, U.S. Provisional Application Ser. No. 62/557,082, entitled "SYSTEM AND METHOD FOR BEAM ADJUSTMENT REQUEST" and filed on Sep. 11, 2017, U.S. Provisional Application Ser. No. 62/447,386, entitled "SYSTEM AND METHOD FOR BEAM INDEX" and filed on Jan. 17, 2017, the disclosures of which are expressly incorporated by reference herein in their entireties.

BACKGROUND

Field

The present disclosure relates generally to communication systems, and more particularly, to a user equipment that may inform a base station of a beam adjustment request.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology.

Another example of a telecommunication standard is 5G New Radio (NR). 5G NR is part of a continuous mobile broadband evolution promulgated by 3GPP to meet new requirements associated with latency, reliability, security, scalability (e.g., with Internet of Things (IoT)), and other requirements. Some aspects of 5G NR may be based on the 4G LTE standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Path loss may be relatively high in millimeter wave (mmW) systems. Transmission may be directional to mitigate path loss. A base station may transmit one or more beam reference signals by sweeping in all directions so that a user equipment (UE) may identify a best "coarse" beam. Further, the base station may transmit a beam refinement request signal so that the UE may track "fine" beams. If a "coarse" beam identified by the UE changes, the UE may need to inform the base station so that the base station may train one or more new "fine" beams for the UE.

In various aspects, the UE may send an index of a best beam and corresponding beam refinement reference signal session request to the base station in a subframe reserved for a random access channel (RACH). The UE may occupy one or more tones reserved for RACH. Further, the UE may occupy tones that are reserved for scheduling request but not for RACH transmission.

In an aspect of the disclosure, a method, a computer-readable medium, and an apparatus are provided. The apparatus may be configured to determine a first set of parameters associated with a first RACH procedure, the first set of parameters being associated with beam failure recovery for a first UE in a cell. The apparatus may send the first set of parameters to the first UE. In an aspect, the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure. The apparatus may determine a second set of parameters associated with a second RACH procedure, the second set of parameters being associated with at least one of initial access, cell selection, cell reselection, loss of timing synchronization or handover. The apparatus may send the second set of parameters in the cell for use by a second UE. In an aspect, the first UE is time-synchronized in the cell, and the second UE is time-unsynchronized in the cell. In an aspect, the available number of cyclic shifts for each root sequence in the first set of RACH parameters is greater than that in the second set of parameters. The apparatus may receive, from the first UE based on the first set of parameters, a first RACH preamble in a set of RACH resources, the first RACH preamble being associated with the beam failure recovery, and receive, from the second UE based on the second set of parameters, a second RACH preamble in the set of RACH resources. The apparatus may identify a beam index for communication with the first UE based on the receiving of first RACH preamble. In an aspect, the second set of parameters is sent in a handover message, a remaining minimum system information (RMSI) message, or an other system information (OSI) message. In an aspect, the first set of parameters is sent in a radio resource control (RRC) message.

In another aspect of the disclosure, another method, another computer-readable medium, and another apparatus are provided. The other apparatus may be configured to receive, from a base station, a first set of parameters associated with a first RACH procedure, the first RACH procedure being associated with beam failure recovery with the base station. The other apparatus may receive, from the base station, a second set of parameters associated with a second RACH procedure, the second RACH procedure being associated with one of initial access, cell selection, cell reselection, loss of timing synchronization, or handover. The other apparatus may generate a RACH preamble based on the first set of parameters or based on the second set of parameters. The other apparatus may send, to the base station, the generated RACH preamble.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
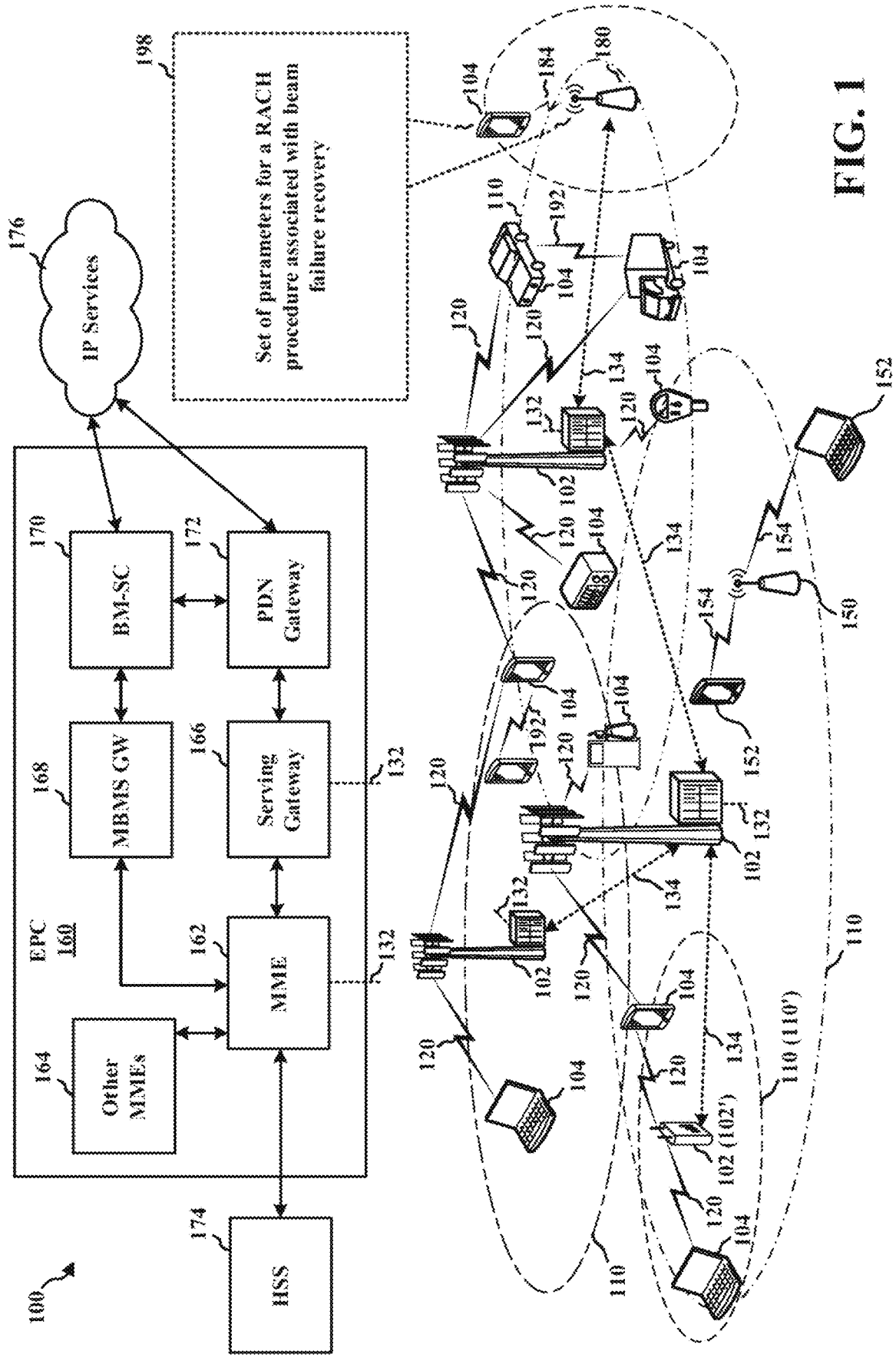
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to determine a first set of parameters 198 associated with a first RACH procedure, the first set of parameters being associated with beam failure recovery for a first UE 104 in a cell. The base station 180 may send the first set of parameters 198 to the first UE 104. In an aspect, the first set of parameters 198 indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure. The base station 180 may determine a second set of parameters associated with a second RACH procedure, the second set of parameters being associated with at least one of initial access, cell selection, cell reselection, loss of timing synchronization or handover. The base station 180 may send the second set of parameters in the cell for use by a second UE. In an aspect, the first UE 104 is time-synchronized in the cell, and the second UE is time-unsynchronized in the cell. In an aspect, the available number of cyclic shifts for each root sequence in the first set of RACH parameters is greater than that in the second set of parameters. The base station 180 may receive, from the first UE 104 based on the first set of parameters 198, a first RACH preamble in a set of RACH resources, the first RACH preamble being associated with the beam failure recovery, and receive, from the second UE based on the second set of parameters, a second RACH preamble in the set of RACH resources. The base station 180 may identify a beam index for communication with the first UE 104 based on the receiving of first RACH preamble. The first UE 1804 may be configured to receive, from the base station 180, the first set of parameters 198 associated with the first RACH procedure, the first RACH procedure being associated with beam failure recovery with the base station 180. The first UE 104 may receive, from the base station 180, a second set of parameters associated with a second RACH procedure, the second RACH procedure being associated with one of initial access, cell selection, cell reselection, loss of timing synchronization, or handover. The first UE 104 may generate a RACH preamble based on the first set of parameters or based on the second set of parameters. The first UE 104 may send, to the base station 180, the generated RACH preamble.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots.

Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu*15$ kKz, where μ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
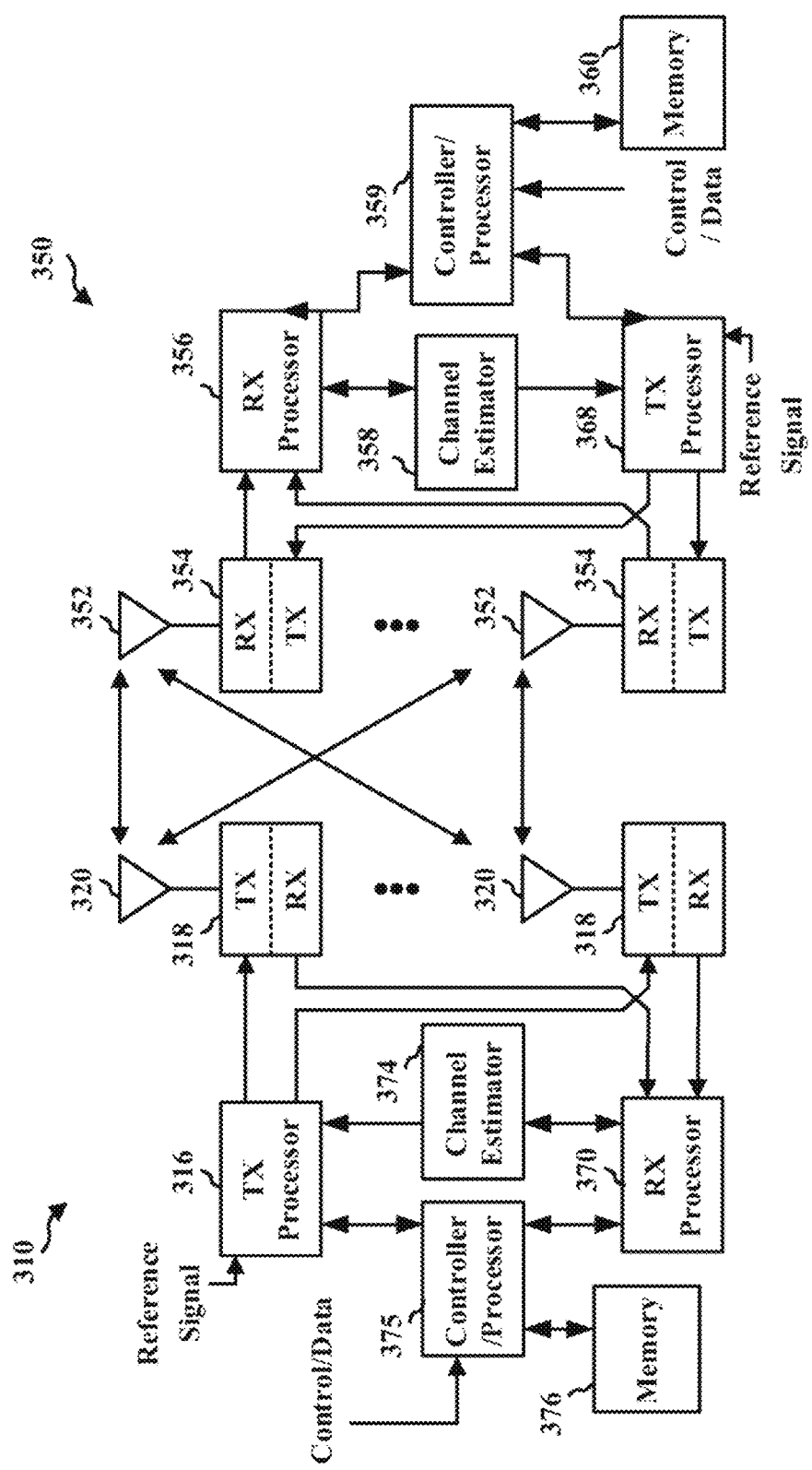
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figures 4A, 4B:
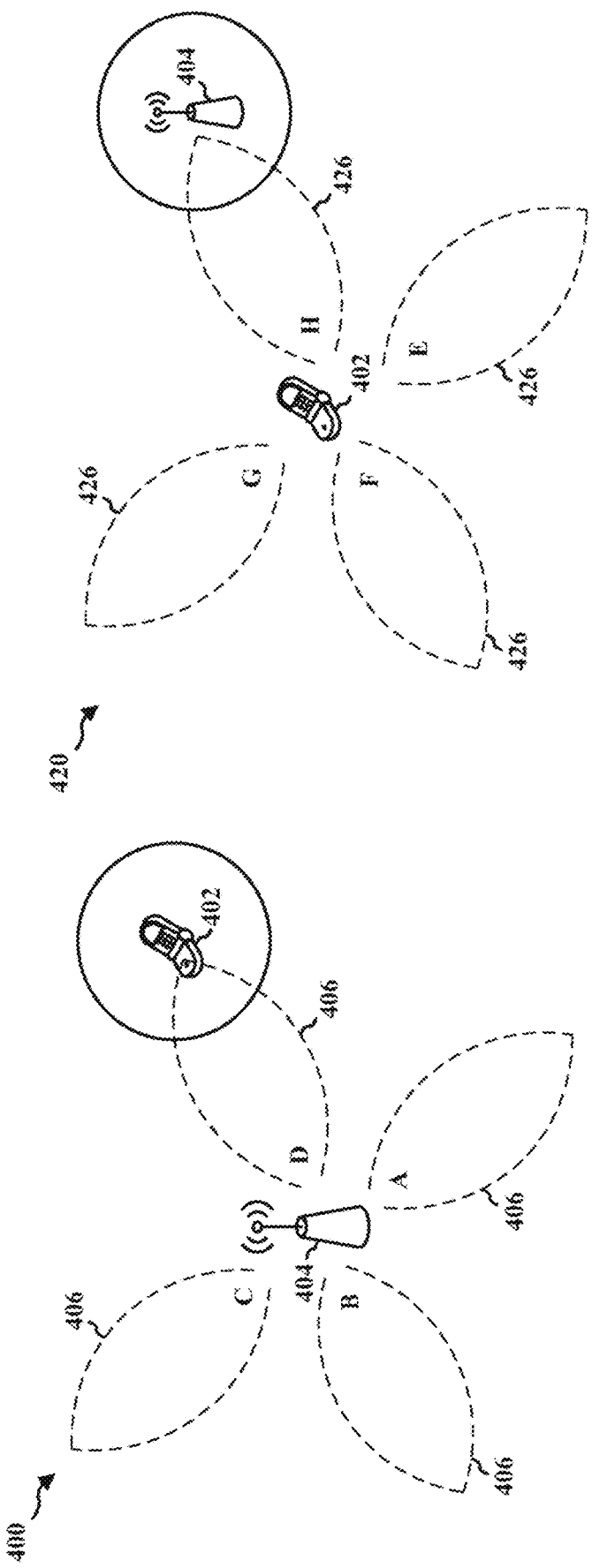
FIGS. 4A, 4B, 4C, and 4D are diagrams of a wireless communications system.

FIGS. 4A and 4B are diagrams illustrating an example of the transmission of beamformed signals between a base station (BS) and a UE. The base station may be embodied as a base station in a mmW system (mmW base station). Referring to FIG. 4A, diagram 400 illustrates a base station 404 of a mmW system transmitting beamformed signals 406 (e.g., beam reference signals) in different transmit directions (e.g., directions A, B, C, and D). In an example, the base station 404 may sweep through the transmit directions according to a sequence A-B-C-D. In another example, the base station 404 may sweep through the transmit directions according to the sequence B-D-A-C. Although only four transmit directions and two transmit sequences are described with respect to FIG. 4A, any number of different transmit directions and transmit sequences are contemplated.

After transmitting the signals, the base station 404 may switch to a receive mode. In the receive mode, the base station 404 may sweep through different receive directions in a sequence or pattern corresponding (mapping) to a sequence or pattern in which the base station 404 previously transmitted the synchronization/discovery signals in the different transmit directions. For example, if the base station 404 previously transmitted the synchronization/discovery signals in transmit directions according to the sequence A-B-C-D, then the base station 404 may sweep through receive directions according to the sequence A-B-C-D in an attempt to receive an association signal from a UE 402. In another example, if the base station 404 previously transmitted the synchronization/discovery signals in transmit directions according to the sequence B-D-A-C, then the base station 404 may sweep through receive directions according to the sequence B-D-A-C in an attempt to receive the association signal from the UE 402.

A propagation delay on each beamformed signal allows a UE 402 to perform a receive (RX) sweep. The UE 402 in a receive mode may sweep through different receive directions in an attempt to detect a synchronization/discovery signal 406 (see FIG. 4B). One or more of the synchronization/discovery signals 406 may be detected by the UE 402. When a strong synchronization/discovery signal 406 is detected, the UE 402 may determine an optimal transmit direction of the base station 404 and an optimal receive direction of the UE 402 corresponding to the strong synchronization/discovery signal. For example, the UE 402 may determine preliminary antenna weights/directions of the strong synchronization/discovery signal 406, and may further determine a time and/or resource where the base station 404 is expected to optimally receive a beamformed signal. Thereafter, the UE 402 may attempt to associate with the base station 404 via a beamformed signal.

The base station 404 may sweep through a plurality of directions using a plurality of ports in a cell-specific manner in a first symbol of a synchronization subframe. For example, the base station 404 may sweep through different transmit directions (e.g., directions A, B, C, and D) using four ports in a cell-specific manner in a first symbol of a synchronization subframe. In an aspect, these different transmit directions (e.g., directions A, B, C, and D) may be considered "coarse" beam directions. In an aspect, a beam reference signal (BRS) may be transmitted in different transmit directions (e.g., directions A, B, C, and D).

In an aspect, the base station 404 may sweep the four different transmit directions (e.g., directions A, B, C, and D) in a cell-specific manner using four ports in a second symbol of a synchronization subframe. A synchronization beam may occur in a second symbol of the synchronization subframe.

Referring to diagram 420 of FIG. 4B, the UE 402 may listen for beamformed discovery signals in different receive directions (e.g., directions E, F, G, and H). In an example, the UE 402 may sweep through the receive directions according to a sequence E-F-G-H. In another example, the UE 402 may sweep through the receive directions according to the sequence F-H-E-J. Although only four receive directions and two receive sequences are described with respect to FIG. 4B, any number of different receive directions and receive sequences are contemplated.

The UE 402 may attempt the association by transmitting beamformed signals 426 (e.g., association signals or another indication of a best "coarse" beam or a best "fine" beam) in the different transmit directions (e.g., directions E, F, G, and H). In an aspect, the UE 402 may transmit an association signal 426 by transmitting along the optimal receive direction of the UE 402 at the time/resource where the base station 404 is expected to optimally receive the association signal. The base station 404 in the receive mode may sweep through different receive directions and detect the association signal 426 from the UE 402 during one or more timeslots corresponding to a receive direction. When a strong association signal 426 is detected, the base station 404 may determine an optimal transmit direction of the UE 402 and an optimal receive direction of the base station 404 corresponding to the strong association signal. For example, the base station 404 may determine preliminary antenna weights/directions of the strong association signal 426, and may further determine a time and/or resource where the UE 402 is expected to optimally receive a beamformed signal. Any of the processes discussed above with respect to FIGS. 4A and 4B may be refined or repeated over time such that the UE 402 and base station 404 eventually learn the most optimal transmit and receive directions for establishing a link with each other. Such refinement and repetition may be referred to as beam training.

In an aspect, the base station 404 may choose a sequence or pattern for transmitting the synchronization/discovery signals according to a number of beamforming directions. The base station 404 may then transmit the signals for an amount of time long enough for the UE 402 to sweep through a number of beamforming directions in an attempt to detect a synchronization/discovery signal. For example, a base station beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 402 detects a synchronization/discovery signal from the base station 404, the UE 402 may discover that the strongest synchronization/discovery signal is received when the UE 402 beamforming direction is k=2 and the base station 404 beamforming direction is n=3. Accordingly, the UE 402 may use the same antenna weights/directions for responding (transmitting a beamformed signal) to the base station 404 in a corresponding response timeslot. That is, the UE 402 may send a signal to the base station 404 using UE 402 beamforming direction k=2 during a timeslot when the base station 404 is expected to perform a receive sweep at base station 404 beamforming direction n=3.

Path loss may be relatively high in millimeter wave (mmW) systems. Transmission may be directional to mitigate path loss. A base station may transmit one or more beam reference signals by sweeping in all directions so that a user equipment (UE) may identify a best "coarse" beam. Further, the base station may transmit a beam refinement request signal so that the UE may track "fine" beams. If a "coarse" beam identified by the UE changes, the UE may need to inform the base station so that the base station may train one or more new "fine" beams for the UE.

In various aspects, the UE may send an index of a best beam and corresponding beam refinement reference signal session request to the base station in a subframe reserved for RACH. The UE may occupy one or more tones reserved for RACH. Further, the UE may occupy tones that are reserved for scheduling request but not for RACH transmission.

Figure 4D:
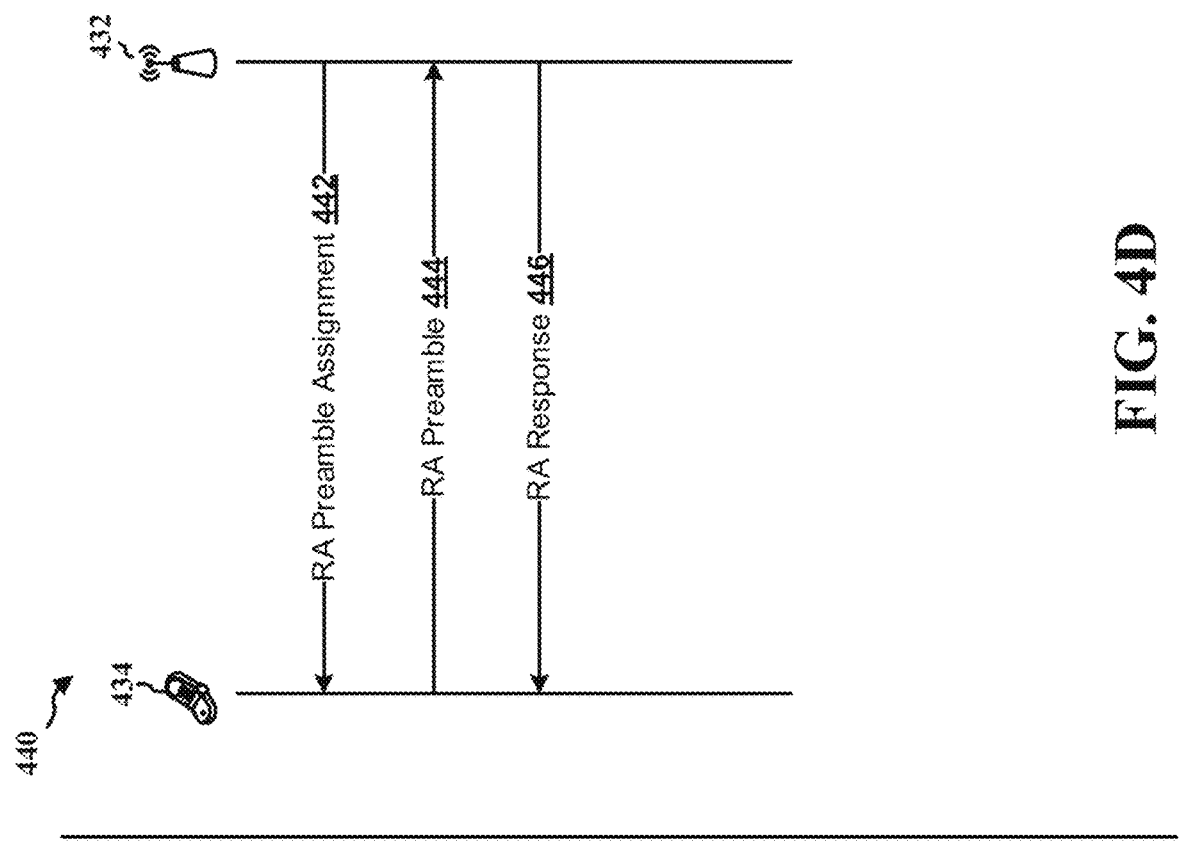
Figure 4C:
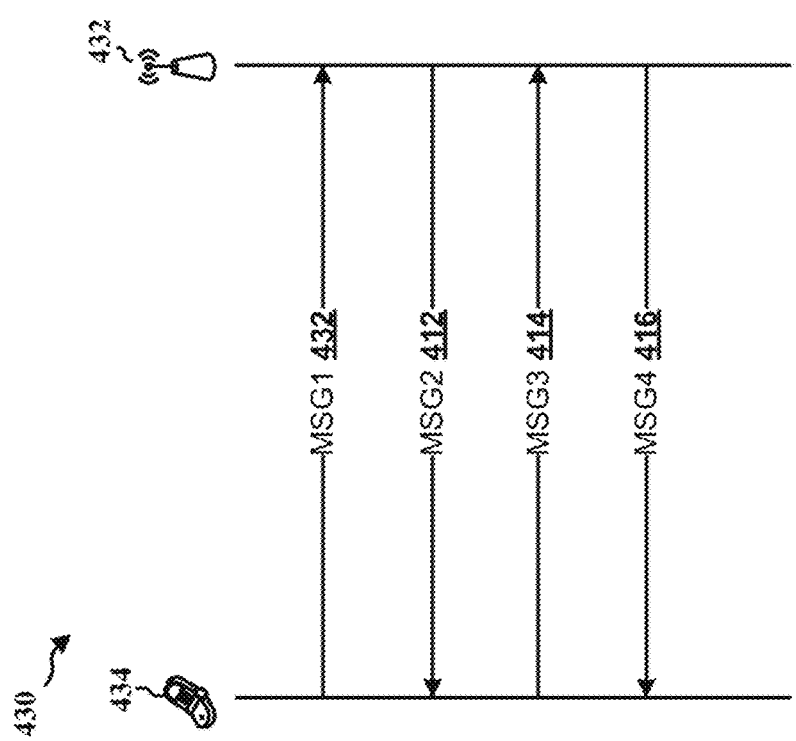

FIGS. 4C and 4D illustrate call flow diagrams of methods 430, 440 of RACH procedures. A UE 434 may perform a RACH procedure with a base station 432 (e.g., a mmW base station, an eNB, etc.), for example, in order to synchronize with a network. A RACH procedure may be either contention-based or non-contention based.

FIG. 4C illustrates a method 430 for a contention-based RACH procedure. First, the UE 434 may select a RACH preamble for the RACH procedure. Further, the UE 434 may determine a random access (RA) RNTI in order to identify the UE 434 during the RACH procedure. The UE 434 may determine an RA-RNTI based on, for example, a time slot number in which a MSG1 436 is sent. The UE 434 may include the RACH preamble and the RA-RNTI in the MSG1 436.

In an aspect, the UE 434 may determine at least one resource (e.g., a time and/or frequency resource) that is to carry the MSG1 436. For example, the base station 432 may broadcast system information (e.g., a SIB), and the UE 434 may acquire the at least one resource based on the system information (e.g., system information included in a SIB2). The UE 434 may send the MSG1 436 to the base station 432, for example, on the at least one resource. If the UE 434 does not receive a response to the MSG1 436 (e.g., after expiration of a timer), then the UE 434 may increase transmit power (e.g., by a fixed interval) and resend the MSG1 436.

Based on the MSG1 436, the base station 432 may send, to the UE 434, a MSG2 437. The MSG2 437 may also be known as a random access response and may be sent on a downlink shared channel (DL-SCH). The base station 432 may determine a temporary cell RNTI (T-CRNTI). Further, the base station 432 may determine a timing advance value so that the UE 434 may adjust timing to compensate for delay. Further, the base station 432 may determine an uplink resource grant, which may include an initial resource assignment for the UE 434 so that the UE 434 may use the uplink shared channel (UL-SCH). The base station 432 may generate the MSG2 437 to include the C-RNTI, the timing advance value, and/or the uplink grant resource. The base station 432 may then transmit the MSG2 437 to the UE 434. In an aspect, the UE 434 may determine an uplink resource grant based on the MSG2 437.

Based on the MSG2 437, the UE 434 may send, to the base station 432, a MSG3 438. The MSG3 438 may also be known as an RRC connection request message and/or a scheduled transmission message. The UE 434 may determine a temporary mobile subscriber identity (TMSI) associated with the UE 434 or another random value used to identify the UE 434 (e.g., if the UE 434 is connecting to the network for the first time). The UE 434 may determine a connection establishment clause, which may indicate why the UE 434 is connecting to the network. The UE 434 may generate the MSG3 438 to include at least the TMSI or other random value, as well as the connection establishment clause. The UE 434 may then transmit the MSG3 438 to the base station on the UL-SCH.

Based on the MSG3 438, the base station 432 may send, to the UE 434, a MSG4 439. The MSG4 439 may also be known as a connection resolution message. The base station 432 may address the MSG4 439 toward the TMSI or random value from the MSG3 438. The MSG4 439 may be scrambled with a C-RNTI associated with the UE 434. The base station 432 may transmit the MSG4 439 to the UE 434. The UE 434 may decode the MSG4 439, for example, using the C-RNTI associated with the UE 434. This RACH procedure may allow the UE 434 to be synchronized with a network.

FIG. 4D illustrates a method 440 of a non-contention-based RACH procedure. The non-contention-based RACH procedure may be applicable to handover and/or downlink data arrival.

The base station 432 may determine a random access preamble assigned to the UE 434. The base station 432 may transmit, to the UE 434, the random access preamble assignment 442. The UE 434 may respond to the random access preamble assignment 442 with the random access preamble 444 (e.g., an RRC connection message), which may be the random access preamble assigned to the UE 434. The UE 434 may then receive, from the base station 432, a random access response 446 (e.g., an uplink grant).

FIGS. 5A through 5G are diagrams illustrating an example of the transmission of beamformed signals between a base station and a UE. The base station 504 may be embodied as a base station in a mmW system (mmW base station). It should be noted that while some beams are illustrates as adjacent to one another, such an arrangement may be different in different aspects (e.g., beams transmitted during a same symbol may not be adjacent to one another).

Figure 5B:
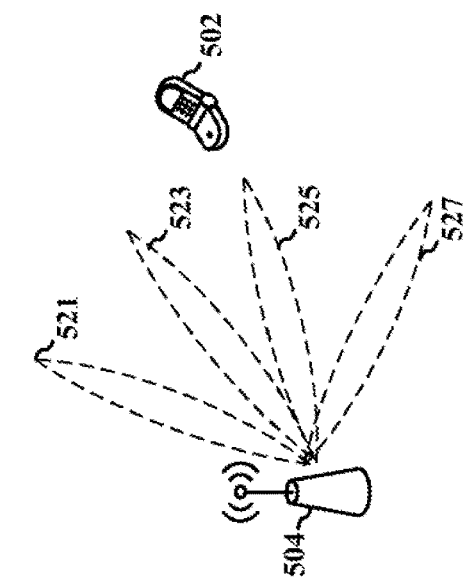
FIGS. 5A through 5G illustrate diagrams of a wireless communications system.

In an aspect, a beam set may contain eight different beams. For example, FIG. 5A illustrates eight beams 521, 522, 523, 524, 525, 526, 527, 528 for eight directions. In aspects, the base station 504 may be configured to beamform for transmission of at least one of the beams 521, 522, 523, 524, 525, 526, 527, 528 toward the UE 502. In one aspect, the base station 504 can sweep/transmit 112 directions using eight ports during the synchronization sub-frame.

In an aspect, a base station may transmit a beam reference signal (BRS) in a plurality of directions during a synchronization subframe. In one aspect, this transmission may be cell-specific. Referring to FIG. 5B, the base station 504 may transmit a first set of beams 521, 523, 525, 527 in four directions. For example, the base station 504 may transmit a BRS in a synchronization subframe of each of the transmit beams 521, 523, 525, 527. In an aspect, these beams 521, 523, 525, 527 transmitted in the four directions may be odd-indexed beams 521, 523, 525, 527 for the four directions out of a possible eight for the beam set. For example, the base station 504 may be capable of transmitting beams 521, 523, 525, 527 in directions adjacent to other beams 522, 524, 526, 528 that the base station 504 is configured to transmit. In an aspect, this configuration in which the base station 504 transmits beams 521, 523, 525, 527 for the four directions may be considered a "coarse" beam set.

Figure 5D:
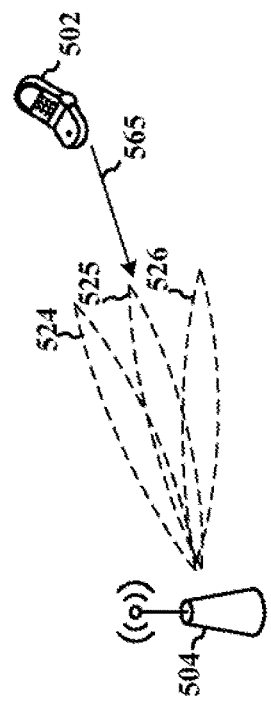
Figure 5A:
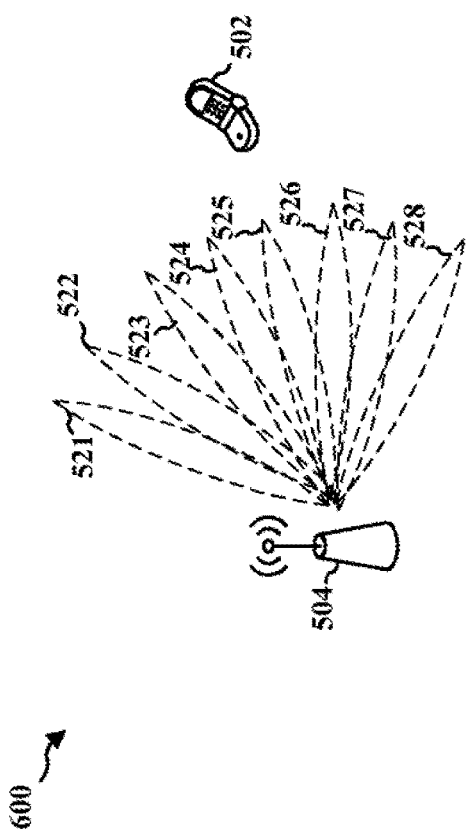
Figure 5C:
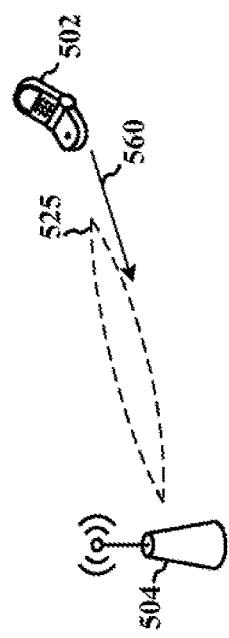

In FIG. 5C, the UE 502 may determine or select a beam index that is strongest or preferable. For example, the UE 502 may determine that the beam 525 carrying a BRS is strongest or preferable. The UE 502 may select a beam based by measuring values for a received power or received quality associated with each of the first set of beams 521, 523, 525, 527, comparing respective values to one another, and selecting the beam that corresponds to the greatest value. The selected beam may correspond to a beam index at the base station 504. The UE 502 may transmit an indication 560 of this beam index to the base station 504. In an aspect, the indication 560 may include a request to transmit a beam refinement reference signal (BRRS). The BRRS may be UE-specific. One of ordinary skill would appreciate that the BRRS may be referred to by different terminology without departing from the present disclosure, such as a beam refinement signal, a beam tracking signal, or another term.

In various aspects, the UE 502 may determine a resource that corresponds to the selected beam index. A resource may include one of a radio frame, a subframe, a symbol, or a subcarrier region. Each resource may correspond to a value, for example, a radio frame index, a subframe index, a symbol index, or a subcarrier region. In one aspect, the UE 502 may have stored therein or may have access to a mapping or table (e.g., a lookup table) that indicates a respective resource (e.g., a value or index) to which the beam index corresponds. For example, the UE 502 may determine the beam index and then access a lookup table to determine a resource index or region that corresponds to the determined beam index.

In one aspect, the resource may be included in the PUCCH. In one aspect, the at least one resource may be included in subframe associated with a random access channel (RACH). For example, the resource may be included in a bandwidth reserved for RACH transmission. In another example, the at least one resource is included in a bandwidth that is unreserved for RACH transmission. According to another example, the bandwidth is reserved for scheduling request transmission.

The base station 504 may receive the indication 560, which may include a beam adjustment request (e.g., a request for beam tracking, a request for a BRRS, a request for the base station to start transmitting on an indicated beam ID without any further beam tracking, and the like). Based on the indication 560, the base station 504 may determine the index corresponding to the selected beam 525. That is, the indication 560 may be carried on a resource determined to correspond to the index of the selected beam 525. In one aspect, the base station 504 may have stored therein or may have access to a mapping or table (e.g., a lookup table) that indicates a respective resource (e.g., a value or index) to which the beam index corresponds. For example, the base station 504 may determine the resource on which the indication 560 is received and then access a lookup table to determine a beam index (e.g., the index corresponding to the selected beam 525) or region that corresponds to the determined beam index.

In FIG. 5D, the base station 504 may transmit a second set of beams based on the index included in the indication 560. For example, the UE 502 may indicate that a first beam 525 is strongest or preferable and, in response, the base station 504 may transmit a second set of beams 524, 525, 526 to the UE 502 based on the indicated beam index. In an aspect, the beams 524, 525, 526 transmitted based on the indicated beam index may be closer (e.g., spatially and/or directionally) to the selected beam 525 than those other beams 521, 523, 527 of the first set of beams. In an aspect, the beams 524, 525, 526 transmitted based on the indicated beam index may be considered a "fine" beam set. In an aspect, a BRRS may be transmitted in each of the beams 524, 525, 526 of the fine beam set. In an aspect, the beams 524, 525, 526 of the fine beam set may be adjacent.

Based on one or more BRRSs received in the beams 524, 525, 526 of the fine beam set, the UE 502 may transmit a second indication 565 to the base station 504 to indicate a best "fine" beam. In an aspect, the second indication 565 may use two (2) bits to indicate the selected beam. For example, the UE 502 may transmit an indication 565 that indicates an index corresponding to the selected beam 525. The base station 504 may then transmit to the UE 502 using the selected beam 525.

Figure 5G:
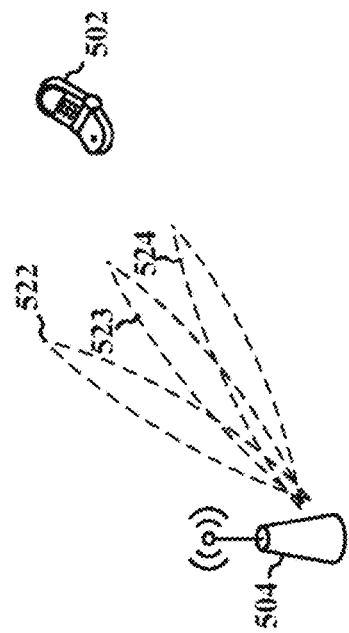
Figure 5E:
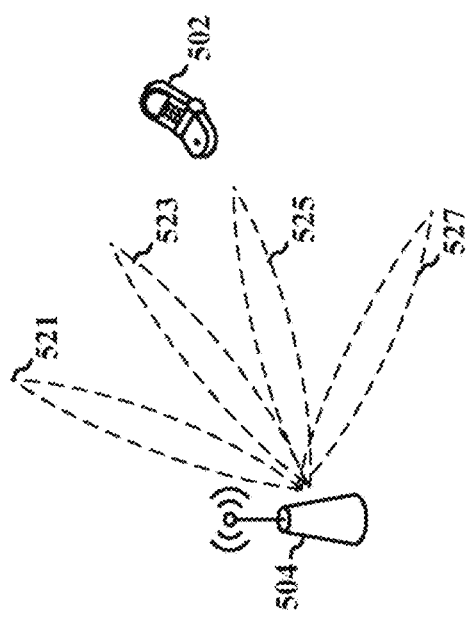

Referring to FIG. 5E, the base station 504 may transmit a BRS in a plurality of directions during a synchronization subframe. In an aspect, the base station 504 may transmit the BRS continuously, e.g., even after the UE 502 has communicated the indication 565 of a selected beam 525. For example, the base station 504 may transmit beams 521, 523, 525, 527 that each include a BRS (e.g., a "coarse" beam set).

Figure 5F:
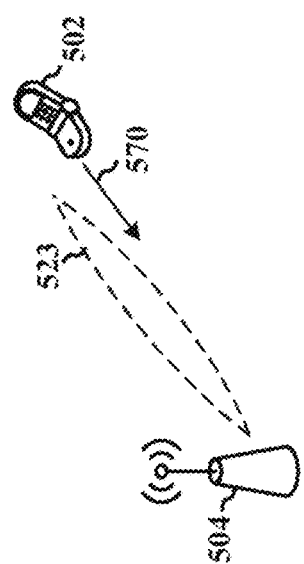

Referring to FIG. 5F, the quality of the selected beam 525 may deteriorate so that the UE 502 may no longer prefer to communicate using the selected beam 525. Based on the BRS that is transmitted in synchronization subframes (e.g., continuously transmitted), the UE 502 may determine a new beam 523 on which to communicate. For example, the UE 502 may determine that the beam 523 carrying a BRS is strongest or preferable. The UE 502 may select a beam based by measuring values for a received power or received quality associated with each of the set of beams 521, 523, 525, 527, comparing respective values to one another, and selecting the beam that corresponds to the greatest value. The selected beam may correspond to a beam index at the base station 504. The UE 502 may transmit an request 570 indicating this beam index to the base station 504. In an aspect, the indication 560 may include a request to transmit a beam refinement reference signal (BRRS). The BRRS may be UE-specific.

In various aspects, the UE 502 may determine a resource that corresponds to the selected beam index. A resource may include one of a radio frame, a subframe, a symbol, or a subcarrier region. Each resource may correspond to a value, for example, a radio frame index, a subframe index, a symbol index, or a subcarrier region. In one aspect, a beam adjustment request (BAR) may be used to request the base station 504 to transmit a BRRS.

In one aspect, the UE 502 may have stored therein or may have access to a mapping or table (e.g., a lookup table) that indicates a respective resource (e.g., a value or index) to which the beam index corresponds. For example, the UE 502 may determine the beam index and then access a lookup table to determine a resource index or region that corresponds to the determined beam index.

In an aspect, the at least one resource may be included in a physical uplink control channel (PUCCH). However, the base station 504 may only be able to detect signals from the UE 502 in the first indicated beam 525 (FIG. 5C). Thus, the UE 502 may require a link budget on the PUCCH in order to indicate the request 570 using the PUCCH.

In another aspect, the at least one resource is included in a subframe associated with a RACH. In an aspect, the at least one resource is included in a bandwidth reserved for RACH transmission. In an aspect, the at least one resource may be included in a bandwidth that is unreserved for RACH transmission. In an aspect, the at least one resource may be included in a bandwidth that is reserved for scheduling request (SR) transmission, which may be in a RACH subframe but may be unreserved for RACH transmission.

With respect to FIG. 5G, the base station 504 may receive the request 570 from the UE 502. The base station 504 may be configured to determine a beam index of the set of beams (e.g., the set of beams illustrated in FIG. 5E) based on at least one of the request and/or the at least one resource. For example, the request 750 may be carried on a resource determined to correspond to the index of the selected beam 523. In one aspect, the base station 504 may have stored therein or may have access to a mapping or table (e.g., a lookup table) that indicates a respective resource (e.g., a value or index) to which the beam index corresponds. For example, the base station 504 may determine the resource on which the request 570 is received and then access a lookup table to determine a beam index (e.g., the index corresponding to the selected beam 523) or region that corresponds to the determined beam index. In an aspect, an uplink receive beam during reception of the request 570 may be based on the first set of beams 521, 523, 525, 527.

In an aspect, the base station 504 may be configured to transmit a second set of beams 522, 523, 524 based on at least one of the request 570 and/or the at least one resource on which the request 570 is carried. In an aspect, the base station 504 may be configured to determine, from the request 570 and/or the at least one resource carrying the request 570, a range of indexes. In an aspect, the base station 504 determines the beam index based on at least one subcarrier of the at least one resource on which the request 570 is carried.

In an aspect, the base station 504 determines, from within the range, the beam index based on a strength of a signal in different receive chains of the base station 504 through which the request 570 is received. For example, the base station 504 may receive the request 570 through a plurality of receive chains of the base station 504. The base station 504 may determine a signal strength of the request 570 for each receive chain through which the request 570 is received. The base station 504 may determine that each receive chain is associated with at least one beam index (e.g., the beam index for beam 523), and so the base station 504 may determine the beam index that corresponds to the receive chain in which the highest signal strength of the request 570 is detected.

In an aspect, the base station 504 may transmit, to the UE 502, an instruction to perform beam refinement based on the request 570. In an aspect, the instruction to perform beam refinement may be based on the selected beam 523 indicated to the base station 504 by the UE 502. In an aspect, the base station 504 may transmit one or more BRRSs in one or more synchronization subframes of the second set of beams 522, 523, 524. The UE 502 may measure the BRRS in the scheduled subframe(s) to determine the best beam of the base station 504, such as by measuring a respective value for a received power and/or received quality of each beam of the second set of beams 522, 523, 524, and comparing the measured values to one another to determine the highest values corresponding to a beam of the second set of beams 522, 523, 524.

Figure 6:
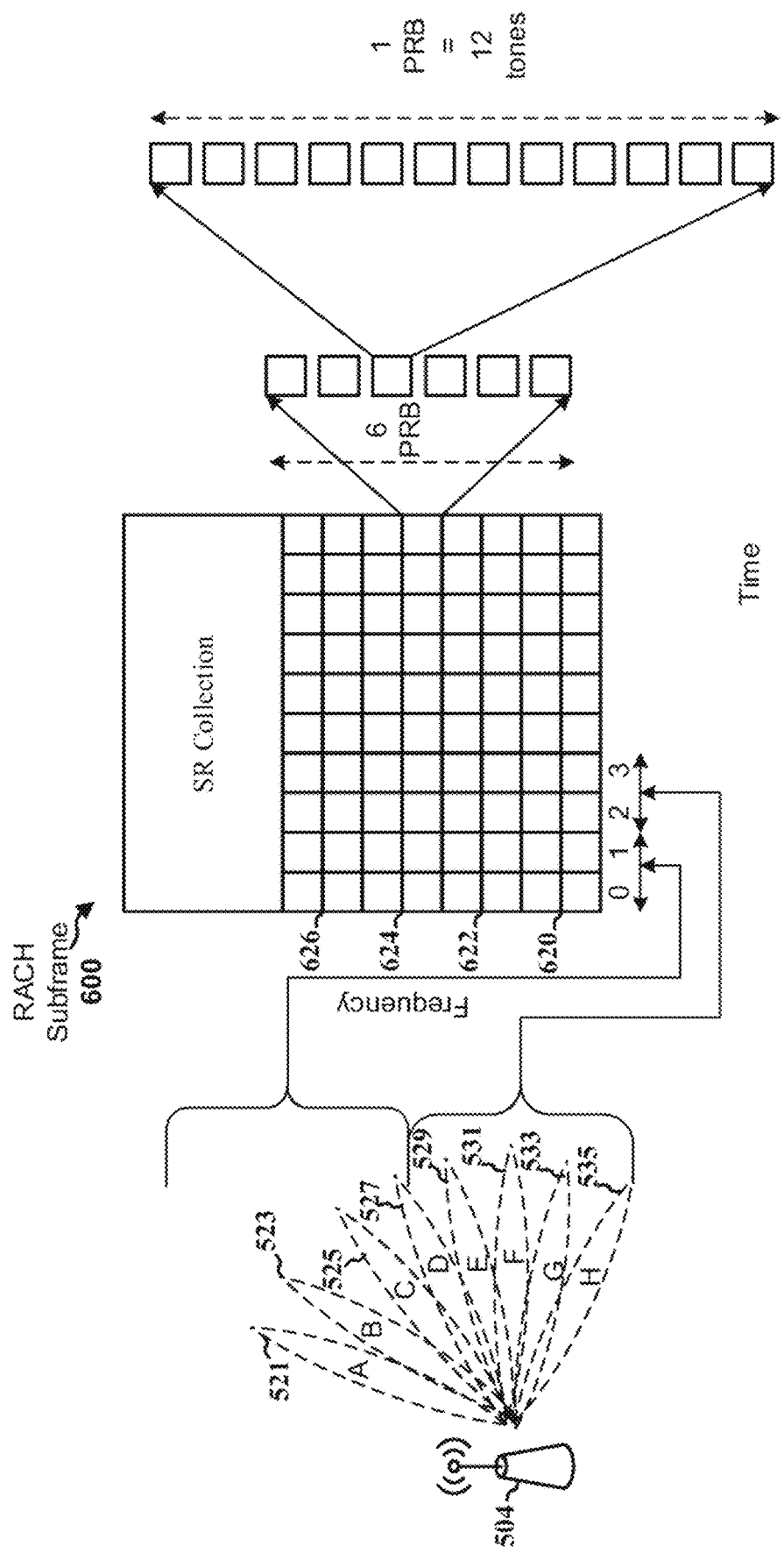
FIG. 6 is a diagram of a wireless communications system.

Referring to FIG. 6, a block diagram for indicating a selected beam is illustrated. In aspects, the base station 504 may transmit a set of beams A-H 521, 523, 525, 527, 529, 531, 533, 535. In aspects, the UE 502 may need to indicate a newly selected beam of the beams A-H 521, 523, 525, 527, 529, 531, 533, 535 to the base station 504, e.g., when a first selected beam deteriorates. However, because the base station 504 may only be able to detect transmission from the UE 502 in the direction of the first selected beam, the UE 502 may use a RACH subframe 600 in order to identify a new beam (e.g., because beamforming may not be required for RACH in a cell).

In one aspect, at least one of the base station 504 and/or the UE 502 maintains a mapping between beams (e.g., beams A-H 521, 523, 525, 527, 529, 531, 533, 535) associated with a synchronization (or BRS) session and RACH session. That is, the UE 502 may be configured to indicate a beam index using one or more resources of a RACH subframe 600, such as by transmitting a request (e.g., the request 570) on at least one resource corresponding to the beam index selected by the UE 502.

For example, the UE 502 may be configured to transmit the request 570 as a RACH sequence in a symbol 0 and 1 of the RACH subframe 600 if the selected beam index (e.g., the beam 523) corresponds to one of beams A-D 521, 523, 525, 527. Similarly, the UE 502 may be configured to transmit the request 570 as a RACH sequence in a symbol 2 and 3 of the RACH subframe 600 if the selected beam index corresponds to one of beams E-H 529, 531, 533, 535.

In one aspect, UE 502 may indicate a specific beam within the range using at least one subcarrier. For example, the UE 502 may indicate a beam within the range of beams A-D 521, 523, 525, 527 by using at least one of a pair of subcarriers 620, 622, 624, 626. Similarly, the UE 502 may indicate a beam within the range of beams E-H 529, 531, 533, 535 by using at least one of a pair of subcarriers 620, 622, 624, 626. For example, subcarriers 620 may indicate a first beam of a range and, therefore, when the UE 502 transmits a RACH sequence on symbols 0 and 1 and subcarriers 620, the UE 502 is indicating a selected beam A 521. By way of another example, the UE 502 may indicate a selected beam G 533 by transmitting a RACH sequence on subcarriers 624 (corresponding to a third beam within a range) on symbols 2 and 3. The base station 504 may therefore determine a selected beam index based on the at least one resource on which the RACH sequence is transmitted.

In another aspect, the base station 504 determines, from within the range, the beam index based on a strength of a signal in different receive chains of the base station 504 through which the request 570 is received. For example, the base station 504 may receive the request 570 through a plurality of receive chains of the base station 504. The base station 504 may determine a signal strength of the request 570 for each receive chain through which the request 570 is received. The base station 504 may determine that each receive chain is associated with at least one beam index (e.g., the beam index for beam 523), and so the base station 504 may determine the beam index that corresponds to the receive chain in which the highest signal strength of the request 570 is detected. For example, the UE 502 may select beam E 529 as the newly selected beam. To indicate the selected beam E 529, the UE 502 may transmit a RACH sequence on symbols 2 and 3 of the RACH subframe. The base station 504 may receive the RACH sequence through one or more receive chains of the base station 504. The base station 504 may determine signal strengths of the RACH sequence for each receive chain of the base station 504. The base station 504 may determine the selected beam E 529 because the highest signal strength of the RACH sequence may occur at the receive chain corresponding to a third beam of a range (and the range may be indicated by the symbols 2 and 3).

Indication of the selected beam index using a RACH subframe may experience various limitations. For example, the UE 502 may not be timing aligned with the base station 504 when transmitting a RACH sequence. A cyclic prefix in a RACH sequence may be greater than the summation of round trip time (RTT) and delay spread (e.g., in regular transmission, a cyclic prefix may need to be greater than a delay spread). Thus, the available number of cyclic shifts for UEs may be low. For example, the available number of cyclic shifts may be less than or equal to a sequence duration and/or cyclic prefix duration. Accordingly, the number of degrees of freedom in the RACH-reserved region of a RACH subframe 600 may be low. Further, there may be collision if many UEs transmit a beam adjustment request in the RACH subframe 600. Further, the RACH framework may include additional overhead (e.g., base station 504 sends a RACH response and allocates a separate grant to a UE to transmit additional information).

Accordingly, the UE 502 may transmit a beam adjustment request (e.g., a request for BRRS) in an unoccupied bandwidth of a RACH subframe. This region may be unreserved for RACH transmission. In an aspect, this region may be reserved for scheduling request (SR) transmission.

In one aspect, the base station 504 may be configured to determine a beam index based on a cyclic shift. For example, the base station 504 may send, to the UE 502, information indicating one or more cyclic shift values. Each of the cyclic shift values may be associated with a respective beam index. In one aspect, the base station 504 may transmit the information indicating the one or more cyclic shift values to the UE 502 using one or more of a physical broadcast channel (PBCH), remaining minimum system information (RMSI), other system information (OSI), an RRC message, or a handover message. In an aspect, the base station 504 may configure the UE 502 with at least one cyclic shift corresponding to a beam index through a region 710 that is unreserved for RACH and/or the base station 504 may configure the UE 502 with at least one cyclic shift corresponding to a beam index through a region reserved for RACH (e.g., RACH transmission region 712). In an aspect, the base station 504 may indicate, to the UE 502, information indicating that a first cyclic shift (associated with a first beam index) is associated with contention-free RACH, and information indicating that a second cyclic shift (associated with a second beam index) is associated with contention-based RACH. In various aspects, the base station 504 may indicate, to the UE 502, that the UE 502 is to use a first cyclic shift value (associated with a first beam index) when the UE 502 is time synchronized with the base station 504, and indicate, to the UE 502, that the UE 502 is to use a second cyclic shift value (associated with a second beam index) when the UE 502 is not time synchronized with the base station 504.

The UE 502 may receive the information indicating the one or more cyclic shifts, which may each be associated with a respective beam index. As described, supra, the UE 502 may identify or select a "best" beam corresponding to a beam index. The UE 502 may then identify the cyclic shift corresponding to that beam index of the "best" beam. For example, the UE 502 may identify or select a new beam when a current serving beam and/or control beam(s) fail. The UE 502 may then transmit a BAR through the identified cyclic shift. In one aspect, the BAR may be a request for a BRRS, which the cyclic shift indicating the selected "fine" beam for a beam refinement procedure.

The base station 504 may receive the BAR through the cyclic shift applied by the UE 502 to the BAR transmission. The base station 504 may identify the cyclic shift through which the BAR is received. From the cyclic shift, the base station 504 may identify the beam index corresponding to that cyclic shift. The base station 504 may then use the beam corresponding to the identified beam index as a serving beam and/or the base station 504 may transmit a BRRS through that beam corresponding to the identified beam index. For example, the base station 504 may switch the current serving beam to the beam corresponding to the identified beam index, e.g., when the current serving beam and/or control beam(s) fail.

Figure 7:
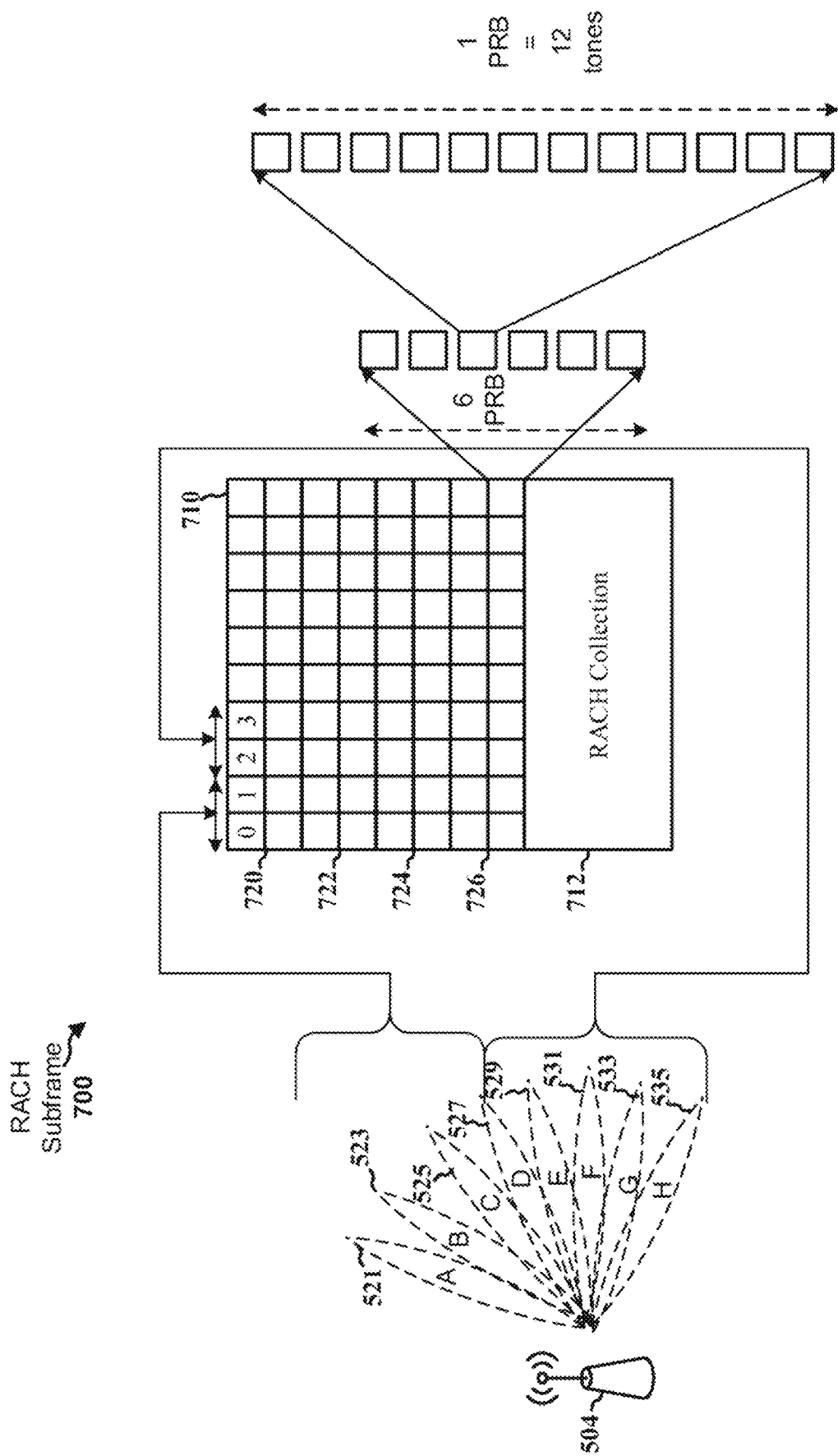
FIG. 7 is a diagram of a wireless communications system.

Referring to FIG. 7, a block diagram for indicating a selected beam is illustrated. In aspects, the base station 504 may transmit a set of beams A-H 521, 523, 525, 527, 529, 531, 533, 535. In aspects, the UE 502 may need to indicate a newly selected beam of the beams A-H 521, 523, 525, 527, 529, 531, 533, 535 to the base station 504, e.g., when a first selected beam deteriorates. However, because the base station 504 may only be able to detect transmission from the UE 502 in the direction of the first selected beam, the UE 502 may use a RACH subframe 700 in order to identify a new beam.

In aspects, the UE 502 may use a region 710 that may be unreserved for RACH transmission. In an aspect, this region 710 may be reserved for SR transmission (e.g., the region 710 may be used to collect buffer status report). In an aspect, a BAR procedure may be configured in the UE 502. For example, if a dedicated SR for BRRS request is configured to the UE 502, a PHY layer of the UE 502 may signal a dedicated SR for BRRS request in the SR region 710 of the RACH subframe 700.

In an aspect, the UE 502 may only transmit in the region 710 when the UE 502 is timing aligned with the base station 504. The number of available cyclic shifts associated with the region 710 may be higher than those available in the region 712 reserved for RACH transmission. Accordingly, there may be a higher degree of freedom associated with the region 710 compared to the region 712. For example, a plurality of UEs may be able to transmit requests (e.g., requests for beam tracking and/or BRRS) through the region 710 (e.g., more UEs than able to transmit requests through the RACH transmission region 712).

In an aspect, the UE 502 may select a transmission time for SR based on symbol index of the strongest beam (e.g., a beam in which a strongest BRS is received during a synchronization subframe). In an aspect, the UE 502 may transmit an SR during a RACH subframe 700 if instructed by a higher layer. For example, a PHY layer of the UE 502 may be provided with a plurality of parameters, including a band number $N_{SR}$, cyclic shift v, a root u, a parameter f, a system frame number (SFN), a BRS transmission period $N_{BRS}$, a number of symbols $N_{RACH}$ during the RACH subframe 700 for which the base station 504 may apply a different beams (e.g., different receive beams), a number of RACH subframes M in each radio frame, an index the current RACH subframe m, a symbol with the strongest synchronization beam $S_{Sync}^{BestBeam}$. The root u may be cell specific. The UE 502 may calculate a symbol index l based on the SFN, $N_{BRS}$, $N_{RACH}$, M, m, and $S_{Sync}^{BestBeam}$. For example, $$l=((S_{Sync}^{BestBeam}-(SFN \cdot M \cdot N_{RACH}+m \cdot N_{RACH})\%\ N_{BRS})\%\ N_{BRS}) \cdot N_{rep},$$

Where $N_{rep}$ may denote the number of symbols dedicated to a single RACH transmission (e.g., $N_{rep}=2$).

In one aspect, at least one of the base station 504 and/or the UE 502 maintains a mapping between beams (e.g., beams A-H 521, 523, 525, 527, 529, 531, 533, 535) associated with a synchronization (or BRS) session and region 710. That is, the UE 502 may be configured to indicate a beam index using one or more resources of a RACH subframe 700, such as by transmitting a request (e.g., the request 570) on at least one resource corresponding to the beam index selected by the UE 502.

For example, the UE 502 may be configured to transmit the request 570 in a symbol 0 and 1 of the RACH subframe 700 if the selected beam index (e.g., the beam 523) corresponds to one of beams A-D 521, 523, 525, 527. Similarly, the UE 502 may be configured to transmit the request 570 in a symbol 2 and 3 of the RACH subframe 700 if the selected beam index corresponds to one of beams E-H 529, 531, 533, 535.

In one aspect, UE 502 may indicate a specific beam within the range using at least one subcarrier. For example, the UE 502 may indicate a beam within the range of beams A-D 521, 523, 525, 527 by using at least one of a pair of subcarriers 720, 722, 724, 726. Similarly, the UE 502 may indicate a beam within the range of beams E-H 529, 531, 533, 535 by using at least one of a pair of subcarriers 720, 722, 724, 726. For example, subcarriers 720 may indicate a first beam of a range and, therefore, when the UE 502 transmits a request on symbols 0 and 1 and subcarriers 720, the UE 502 is indicating a selected beam A 521. By way of another example, the UE 502 may indicate a selected beam G 533 by transmitting a request on subcarriers 724 (corresponding to a third beam within a range) on symbols 2 and 3. The base station 504 may therefore determine a selected beam index based on the at least one resource on which the request is transmitted.

In another aspect, the base station 504 determines, from within the range, the beam index based on a strength of a signal in different receive chains of the base station 504 through which the request 570 is received. For example, the base station 504 may receive the request 570 through a plurality of receive chains of the base station 504. The base station 504 may determine a signal strength of the request 570 for each receive chain through which the request 570 is received. The base station 504 may determine that each receive chain is associated with at least one beam index (e.g., the beam index for beam 523), and so the base station 504 may determine the beam index that corresponds to the receive chain in which the highest signal strength of the request 570 is detected. For example, the UE 502 may select beam E 529 as the newly selected beam. To indicate the selected beam E 529, the UE 502 may transmit a request on symbols 2 and 3 of the RACH subframe. The base station

504 may receive the request through one or more receive chains of the base station 504. The base station 504 may determine signal strengths of the request for each receive chain of the base station 504. The base station 504 may determine the selected beam E 529 because the highest signal strength of the request may occur at the receive chain corresponding to a third beam of a range (and the range may be indicated by the symbols 2 and 3).

Figure 8:
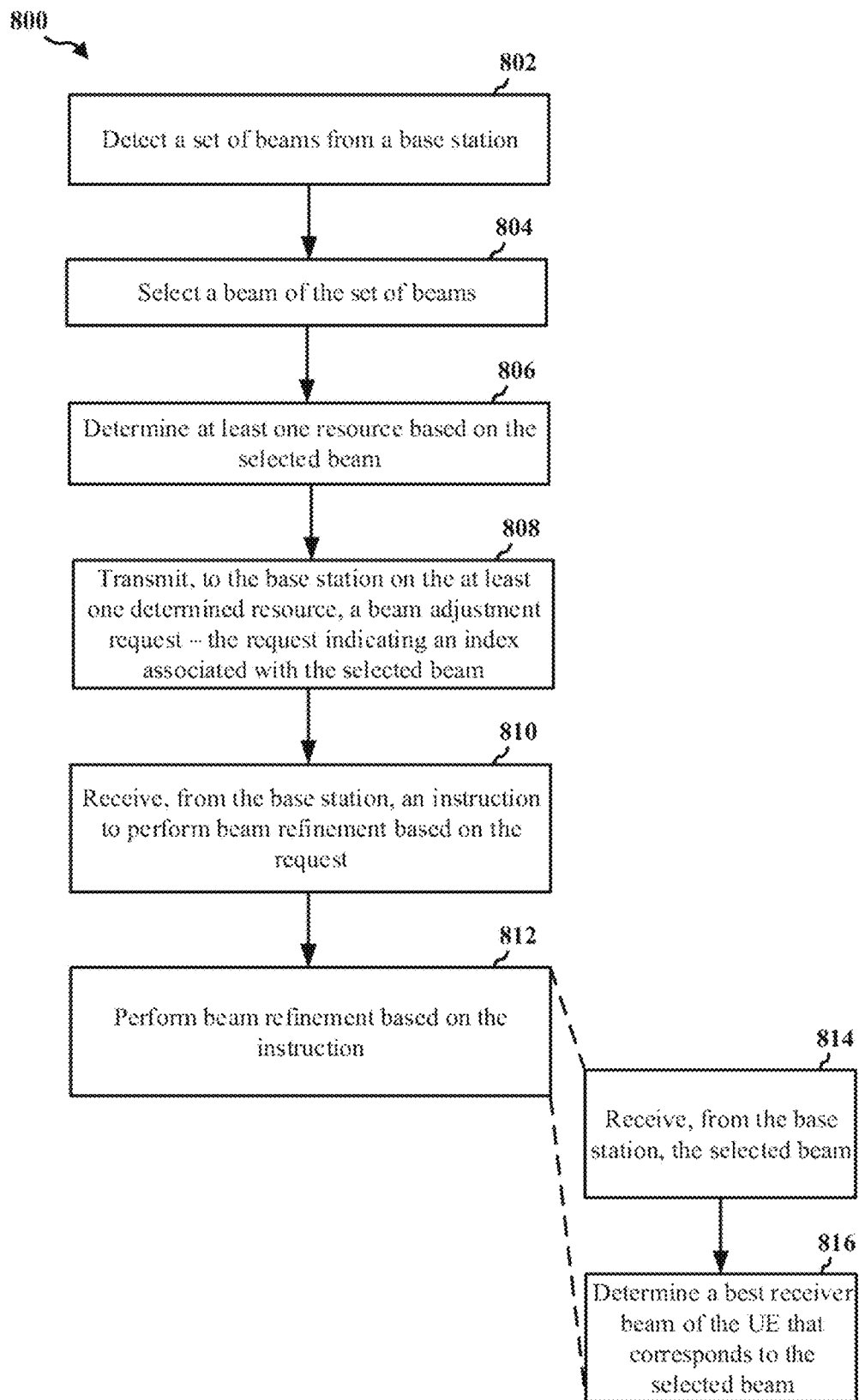
FIG. 8 is a flowchart of a method of wireless communication.

FIG. 8 is a flowchart 800 of a method of wireless communication. The method may be performed by a UE (e.g., the UE 502). One of ordinary skill would understand that one or more operations may be omitted, transposed, and or performed contemporaneously.

At operation 802, the UE may detect a set of beams from a base station, such as by detecting a BRS transmitted in a synchronization subframe of each beam of the first set of beams. In the context of FIG. 5E, the UE 502 may detect the first set of beams 521, 523, 525, 527, such as by detecting a BRS transmitted in a synchronization subframe of each beam 521, 523, 525, 527. The first set of beams may be odd-indexed beams.

At operation 804, the UE may select a beam of the set of beams. For example, the UE may determine that the beam carrying a BRS that is strongest or preferable. The UE may select a beam based by measuring values for a received power or received quality associated with each of the first set of beams, comparing respective values to one another, and selecting the beam that corresponds to the greatest value. The selected beam may correspond to a beam index at the base station. In the context of FIG. 5F, the UE 502 may select the beam 523.

At operation 806, the UE may determine at least one resource based on the selected beam. In the context of FIG. 5F, the UE 502 may determine at least one resource based on the selected beam 523. In the context of FIG. 6, the UE 502 may determine symbols 0 and 1 and/or subcarriers 622. In the context of FIG. 7, the UE 502 may determine symbols 0 and 1 and/or subcarriers 722 of the region 710.

In an aspect, the at least one resource indicates at least one of a radio frame index, a subframe index, a symbol index, or a subcarrier region. In an aspect, the at least one resource is included in a PUCCH. In an aspect, the at least one resource is included in a subframe associated with RACH. In one aspect, the at least one resource is included in a bandwidth associated with RACH. In an aspect, the at least one resource is included in a bandwidth that is unreserved for RACH transmission, such as a bandwidth reserved for SR transmission. In one aspect, the UE may have stored therein or may have access to a mapping or table (e.g., a lookup table) that indicates a respective resource (e.g., a value or index) to which the beam index corresponds. For example, the UE may determine the beam index and then access a lookup table to determine a resource index or region that corresponds to the determined beam index At operation 808, the UE may transmit, on the at least one determined resource, a beam adjustment request (e.g., a request for BRRS) to the base station. The request may indicate the index associated with the selected beam. In the context of FIG. 5F, the UE 502 may transmit the request 570.

At operation 810, the UE may receive an instruction to perform beam refinement (e.g., a BRRS) based on the request. In the context of FIG. 5G, the UE 502 may receive, from the base station 504, an instruction to perform beam refinement based on the request 570.

At operation 812, the UE may perform beam refinement based on the instruction. The UE may perform beam refinement based on the selected beam. In the context of FIG. 5G, the UE 502 may perform beam refinement based on an instruction from the base station 504.

In an aspect, operation 812 may include operations 814 and 816. At operation 814, the UE may receive, from the base station, the selected beam. In an aspect, the selected beam is included in a first set of beams from the base station. In the context of FIG. 5G, the UE 502 may receive the set of beams 522, 523, 524.

At operation 816, the UE may determine a best receiver beam of the UE that corresponds to the selected beam received from the base station. In the context of FIG. 5G, the UE 502 may receive a best receiver beam of the UE 502 for a beam within the set of beams 522, 523, 524—e.g., the UE 502 may determine a best receiver beam for beam 523.

Figure 9:
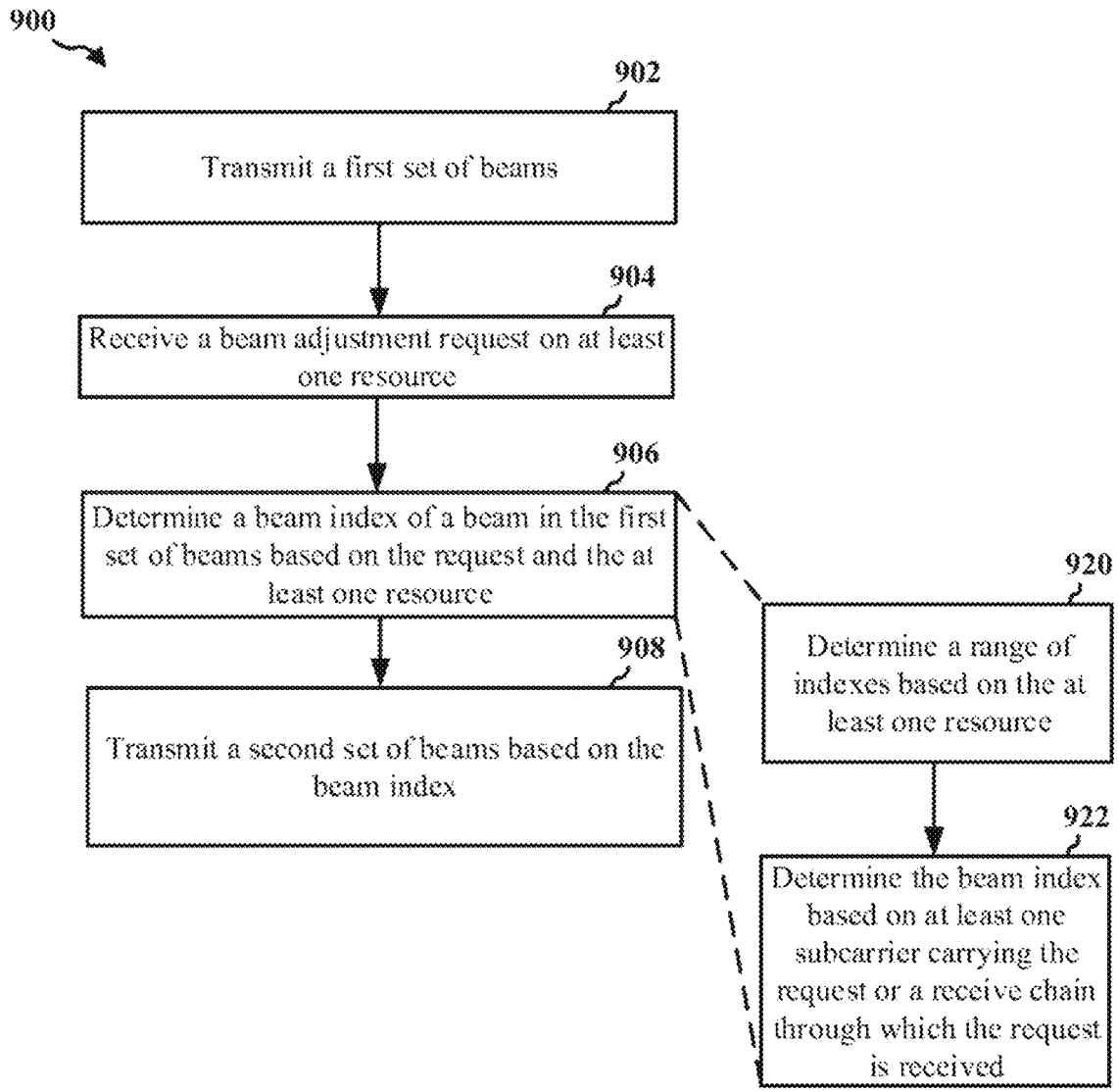
FIG. 9 is a flowchart of a method of wireless communication.

FIG. 9 is a flowchart 900 of a method of wireless communication. The method may be performed by a base station (e.g., the base station 504). One of ordinary skill would understand that one or more operations may be omitted, transposed, and or performed contemporaneously.

At operation 902, the base station may transmit a first set of beams, such as by transmitting a BRS a synchronization subframe of each beam of the first set of beams. The first set of beams may be odd-indexed beams. In the context of FIG. 5E, the base station 504 may transmit the first set of beams 521, 523, 525, 527.

At operation 904, the base station may receive a beam adjustment request on at least one resource. In the context of FIG. 5F, the base station 504 may receive the request 570 from the UE 502.

At operation 906, the base station may determine a beam index of a beam in the first set of beams based on the request and/or the at least one resource carrying the request. In one aspect, the base station may have stored therein or may have access to a mapping or table (e.g., a lookup table) that indicates a respective resource (e.g., a value or index) to which the beam index corresponds. For example, the base station may determine the resource on which the request is received and then access a lookup table to determine a beam index (e.g., the index corresponding to the selected beam) or region that corresponds to the determined beam index.

In the context of FIG. 5F, the base station 504 may determine at least one resource based on the request 570 and at least one resource carrying the request 570, for example, when the UE 502 indicates selected beam 523. In the context of FIG. 6, the base station 504 may detect the request 570 on symbols 0 and 1 and/or subcarriers 622, which may indicate the selected beam 523. In the context of FIG. 7, the base station 504 may detect the request 570 symbols 0 and 1 and/or subcarriers 722 of the region 710, which may indicate the selected beam 523.

In an aspect, the at least one resource is included in a PUCCH. In an aspect, the at least one resource is included in a subframe associated with RACH. In one aspect, the at least one resource is included in a bandwidth associated with RACH. In an aspect, the at least one resource is included in a bandwidth that is unreserved for RACH transmission, such as a bandwidth reserved for SR transmission.

In an aspect, operation 906 may include operations 920 and 922. At operation 920, the base station may determine a range of indexes based on the at least one resource. In the context of FIG. 5F, the base station 504 may determine a range of indexes based on the at least one resource carrying the request 570. In the context of FIG. 6, the base station 504 may determine symbols 0 and 1 to indicate a range of beam indexes. In the context of FIG. 7, the base station 504 may determine symbols 0 and 1 to indicate a range of beam indexes.

At operation 922, the base station may determine the beam index based on at least one subcarrier carrying the request or a receive chain of the base station through which the request is received. In the context of FIG. 6, the base station 504 may determine subcarriers 622 to indicate a beam index within the range of beam indexes. In the context of FIG. 7, the base station 504 may determine subcarriers 722 to indicate a beam index within the range of beam indexes. Alternatively, the base station 504 may determine a beam index based on a receive chain of the base station 504 through which the request is received.

At operation 908, the base station may transmit a second set of beams based on the beam index. The second set of beams may be "fine" beams. In the context of FIG. 5G, the base station 504 may transmit the second set of beams 522, 523, 524. In an aspect, the base station 504 may receive another beam index based on the second set of beams, such as two (2) bits from the UE 502.

Figure 10:
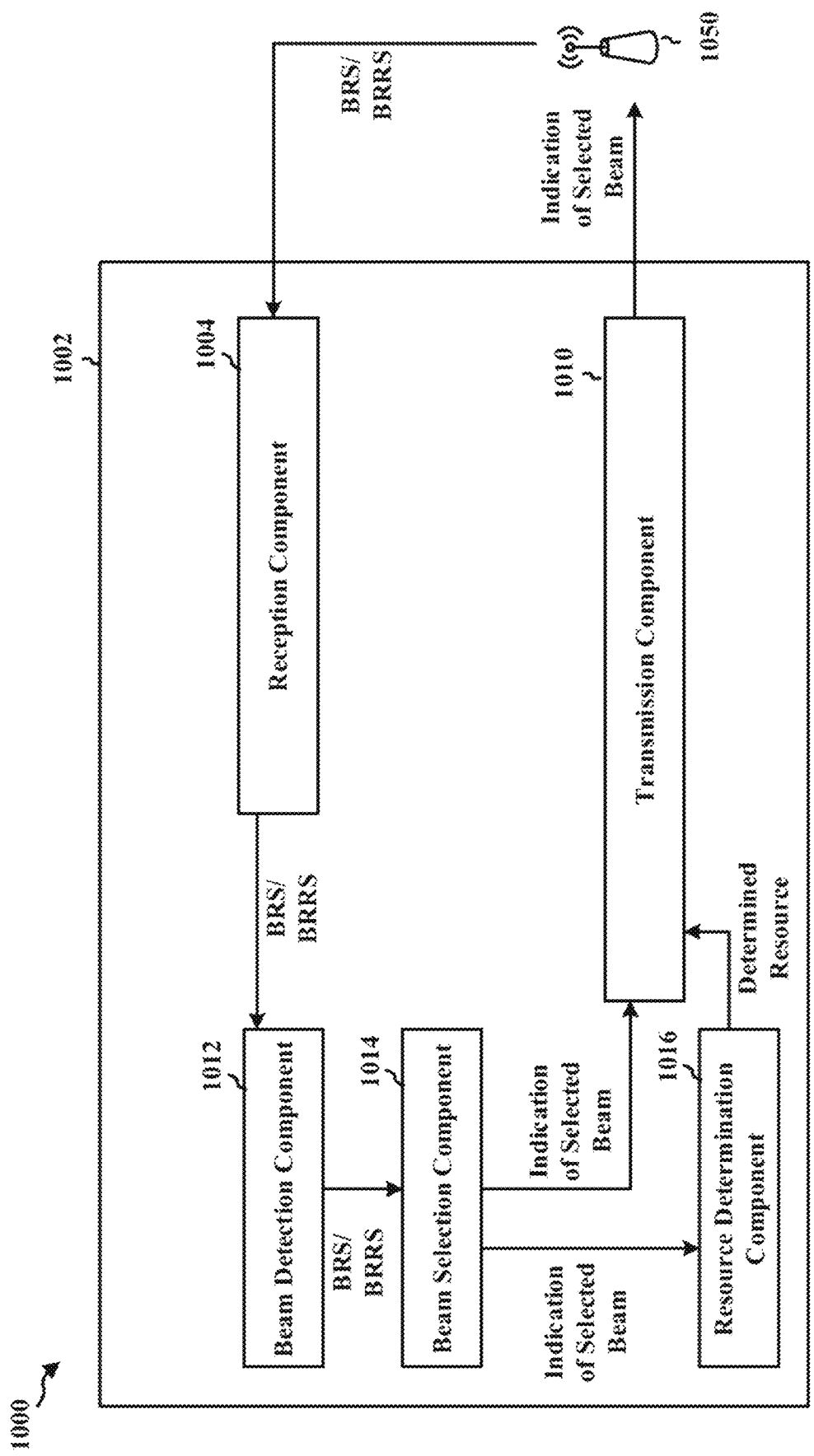
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus 1002 includes a reception component 1004 that may be configured to receive signals from a mmW base station (e.g., the base station 1050). The apparatus 1002 may include a transmission component 1010 configured to transmit signals to a mmW base station (e.g., the base station 1050).

The apparatus 1002 may include a beam detection component 1012 configured to detect one or more beams transmitted by a mmW base station 1050. In an aspect, the beam detection component 1012 may be configured to detect one or more BRSs transmitted on a "coarse" set of beams by the mmW base station 1050. The beam detection component 1012 may monitor one or more synchronization subframes and detect one or more BRSs transmitted by the mmW base station 504.

The beam selection component 1014 may be configured to select a beam based on the BRSs detected by the beam detection component 1012. For example, the beam selection component 1014 may be configured to measured received power or received quality of one or more BRSs and selected the beam corresponding to the highest received power or received quality. The beam selection component 1014 may provide an indication of this selected beam to a resource determination component 1016.

The selected beam may correspond to an index. The resource determination component 1016 may be configured to determine the resource that is to carry a beam adjustment request (e.g., a request for BRRS) in order to indicate the selected beam. For example, a resource may include one of a radio frame, a subframe, a symbol, or a subcarrier region. Each resource may correspond to a value, for example, a radio frame index, a subframe index, a symbol index, or a subcarrier region. In one aspect, the resource determination component 1016 may have stored therein or may have access to a mapping or table (e.g., a lookup table) that indicates a respective resource (e.g., a value or index) to which the beam index corresponds. For example, the resource determination component 1016 may determine the beam index and then access a lookup table to determine a resource index or region that corresponds to the determined beam index.

In one aspect, the resource is included in subframe associated with a RACH. In one aspect, the resource is included in a bandwidth reserved for RACH transmission. In one aspect, the resource is included in a bandwidth that is unreserved for RACH transmission. In one aspect, the bandwidth is reserved for scheduling request transmission. In one aspect, the resource is included in a PUCCH.

The resource determination component 1016 may provide an indication of the determined resource to a transmission component 1010. The transmission component 1010 may be configured to transmit a beam adjustment request to the mmW base station 1050 on the determined resource in order to indicate an index associated with the selected beam. The beam adjustment request may include a request for a BRRS.

In one aspect, the beam detection component 1012 may receive, from the mmW base station 1050, an instruction to perform beam refinement at a receiver (e.g., the reception component 1004) of the apparatus 1002. The beam detection component 1012 may perform beam refinement based on the request.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
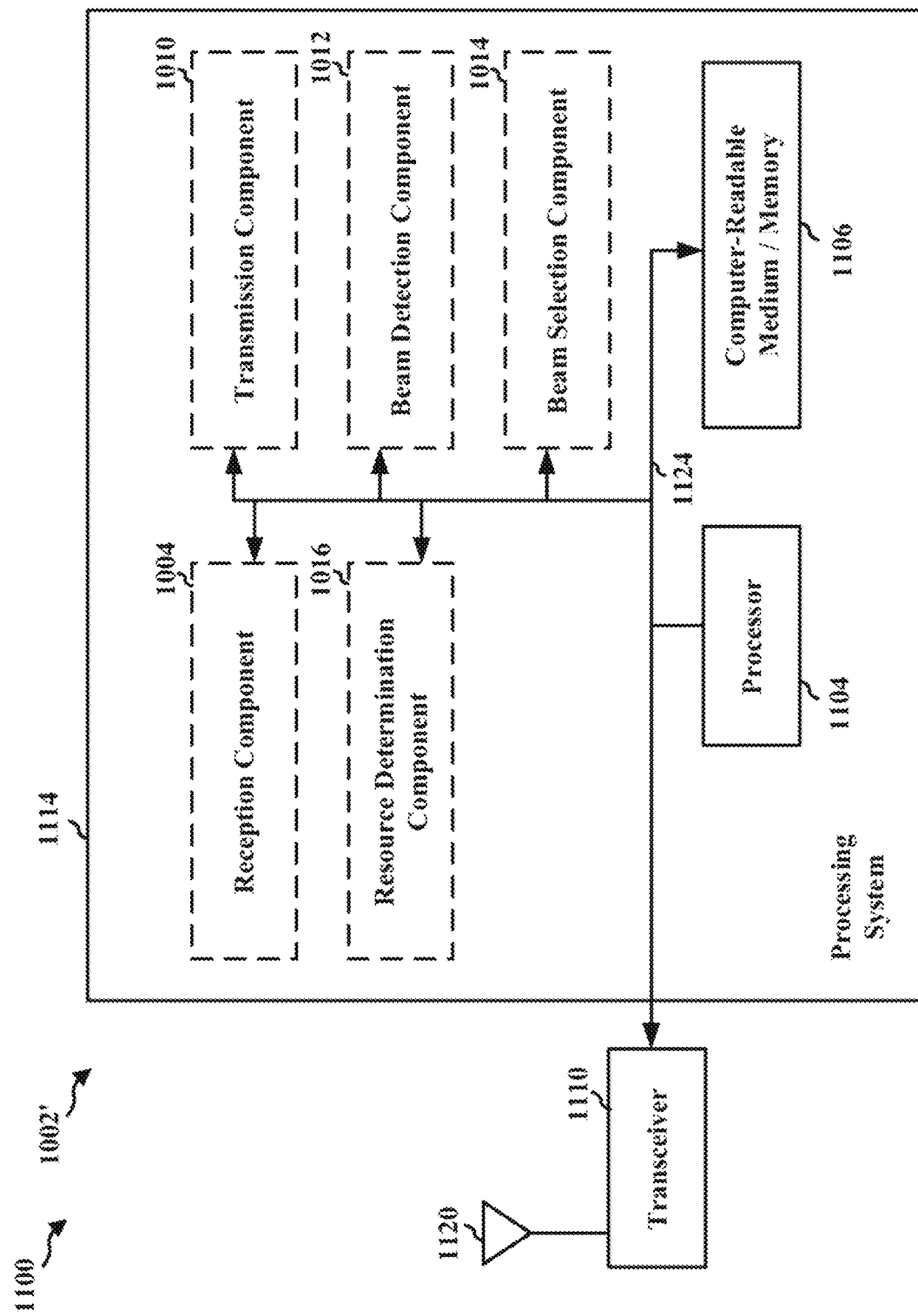
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for detecting a set of beams from a base station. The apparatus 1002/1002' may further include means for selecting a beam of the set of beams. The apparatus 1002/1002' may further include determining at least one resource based on the selected beam. In an aspect, the at least one resource may include at least one of a radio frame index, a subframe index, a symbol index, or a subcarrier region. The apparatus 1002/1002' may further include means for transmitting, on the at least one determined resource, a beam adjustment request to the base station, wherein the at least one determined resource indicates an index associated with the selected beam.

In an aspect, the beam adjustment request to the base station comprises a request for a BRRS. In an aspect, the at least one resource is included in subframe associated with a RACH. In an aspect, the at least one resource is included in a bandwidth reserved for RACH transmission. In an aspect, the at least one resource is included in a bandwidth that is unreserved for RACH transmission. In an aspect, the bandwidth is reserved for scheduling request transmission. In an aspect, the at least one resource is included in a PUCCH.

In an aspect, the apparatus 1002/1002' may further include means for receiving, from the base station, an instruction to perform beam refinement at a receiver of the UE based on the request. The apparatus 1002/1002' may further include apparatus 1002/1002' performing beam refinement based on the request. In an aspect, the performance of beam refinement at the UE receiver is further based on the selected beam.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
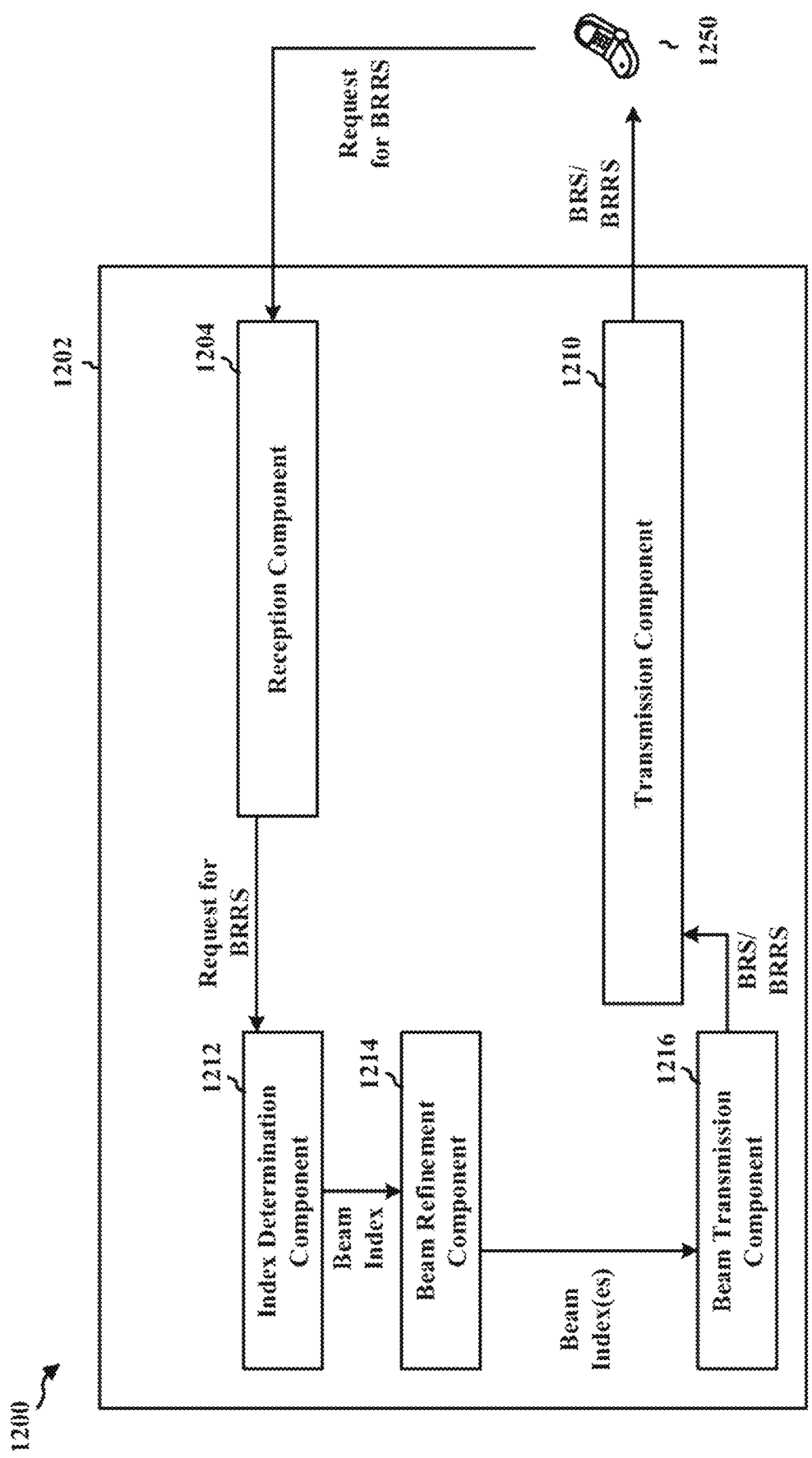
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station (e.g., a mmW base station). The apparatus 1202 includes a reception component 1204 that may receive signals from a UE (e.g., the UE 1250). The apparatus 1202 may include a transmission component 1210 that may transmit signals to a UE (e.g., the UE 1250).

In an aspect, the beam transmission component 1216 may be configured to transmit a first of beams to the UE 1250. For example, the beam transmission component 1216 may be configured to transmit a respective BRS in a respective synchronization subframe of a respective beam. The first set of beams may be a "coarse" set of beams.

The UE 1250 may receive the first set of beams and select a best or preferred beam. The UE 1250 may then transmit a beam adjustment request (e.g., a BRRS request. The reception component 1204 may receive this request, which is carried on at least one resource, and provide the same to an index determination component 1212.

The index determination component 1212 may be configured to determine a beam index of a beam in the first set of beams based on the at least one resource that carries the request. The index determination component 1212 may be configured to determine the resource carries the beam adjustment request in order to determine a beam selected by the UE 1250. For example, a resource may include one of a radio frame, a subframe, a symbol, or a subcarrier region. Each resource may correspond to a value, for example, a radio frame index, a subframe index, a symbol index, or a subcarrier region. In one aspect, the index determination component 1212 may have stored therein or may have access to a mapping or table (e.g., a lookup table) that indicates a respective resource (e.g., a value or index) to which the beam index corresponds. For example, the index determination component 1212 may determine the beam index and then access a lookup table to determine a resource index or region that corresponds to the beam index.

In one aspect, the resource is included in subframe associated with a RACH. In one aspect, the resource is included in a bandwidth reserved for RACH transmission. In one aspect, the resource is included in a bandwidth that is unreserved for RACH transmission. In one aspect, the bandwidth is reserved for scheduling request transmission. In one aspect, the resource is included in a PUCCH.

In an aspect, the index determination component 1212 determines, from within a range, the beam index based on a strength of a signal in different receive chains of the apparatus 1204 (e.g., the receive chains included in the receive chains of the reception component 1204) through which the request is received. For example, the reception component 1204 may receive the request through a plurality of receive chains. The index determination component 1212 may determine a signal strength of the request for each receive chain through which the request is received. The index determination component 1212 may determine that each receive chain is associated with at least one beam index, and so the index determination component 1212 may determine the beam index that corresponds to the receive chain in which the highest signal strength of the request is detected.

The index determination component 1212 may provide an indication of the beam index selected by the UE 1250 to a beam refinement component 1214. The beam refinement component 1214 may determine a second set of beams to transmit to the UE 1250. The second set of beams may be a "fine" beam set, which may be directionally and/or spatially closer to the beam selected by the UE 1250, the index of which may be determined by the index determination component 1212. The beam refinement component 1214 may provide an indication of the indexes of the second set of beams to the beam transmission component 1216.

The beam transmission component 1216 may be configured to transmit the second of beams to the UE 1250. For example, the beam transmission component 1216 may be configured to transmit a respective BRRS in a respective synchronization subframe of a respective beam. The second set of beams may be a "fine" set of beams.

In an aspect, the beam transmission component 1216 may transmit, to the UE 1250, an instruction to perform beam refinement based on the request. In an aspect, the instruction to perform beam refinement may be based on the selected beam determined by the index determination component 1212. The beam transmission component 1216 may perform beam tracking with the UE 1250.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
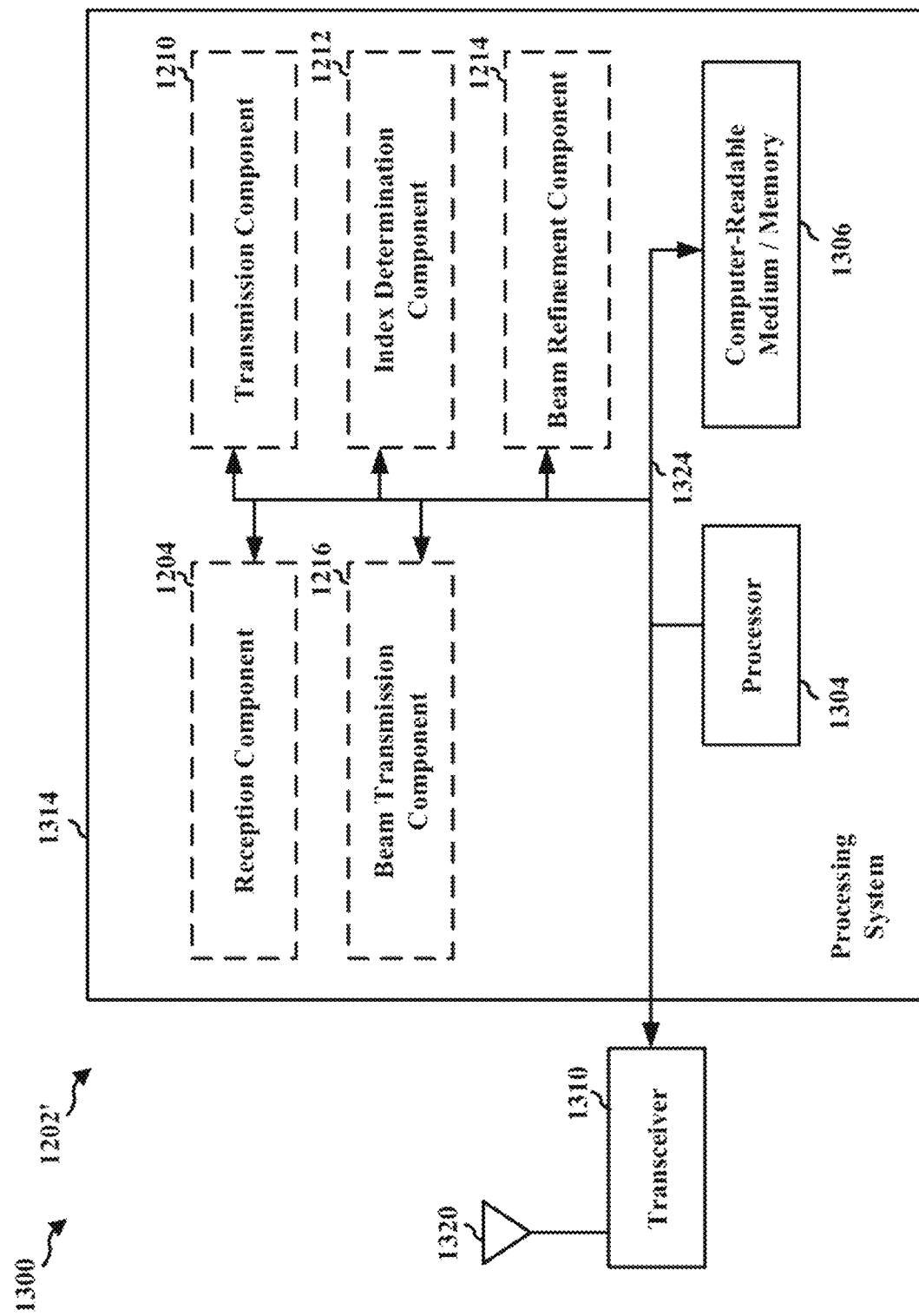
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for transmitting a first set of beams. The apparatus 1202/1202' may further include means for receiving a beam adjustment request on at least one resource. In an aspect, the at least one resource may include at least one of a radio frame index, a subframe index, a symbol index, or a subcarrier region. The apparatus 1202/1202' may further include means for determining a beam index of a beam in the first set of beams based on the at least one resource.

In an aspect, the beam adjustment request comprises a request to transmit a BRRS. In an aspect, the apparatus 1202/1202' may further include means for transmitting an instruction to perform beam tracking based on the request and determined beam index. In an aspect, the apparatus 1202/1202' may further include means for performing beam tracking with the UE. In an aspect, the apparatus 1202/1202' may further include means for transmitting a second set of beams based on the determined beam index to perform the beam tracking.

In an aspect, the at least one resource is included on a PUCCH. In an aspect, the at least one resource is included on subframe associated with a RACH. In an aspect, the at least one resource is included in a bandwidth associated with RACH transmission. In an aspect, the at least one resource is included in a bandwidth that is unreserved for RACH transmission. In an aspect, the bandwidth is reserved for scheduling request transmission. In an aspect, the at least one resource indicates a range of indexes and a subcarrier of the at least one resource indicates the beam index within the range.

In an aspect, a subframe of the at least one resource indicates a range of indexes, and the apparatus 1202/1202' further includes means for determining, from within the range, the beam index based on a strength of a signal in different receive chains of the base station through which the request is received.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
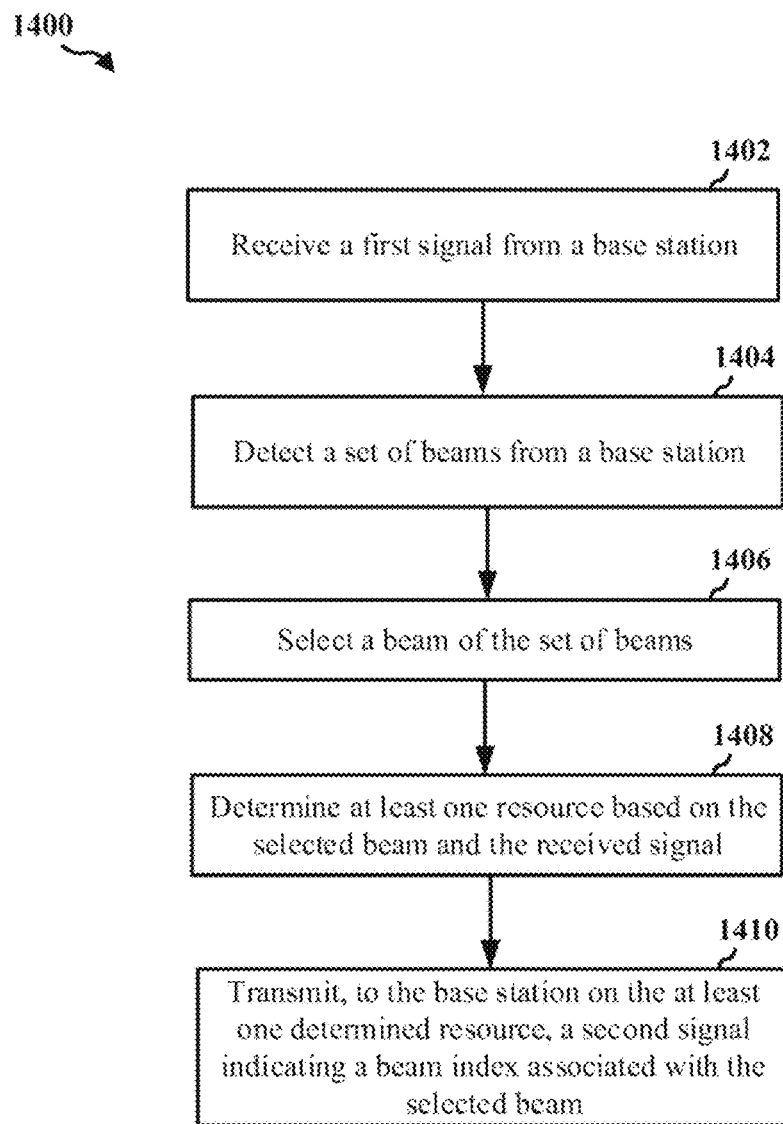
FIG. 14 is a flowchart of a method of wireless communication.
Figure 15:
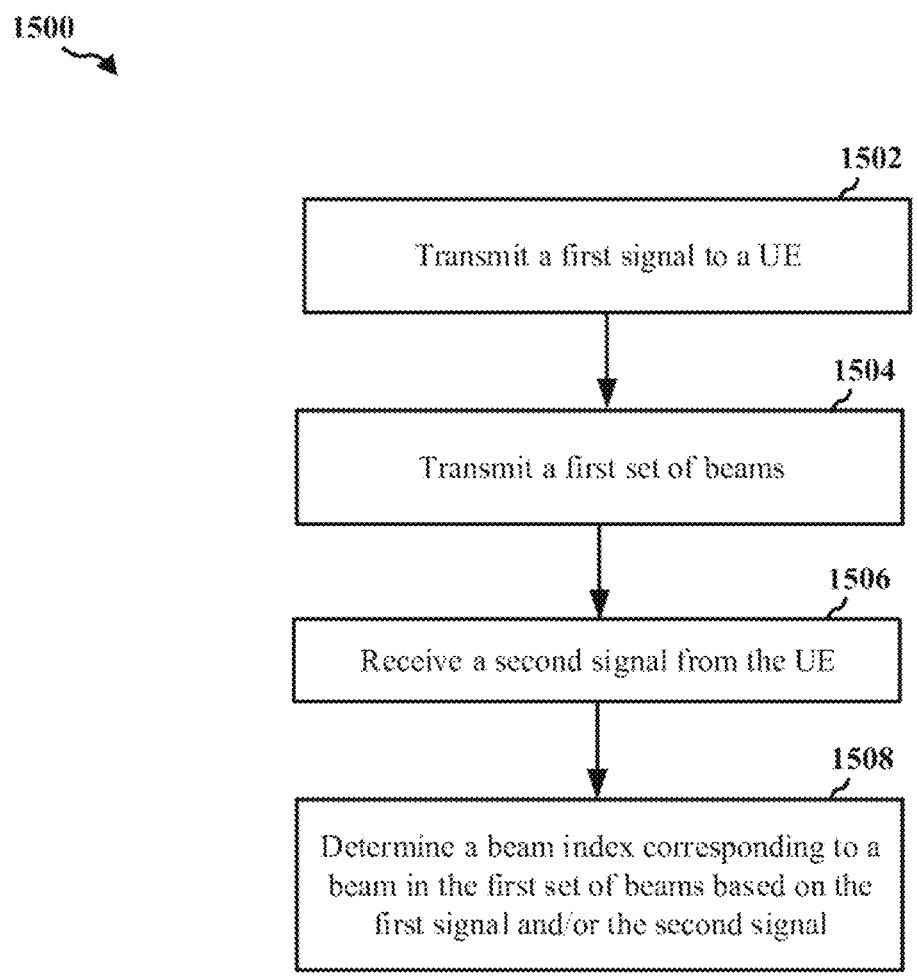
FIG. 15 is a flowchart of a method of wireless communication.

With respect to FIGS. 14 and 15, two methods of wireless communication are illustrated. As described in the present disclosure, a base station may sweep a set of beams by transmitting these beams into different directions. The UE may observe these beams and then select a "good" beam, e.g., the current "best" beam (e.g., based on a highest measured received power for a BRS). According to a further aspect, there may be a subframe in which the base station sweeps its receiving beam to listen to the same set of directions. The UE may select a resource, e.g., symbol and slot index, to inform the base station regarding the index of a selected beam. The base station, upon receiving the signal from UE, can start communicating with the UE through the selected beam or start transmitting a BRRS to the UE, the BRRS being centered on the serving beam.

According to various aspects, the UE may select a resource to indicate a beam index to the base station through one or more approaches (e.g., a combination of the following approaches). According to a first approach, the UE may select a transmission time, e.g., a symbol and/or slot index, based on the set of beams that it detected from the base station. According to a second approach, the UE may select one or more combinations of subcarrier index, cyclic shift, and/or root index from the base station based on prior signaling from the base station. According to this second approach, the base station may assign different combinations of cyclic shift(s) and/or subcarrier region(s) to different UEs. As a result, different UEs can select the same beam index and convey it to the base station simultaneously by occupying different subcarrier regions, different cyclic shifts, and/or different root indices to the base station. In various aspects, the base station may assign each UE a subcarrier region, cyclic shift, and/or root index through one or more combinations of MIB, SIB, PDCCH, and/or RRC signaling. In aspects, the MIB may be transmitted via a physical broadcast channel (PBCH). In aspects, the SIB may be transmitted via extended or enhanced PBCH (ePBCH).

FIG. 14 is a flowchart 1400 of a method of wireless communication. The method may be performed by a UE (e.g., the UE 502). One of ordinary skill would understand that one or more operations may be omitted, transposed, and or performed contemporaneously.

At operation 1402, the UE may receive a first signal from a base station. In various aspects, the first signal may indicate one or more of a subcarrier region(s) and/or preamble(s) that are to be used to indicate a beam index to the base station. In an aspect, the preamble may indicate one or more combinations of a cyclic shift and/or a root index of a sequence. In an aspect, the UE may receive the first signal through one or more of a MIB, SIB, PDCCH, and/or RRC signaling. In aspects, the MIB may be transmitted via a PBCH. In aspects, the SIB may be transmitted via ePBCH. For example, the UE 502 may receive a first signal from the base station 504.

At operation 1404, the UE may detect a set of beams from a base station, such as by detecting a BRS transmitted in a synchronization subframe of each beam of the first set of beams, and identifying a respective index corresponding to each beam. In the context of FIG. 5E, the UE 502 may detect the first set of beams 521, 523, 525, 527, such as by detecting a BRS transmitted in a synchronization subframe of each beam 521, 523, 525, 527. The first set of beams may be odd-indexed beams.

At operation 1406, the UE may select a beam of the set of beams. For example, the UE may determine that the beam carrying a BRS that is strongest or preferable (e.g., based on received power of a BRS). The UE may select a beam based by measuring values for a received power or received quality associated with each of the first set of beams, comparing respective values to one another, and selecting the beam that corresponds to the greatest value. The selected beam may correspond to a beam index at the base station. In an aspect, the UE may select the beam in association with handover to a neighboring cell. In the context of FIG. 5F, the UE 502 may select the beam 523.

At operation 1408, the UE may determine at least one resource based on the selected beam and the first signal. For example, the UE 502 may determine at least one resource based on the selected beam 523 and the first signal.

In an aspect, the at least one resource indicates at least one of a radio frame index, a subframe index, a symbol index, or a subcarrier region that corresponds to the selected beam. In an aspect, the at least one resource is included in a PUCCH. In an aspect, the at least one resource is included in a subframe associated with RACH. In one aspect, the at least one resource is included in a bandwidth associated with RACH. In an aspect, the at least one resource is included in a subframe associated with a channel reserved for carrying responses to mobility reference signals.

At operation 1410, the UE may transmit, to the base station on the at least one determined resource, a second signal indicating a beam index associated with the selected beam. in an aspect, the second signal may include a request for the base station to transmit a BRRS. In an aspect, the second signal indicates, to the base station, that the base station is to determine the beam index. For example, the UE 502 may transmit the second signal (e.g., the request 570) to the base station 504.

FIG. 15 is a flowchart 1500 of a method of wireless communication. The method may be performed by a base station (e.g., the base station 504). One of ordinary skill would understand that one or more operations may be omitted, transposed, and or performed contemporaneously.

At operation 1502, the base station may transmit a first signal to a UE. In various aspects, the first signal may indicate one or more of a subcarrier region(s) and/or preamble(s) that are to be used by the UE to indicate a beam index to the base station. In an aspect, the preamble may indicate one or more combinations of a cyclic shift and/or a root index of a sequence. In an aspect, the base station may transmit the first signal through one or more of a MIB, SIB, PDCCH, and/or RRC signaling. In aspects, the MIB may be transmitted via a PBCH. In aspects, the SIB may be transmitted via ePBCH. For example, the base station 504 may transmit a first signal from the UE 502.

At operation 1504, the base station may transmit a first set of beams, such as by transmitting a BRS a synchronization subframe of each beam of the first set of beams. The first set of beams may be odd-indexed beams. In the context of FIG. 5E, the base station 504 may transmit the first set of beams 521, 523, 525, 527.

At operation 1506, the base station may receive a second signal from the UE. In an aspect, the second signal may be received on at least one resource from which the base station may determine the beam index. In an aspect, the second signal may be a BRRS. In an aspect, the second signal may indicate that the base station is to determine the beam index (e.g., based on the at least one resource on which the second signal is carried). In the context of FIG. 5F, the base station 504 may receive the second signal (e.g., the request 570) from the UE 502.

At operation 1508, the base station may determine a beam index of a beam in the first set of beams based on the first signal and/or the second signal. For example, the base station may determine the at least one resource carrying the request. For example, the base station may determine the beam index based at least on one or more of a subcarrier region(s), preamble(s), cyclic shift(s), sequence(s), and/or any combination thereof, which may be used by the UE to indicate a beam index to the base station. For example, the base station 504 may determine beam index based on a second signal (e.g., the request 570) received from the UE 502. For example, the base station 504 may determine a beam index of a beam selected by the UE 502 based on at least one resource carrying the second signal (e.g., the request 570).

Figure 16:
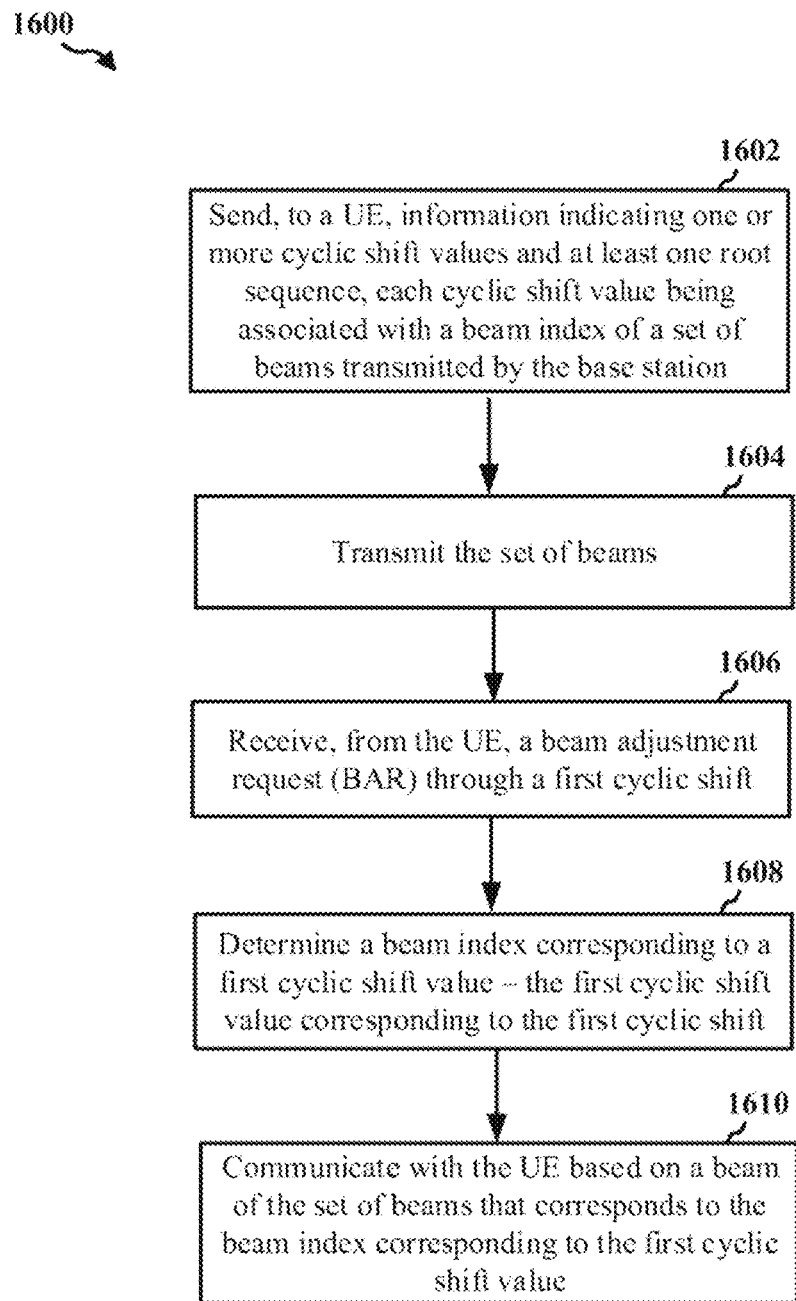
FIG. 16 is a flowchart of a method of wireless communication.
Figure 17:
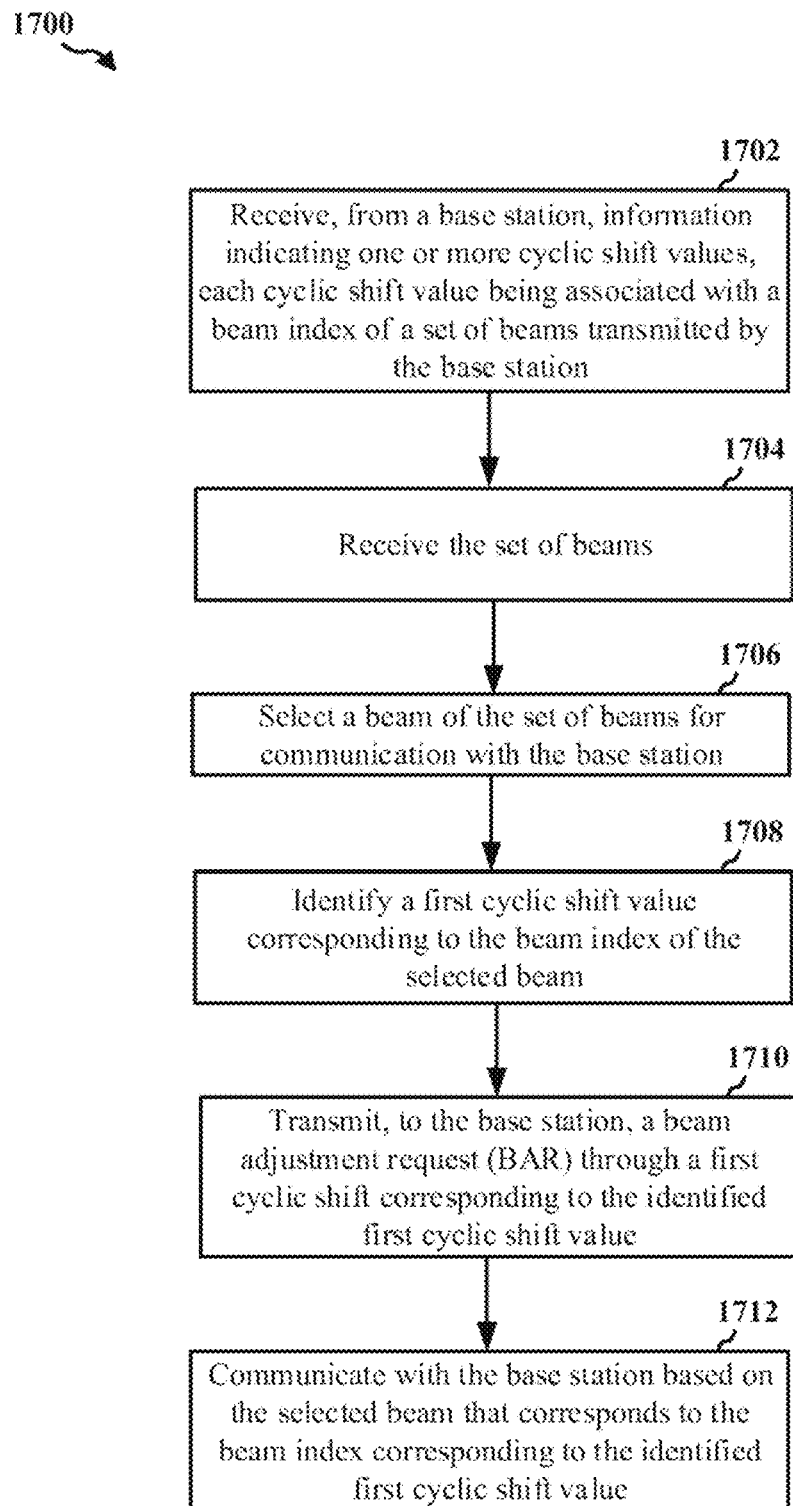
FIG. 17 is a flowchart of a method of wireless communication.

Turning to FIGS. 16 and 17, aspects are illustrated for configuring a UE with one or more RACH preambles based on more than one cyclic shift values and one or more root sequences for UE to convey a beam adjustment request (also known as beam failure recovery request). For example, a cyclic shift value may correspond to a beam adjustment request (e.g., for beam recovery failure). A cyclic shift may be applied to a root sequence that is identified based on a starting root sequence index. For example, a base station may transmit a first set of beams, receive a beam adjustment request through at least one of the conveyed cyclic shift values, and determine a beam index of a beam in the first set of beams based on the at least one cyclic shift value. In an aspect, a gNodeB (Gnb) or base station conveys the cyclic shift configurations through one or more combinations of PBCH, remaining minimum system information (RMSI), other system information (OSI), RRC message, or handover message. In an aspect, the UE transmits beam adjustment request using a corresponding cyclic shift value to identify a new beam for the base station when the serving and control beams fail. In an aspect, the base station configures UE with at least one cyclic shift value to convey beam adjustment request through a region that is reserved for RACH, and configures the UE with another cyclic shift value to convey beam adjustment request through a region that is unreserved for RACH. In various aspects, the base station configures the UE with at least one cyclic shift value to convey beam adjustment request through a contention-free RACH procedure, and configures the UE with another cyclic shift value to convey beam adjustment request through a contention-based RACH procedure. In various aspects, the base station configures UE with at least one cyclic shift value to convey beam adjustment request when it is time synchronized with the base station, and configures the UE with another cyclic shift value to convey beam adjustment request when the UE is not time synchronized with the base station. In various aspects, a beam adjustment request may include a BRRS. At the UE, the UE may receive the configuration of more than one cyclic shift values for sending a beam adjustment request. The UE may receive a first set of beams and select a beam of the set of beams. The UE may then send, to the base station, a beam adjustment request through at least one cyclic shift values, and the at least one cyclic shift value may correspond to the selected beam (e.g., by indicating a beam index corresponding to the selected beam).

In some aspects, the same cyclic shift values as defined in LTE may be applied for NR PRACH preamble format 0 and 1. In some aspects, the same cyclic shift values as defined in LTE may be applied for NR PRACH preamble format 2 and 3, considering various parameters (e.g. delay spread, guard time, filter length, etc.). For the shorter sequence length than L=839, NR supports sequence length of L=127 or 139 with subcarrier spacing of {15, 30, 60, 120} kHz (e.g., based on the assumption that 240 kHz subcarrier spacing may be unavailable for data/control). In some aspects, 7.5 kHz subcarrier spacing is also possible.

In some aspects, there may be support for the following channel(s) for beam failure/recovery request for transmission: Non-contention based channel based on PRACH, which uses a resource orthogonal to resources of other PRACH transmissions (e.g., for the frequency-division multiplexing (FDM) case, but possible to have other ways of achieving orthogonality, including code-division multiplexing (CDM) and/or time-division multiplexing (TDM) with other PRACH resources, and possible whether or not have different sequence and/or format than those of PRACH for other purposes). In some aspects, PUCCH may be used for beam failure recovery request transmission. In an aspect, contention-based PRACH resources may supplement contention-free beam failure recovery resources. In an aspect, from traditional RACH resource pool, a four-step RACH procedure is used (in some aspects, contention-based PRACH resources may be used, e.g., if a new candidate beam does not have resources for contention-free PRACH-like transmission).

For beam failure recovery request transmission on PRACH, the resource for indicating beam failure recovery request may be CDM with other PRACH resources. In some aspects, CDM may indicate the same sequence design with PRACH preambles. In some aspects, the preambles for PRACH for beam failure recover request transmission are chosen from those for content-free PRACH operation in (e.g., in 3GPP standard, such as Rel-15). In some aspects, the base station and UE may support either length 127 or length 139 as PRACH preamble sequence length (also possible for different Ncs configurations for long and short sequences).

In some aspects, NR may support contention-free random access through frequency-division multiplexing with regular PRACH region to convey beam failure recovery request. If a UE loses its current serving beam, the UE may map a good downlink synchronization (DL SYNC) resource to the corresponding symbol index of the RACH slot. The UE may select one out of N subcarrier regions of the SR/beam recovery request region and transmit in the selected symbol of the RACH slot. A UE can select a PRACH type signal to transmit beam recovery request to a base station. Table 1 shows a possible numerology of the beam recovery request channel.

TABLE 1

Supported Number of Cyclic Shifts in Beam Failure Recovery Request Region

| Slot duration (us) | Subcarrier spacing (kHz) | Sequence length | Symbol duration (us) | Number of cyclic shifts per subcarrier region |
|---|---|---|---|---|
| 125 | 60 | 139 | 33.33 | ~50 |

In some aspects, a base station can allow a much higher number of cyclic shifts to receive beam recovery request in these slots (e.g., higher than for initial access, cell selection, etc.). For example, if delay spread is roughly around 300 ns, a base station can allow approximately 50 orthogonal resources in each subcarrier region of the beam recovery request region because the sequence duration of the beam recovery request is 16.67 us.

Hence, NR may support short RACH preamble format with higher number of cyclic shifts to convey beam failure recovery request through the non-contention based channel which is frequency-division multiplexed with regular RACH region. The value of Ncs in this region may be relatively low.

In one aspect, NR may support a short RACH preamble format with a relatively higher number of cyclic shifts to convey beam failure recovery request through the non-contention based channel which is frequency-division multiplexed with regular RACH region.

However, a UE may communicate a beam failure recovery request with a base station through PRACH preambles that are code-division multiplexed with regular PRACH preambles. The UEs that transmit regular PRACH may not be time synchronized with the base station. Hence, the base station may only support a low number of cyclic shifts in this region. A UE may be configured with a relatively high Ncs value if the transmits beam recovery through this region.

While transmitting beam failure recovery request, if a UE loses time synchronization, the UE will have to transmit beam failure recovery through regular common PRACH region. Even if a UE is initially configured with a low value of Ncs to convey beam failure recovery, the UE will have to use a high value of Ncs to convey beam failure recovery through regular common PRACH region.

In some aspects, a UE may convey a beam failure recovery request through PRACH preambles that are code-division multiplexed with common PRACH preambles. Ncs value(s) configured for this region may be same as that of regular RACH transmission.

If a UE loses time synchronization during beam failure recovery procedure, the UE may have to convey a beam failure recovery request through common time/frequency PRACH region. Configured Ncs value to transmit beam failure recovery through this region may be same as that of regular RACH transmission.

In view of the foregoing, a base station may support configuring two Ncs values for a UE. One Ncs value may be used to convey beam failure recovery request through a region that is frequency-division multiplexed with a PRACH region. The other Ncs value may be used to convey regular PRACH or beam failure recovery when a UE loses its time synchronization.

Possible Ncs configurations may be defined in one or more 3GPP standards. By way of illustration, Table 2 shows some possible Ncs values for RACH preamble formats of short sequence types. Table 2 considers relatively small Ncs values (e.g. 2, 4, 6, etc.) for beam failure recovery request through frequency-division multiplexed region and also relatively high Ncs values (e.g. 34, 46, 69, etc.) to support RACH in higher cell sizes. In some aspects, the values shown in Table 2 may be applicable to RACH preamble formats of short sequence types.

TABLE 2

Possible Ncs Values for RACH Preamble Formats of Short Sequence Types

| zeroCorrelationZoneConfig | $N_{CS}$ value |
|---|---|
| 0 | 0 |
| 1 | 2 |
| 2 | 4 |
| 3 | 6 |
| 4 | 8 |
| 5 | 10 |
| 6 | 12 |
| 7 | 15 |
| 8 | 23 |
| 9 | 27 |
| 10 | 34 |
| 11 | 46 |
| 12 | 69 |
| 13 | N/A |
| 14 | N/A |
| 15 | N/A |
| 16 | N/A |

FIG. 16 illustrates a method 1600 of wireless communication. The method 1600 may be performed by a base station. At operation 1602, the base station may send, to a UE, information indicating one or more cyclic shift values and at least one root sequence, each cyclic shift value being associated with a beam index of a set of beams transmitted by the base station. In one aspect, the information indicating the at least one root sequence may be a starting root sequence, from which the UE may derive a root sequence and then apply a cyclic shift. In one aspect, the information indicating the one or more cyclic shift values and the root sequence is sent to the UE through one or more of a PBCH, RMSI, OSI, a RRC message, a handover message, or any combination thereof. In one aspect, the information indicating the one or more cyclic shift values indicates a first cyclic shift value is associated with a region of a subframe that is reserved for a RACH, and a second cyclic shift value is associated with a region of a subframe that is unreserved for RACH. In one aspect, the information indicating the one or more cyclic shift values indicates a first cyclic shift value is associated with a contention-free RACH, and a second cyclic shift value is associated with a contention-based RACH. In one aspect, the information indicating the one or more cyclic shift values indicates a first cyclic shift value is associated with time synchronization between the base station and the UE, and a second cyclic shift value is associated with an absence of time synchronization between the base station and the UE. For example, the base station 504 may send, to the UE 502, information indicating one or more cyclic shift values, each cyclic shift value being associated with a beam index of a set of beams 524, 525, 526 transmitted by the base station.

At operation 1604, the base station may transmit the set of beams. For example, the base station 504 may send signals through each beam of the set of beams 524, 525, 526.

At operation 1606, the base station may receive, from the UE, a BAR, which may include a root sequence having a first cyclic shift applied thereto. In one aspect, the BAR may be a request for a BRRS. In one aspect, the BAR is received from the UE based on failure of at least one of a serving beam or a control beam. For example, the base station 504 may receive, from the UE 502 a BAR, including a root sequence having a first cyclic shift applied thereto.

At operation 1608, the base station may determine a beam index corresponding to a first cyclic shift value—the first cyclic shift value corresponding to the first cyclic shift. For example, the base station may identify a first cyclic shift value that corresponds to the first cyclic shift applied to the root sequence. The base station may access stored data (e.g., a lookup table or mapping) that indicates correspondence between cyclic shift values and beam indexes. The base station may identify the beam index corresponding to the first cyclic shift value based on the stored data. For example, the base station 504 may determine a beam index (e.g., of beam 525) corresponding to a first cyclic shift value—the first cyclic shift value corresponding to the first cyclic shift. In one aspect, the base station may determine the beam index based on the combination of the root sequence and the cyclic shift applied thereto.

At operation 1610, the base station may communicate with the UE based on a beam of the set of beams that corresponds to the beam index corresponding to the first cyclic shift value. In one aspect, the base station may transmit a BRRS based on the BAR through the beam that corresponds to the beam index. In another aspect, the base station may switch a current serving beam to a beam that corresponds to the beam index. For example, the base station 504 may communicate with the UE 502 through a beam (e.g., beam 525) of the set of beams (e.g., beams 524, 525, 526) that corresponds to the beam index corresponding to the first cyclic shift value.

FIG. 17 illustrates a method of wireless communication. The method 1700 may be performed by a UE (e.g., the UE 502). At operation 1702, the UE may receive, from a base station, information indicating one or more cyclic shift values and at least one root sequence, each cyclic shift value being associated with a beam index of a set of beams transmitted by the base station. The information indicating the at least one root sequence may be a starting root sequence index from which the UE may generate or derive the root sequence. In one aspect, the information indicating the one or more cyclic shift values and the at least one root sequence is received through one or more of a PBCH, RMSI, OSI, a RRC message, a handover message, or any combination thereof. In one aspect, the information indicating the one or more cyclic shift values indicates a first cyclic shift value is associated with a region of a subframe that is reserved for a RACH, and a second cyclic shift value is associated with a region of a subframe that is unreserved for RACH. In one aspect, the information indicating the one or more cyclic shift values indicates a first cyclic shift value is associated with a contention-free RACH, and a second cyclic shift value is associated with a contention-based RACH. In one aspect, the information indicating the one or more cyclic shift values indicates a first cyclic shift value is associated with time synchronization between the base station and the UE, and a second cyclic shift value is associated with an absence of time synchronization between the base station and the UE. For example, the UE 502 may receive, from the base station 504, information indicating one or more cyclic shift values, each cyclic shift value being associated with a beam index of a set of beams 524, 525, 526 transmitted by the base station.

At operation 1704, the UE may receive the set of beams. For example, the UE 502 may receive the set of beams 524, 525, 526 transmitted by the base station 504.

At operation 1706, the UE may select a beam of the set of beams for communication with the base station. For example, the UE may measure a channel quality (e.g., SNR) for one or more beams and may select the beam having a best or highest channel quality. For example, the UE 502 may select the beam 525 of the set of beams 524, 525, 526.

At operation 1708, the UE may identify a first cyclic shift value corresponding to the beam index of the selected beam. For example, the UE may access the information received from the base station indicating association between cyclic shift values and beam indexes, and the UE may identify the cyclic shift value associated with the beam index of the selected beam. For example, the UE 502 may identify a first cyclic shift value corresponding to the beam index of the selected beam 525.

At operation 1710, the UE may transmit, to the base station, a BAR, which may include the root sequence with a first cyclic shift corresponding to the identified first cyclic shift value applied to the root sequence. In an aspect, the BAR may be a request for a BRRS. In an aspect, the UE may transmit the BAR when a current serving beam and/or one or more control beams fail (e.g., radio link failure). For example, the UE 502 may transmit, to the base station 504, a BAR through a first cyclic shift corresponding to the identified first cyclic shift value.

At operation 1712, the UE may communicate with the base station based on the selected beam that corresponds to the beam index corresponding to the identified first cyclic shift value. For example, the UE may receive a BRRS for beam refinement, or the base station may switch the current serving beam to the selected beam corresponding to the beam index. For example, the UE 502 may communicate with the base station 504 based on the selected beam 525 that corresponds to the beam index corresponding to the identified first cyclic shift value.

Figure 18:
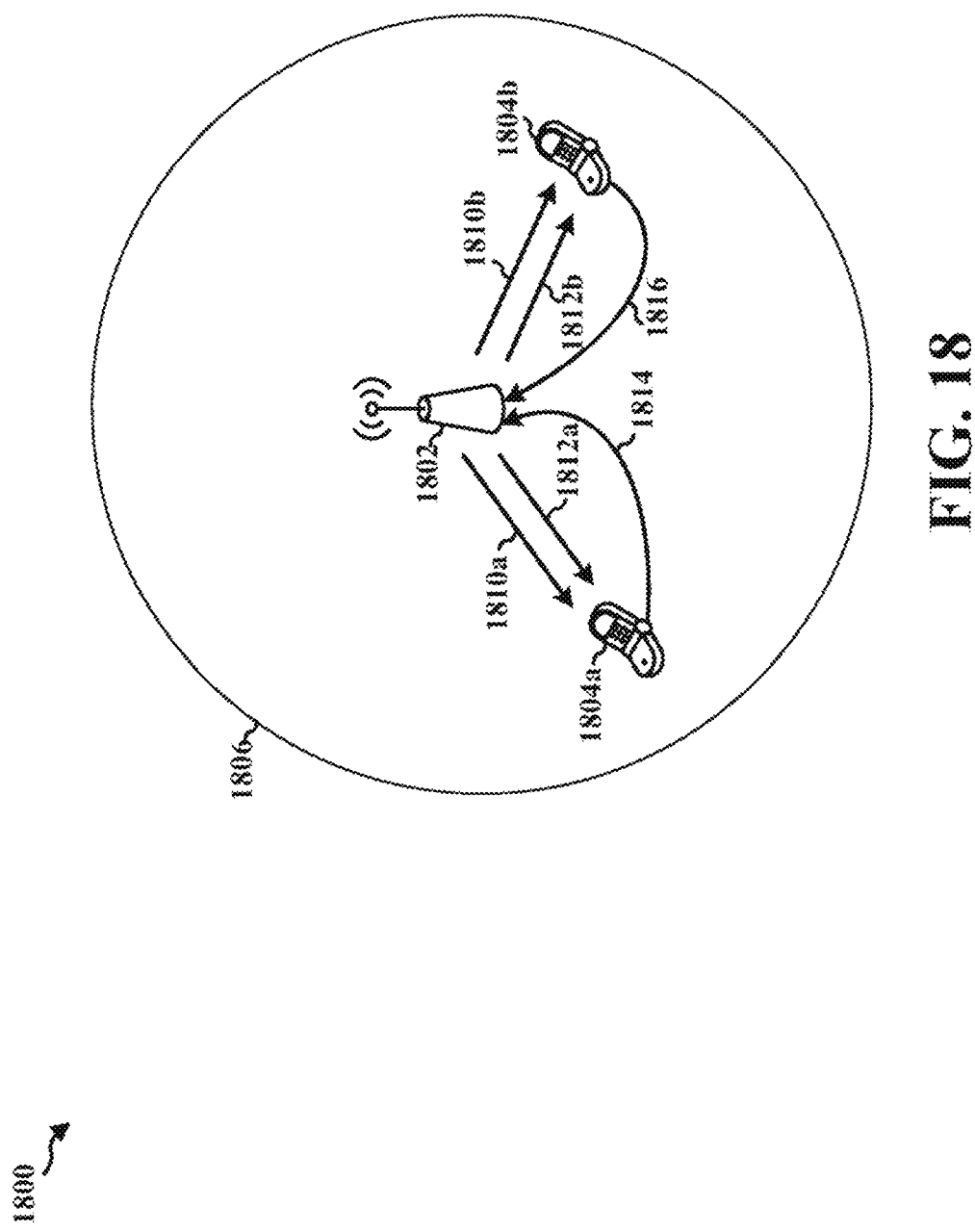
FIG. 18 is a diagram of a wireless communication system.

FIG. 18 illustrates a wireless communication system 1800. In the wireless communication system 1800, a base station 1802 (e.g., a gNB, eNB, or other nodeB) may provide a cell on which a first set of UEs and a second set of UEs may operate. The first set of UEs may be time-synchronized with the base station 1802. For example, the first set of UEs may include the first UE 1804a that is communicating with the base station 1802 though a current serving beam (e.g., the serving beam 525).

The second set of UEs may not be time-synchronized with the base station 1802. For example, the second set of UEs may include the second UE 1804b, which may perform initial access, cell selection, cell reselection, loss of timing synchronization (e.g., timing synchronization reacquisition), or handover in order to operate on the cell 1806 provided by the base station 1802. For example, the second UE 1804b may perform initial access, cell selection, cell reselection, timing synchronization reacquisition, and/or handover in order to acquire timing synchronization with the base station 1802 when the second UE 1804b enter the cell 1806 and/or transitions from RRC Idle mode to RRC Connected mode.

In various aspects, a Zadoff-Chu sequence may be used to transmit a RACH preamble, e.g., for initial access or for beam failure recovery. The number of orthogonal or separable Zadoff-Chu sequences that may occupy a set of time-frequency resources (e.g., a RACH region) may be dependent upon the available number of cyclic shifts and root sequences associated with the Zadoff-Chu sequence. For example, the base station 1802 may configure a particular number of cyclic shifts Ncs, a starting root sequence configuration, and a maximum number of preambles in the cell 1806. The base station 1802 may signal this Ncs value, starting root index, and/or maximum number of preambles to the UEs 1804a-b that are to operate on the cell 1806.

In various aspects, the number of cyclic shifts Ncs may refer to the minimum gap between any two cyclic shift values that are used in the cell 1806. The number of cyclic shifts Ncs may be related to the maximum number of cyclic shift values that can be supported for each starting root sequence. For example, for a length 139 Zadoff-Chu sequence, and the base station 1802 configures the number of cyclic shifts Ncs to be 4 (e.g., based on a zeroCorrelationZoneConfig value of 1), then the cell 1806 can support at most [139/4], or 34 cyclic shift values for each starting root sequence.

In aspects, the base station 1802 sends a set of RACH parameters to UEs in the cell 1806. The set of RACH parameters can include at least a root sequence index. The root sequence index may include a starting root index or a logical root sequence number from which a UE may generate a RACH preamble sequence. The set of RACH parameters may include a configuration index associated with a RACH procedure. A configuration index may indicate resource(s) that are to carry a RACH preamble, such as a system frame number (SFN), a preamble format, a subframe index, etc. The set of RACH parameters may include a received target power associated with a RACH procedure. The received target power may indicate the target power with which the base station 1802 would like to receive a RACH preamble (e.g., −104 dBm). The set of RACH parameters may indicate the number of available cyclic shifts (e.g., indicated as a zeroCorrelationZoneConfig value). Table 3 gives the Ncs for preamble generate (e.g., preamble format 4), according to some aspects. Table 4 gives the root Zadoff-Chu sequence order for preamble format 4.

TABLE 3

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |

TABLE 3-continued

| zeroCorrelationZoneConfig | $N_{CS}$ value |
|---|---|
| 9 | N/A |
| 10 | N/A |
| 11 | N/A |
| 12 | N/A |
| 13 | N/A |
| 14 | N/A |
| 15 | N/A |

TABLE 4

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 137-837 | N/A | | | | | | | | | | | | | | | | | | | |

After receiving a set of RACH parameters, a UE may determine whether the starting root index of the Zadoff-Chu sequence is able to support the maximum number of preambles for the cell 1806. If the UE determines that the cell 1806 is able to support the maximum number of preambles for the cell 1806 (e.g., 64), then the UE may select cyclic shift values for that starting root index. However, if the UE determines that the cell 1806 is unable to support the maximum number of preambles for the cell 1806 given the set of RACH parameters, then the UE may select a starting root index by incrementally selecting a next starting root index (e.g., as given by Table 4) and determining whether that starting root index can support the maximum number of RACH preambles for the number of available cyclic shifts Ncs. For example, the base station 1802 configures the number of available cyclic shift values Ncs to be 4, the starting root index (e.g., logical root index) to be 6, and the maximum number of preambles supported in the cell 1806 is 64. The cell 1806 then supports 34 cyclic shifts (i.e., [139/4]). However, the cell 1806 has a maximum number of preambles that is configured as 64. Therefore, the UE may use the starting root sequence of 7, in addition to 6, in order to find all available root and cyclic shift combinations for the cell 1806. A UE may determine that the starting root sequence of 6 has a physical root sequence number of 136 (e.g., row 1 and column 6 from Table 4) and the starting root sequence of 7 has a physical root sequence of 4 (e.g., row 1 and column 7 from Table 4). The UE may then select cyclic shifts from the physical root sequences of 136 and 4 in order to generate the 64 preambles supported in the cell 1806.

In some aspects, RACH preambles in the cell 1806 may be code-division multiplexed. For example, RACH preambles for initial access, cell selection, cell reselection, and/or handover (e.g., RACH preambles for time unsynchronized UEs) may be code-division multiplexed with RACH preambles for beam failure recovery (e.g., RACH preambles for time-synchronized UEs), e.g., in the region 712 including resource(s) reserved for RACH. In order to accommodate code-division multiplexing of RACH preambles for initial access, cell selection, cell reselection, handover, etc. with RACH preambles for beam failure recovery, the base station 1802 may configure different sets of RACH parameters for UEs that are to use RACH for initial access, cell selection, cell reselection, handover, etc. and UEs that are to use RACH for beam failure recovery. If the same set of RACH parameters were used for both sets of UEs, collision may occur in the RACH resource(s) (e.g., region 712). Because a first set of UEs that transmit RACH preambles for beam failure recovery are time-synchronized with the base station 1802, a higher number of cyclic shifts (e.g., lower Ncs value) may be available than are available for a second set of UEs that transmit RACH preambles for initial access, cell selection, cell reselection, handover, etc. The fewer number of cyclic shifts for the second set of UEs may be due to timing misalignment as a consequence of interference and/or round trip time (RTT), which may not be experienced by the first set of UEs because the first set of UEs is already time-synchronized with the base station 1802.

In various aspects, the first UE 1804a may be time-synchronized with the base station 1802 in the cell 1806. For example, the first UE 1804a may have already performed initial access and by operating in an RRC connected mode with the base station 1802. The first UE 1804a may communicate with the base station 1802 through a first serving beam (e.g., the beam 525). However, the first serving beam may fail, e.g., due to obstruction that causes radio link failure. Accordingly, the first UE 1804a, though time-synchronized with the base station 1802, may need to inform the base station of the beam failure in order to perform a beam failure recovery procedure.

Also in the cell 1806, the second UE 1804b may not be time-synchronized with the base station 1802, e.g., when the second UE 1804b is performing initial access, cell selection, cell reselection, handover, etc. Accordingly, the base station 1802 may configure a first set of RACH parameters for a first set of UEs (e.g., including the first UE 1804a) that are time-synchronized with the base station 1802, but may configure a second set of RACH parameters for a second set of UEs (e.g., including the second UE 1804b). The starting root indexes and numbers of available cyclic shifts Ncs (indicated as zeroCorrelationZoneConfig value) may be different. Further, the maximum number of available preambles may be different (e.g., more available preambles for UEs that are time synchronized).

By way of example, the base station 1802 may determine or configure a first set of parameters 1810a-b associated with a first RACH procedure. The first set of parameters 1810a-b may be configured for a first set of UEs (e.g., time synchronized UEs, including the first UE 1804a). The first set of RACH parameters 1810a-b may be associated with beam failure recovery. In some aspects, the first RACH procedure (e.g., performed based on the first set of parameters 1810*a-b*) may be a contention-free RACH procedure.

The base station 1802 may determine or configure a second set of RACH parameters 1812*a-b* associated with a second RACH procedure. The second set of parameters 1812*a-b* may be configured for a second set of UEs (e.g., non-time synchronized UEs, including the second UE 1804*b*). The second set of RACH parameters 1812*a-b* may be associated with initial access, cell selection, cell reselection, loss of timing synchronization, and/or handover. In some aspects, the second RACH procedure (e.g., performed based on the second set of parameters 1812*a-b*) may be a contention-based RACH procedure.

In various aspects, the first set of parameters 1810*a-b* and the second set of parameters 1812*a-b* may include different values of parameters that are used for the first RACH procedure and the second RACH procedure. For example, the first set of parameters 1810*a-b* and the second set of parameters 1812*a-b* may each be used for generation of a preamble and transmission of that preamble (e.g., when to transmit a preamble and on which resources). In various aspects, both the first set of parameters 1810*a-b* and the second set of parameters 1812*a-b* may include values indicating at least one of a root sequence index, a configuration index, a received target power, a number of cyclic shifts for each root sequence, a maximum number of RACH preamble transmissions, a power ramping step, a candidate beam threshold, and/or a frequency offset. In one aspect, each starting root index may indicate a starting root index of a Zadoff-Chu sequence. In another aspect, each starting root index may indicate a primitive polynomial of an M sequence.

While the first set of parameters 1810*a-b* and the second set of parameters 1812*a-b* may both include parameters for respective RACH procedures, various parameters may be different and/or include different values. For example, the number of cyclic shifts for each root sequence in the first set of parameters 1810*a-b* may be greater than the number of cyclic shifts for each root sequence in the second set of parameters 1812*a-b*. In some aspects, both sets of RACH parameters may allow for a same number of root sequences. However, the first set of RACH parameters 1810*a-b* may allow for a higher number of cyclic shifts per root sequence than the second set of RACH parameters 1812*a-b*. Accordingly, the first set of RACH parameters 1810*a-b* may allow for a higher number of RACH preambles in each time frequency resource than the number of RACH preambles available to based on the second set of RACH parameters 1812*a-b*, which has a lower number of available cyclic shifts.

For the first set of parameters 1810*a-b*, the root sequence index indicated as a PRACH root sequence index for beam failure recovery (BFR) (e.g., "RootSequenceIndex-BFR"). The root sequence index may include values between $\{0, 1, \ldots, 137\}$. The configuration index may be indicated as PRACH configuration index for beam failure request (e.g., "ra-PreambleIndexConfig-BFR") and may have values between $\{0, 1, \ldots, 255\}$ (in another aspect, the configuration index may include values between $\{0, 1, \ldots, 255\}$). In some aspects, the PRACH configuration index may give an index to a table that is stored in the second UE 1804*b*, as defined by a 3GPP technical specification (e.g., 38.211). The received target power may be given as preamble received target power (e.g., "preambleReceivedTargetPower"), and may have a value range of six bits. The number of cyclic shifts for each root sequence may be indicated indirectly as a zeroCorrelationZoneConfig, and may have a value between $\{0, 1, 2, 3, \ldots, 15\}$. In one aspect, the zeroCorrelationZoneConfig may be defined by a 3GPP technical specification (e.g., 38.211). The maximum number of preamble transmissions may be given as a maximum number of beam failure request transmissions (e.g., "PreambleTransMax-BFR"). The power ramping step may be given as a power ramping step for a beam failure request via PRACH (e.g., "powerRampingStep-BFR"). The candidate beam threshold may be given as an identification of a candidate beam (e.g., "Beam-failure-candidate-beam-threshold"). The frequency offset may be given as a beam failure recovery frequency offset (e.g., "prach-FreqOffset-BFR"). In some aspects, one or more parameters of the second set of parameters may be defined in one or more 3GPP technical specifications (e.g., 38.211, 38.213, 38.331, etc.).

For the second set of parameters 1812*a-b*, the root sequence index indicated as a PRACH root sequence index (e.g., "PRACHRootSequenceIndex"). The root sequence index may include values between $\{0, 1, \ldots, 837\}$ for logical root sequence number L=839 and values between $\{0, 1, \ldots, 137\}$ for logical root sequence number L=139. The configuration index may be indicated as PRACH configuration index (e.g., "PRACHConfigurationIndex") and may have values between $\{0, 1, \ldots, 255\}$. In some aspects, the PRACH configuration index may give an index to a table that is stored in the first UE 1804*a*, as defined by a 3GPP technical specification (e.g., 38.211). The received target power may be given as preamble received target power for beam failure request for PRACH (e.g., "PreambleInitialReceivedTargetPower-BFR"). The number of cyclic shifts for each root sequence may be indicated indirectly as a zeroCorrelationZoneConfig for beam failure recovery (e.g., "ZeroCorrelationZoneConfig-BFR"), and may have a value between $\{0, 1, 2, 3, \ldots, 15\}$. In one aspect, the zeroCorrelationZoneConfig for beam failure recovery may be defined by a 3GPP technical specification (e.g., 38.211). The maximum number of preamble transmissions may be given as a maximum number of preamble transmissions. The power ramping step may be given as a power ramping step for PRACH (e.g., "powerRampingStep"). The candidate beam threshold may be given as an identification of a candidate beam (e.g., "Beam-failure-candidate-beam-threshold"). The frequency offset may be given as an offset of the lower PRACH transmission occasion in the frequency domain with respective to PRB 0 (e.g., "prach-frequency-start"). In some aspects, one or more parameters of the second set of parameters may be defined in one or more 3GPP technical specifications (e.g., 38.211, 38.213, 38.331, etc.).

By way of example, the first set of RACH parameters 1810*a-b* may indicate a number of available cyclic shifts Ncs as 2 (e.g., zeroCorrelationZoneConfig-BFR value of 0) and a starting root index (e.g., logical root sequence number or RootSequenceIndex-BFR) of 1 for a number of preambles equal to 192. By way of example, the second set of RACH parameters 1812*a-b* may indicate a number of available cyclic shifts as 4 (e.g., zeroCorrelationZoneConfig value of 1) and a starting root index (e.g., logical root sequence number) of 5 for a number of preambles equal to 64.

The base station 1802 may signal the first set of RACH parameters 1810*a-b* and the second set of RACH parameters 1812*a-b*. For example, the base station 1802 may signal the first set of RACH parameters 1810*a-b* via RRC signaling, and may signal the second set of RACH parameters 1812*a-b* as broadcast. In various aspects, the base station 1802 may signal either the first set of RACH parameters 1810*a-b* and/or the second set of RACH parameters 1812*a-b* via a PBCH, a control channel, a remaining minimum system information (RMSI) message, an other system information (OSI) message, a RRC message, a handover message, or any combination thereof.

The first UE 1804*a* may receive at least the first set of RACH parameters 1810*a*. In some aspects, the first UE 1804*a* may receive the second set of RACH parameters 1812*a*, e.g., when the first UE 1804*a* performs initial access in order to become time synchronized with the base station 1802.

The first UE 1804*a* may select the first set of RACH parameters 1810*a* because the first UE 1804*a* is time synchronized in the cell 1806. For example, the first UE 1804*a* may communicate with the base station 1802 through a first serving beam (e.g., the serving beam 525). However, the first UE 1804*a* may detect a failure (e.g., radio link failure) of the first serving beam. For example, channel quality through the first serving beam may fall below a threshold.

The first UE 1804*a* may identify a new beam index corresponding to a new serving beam. The first UE 1804*a* may determine to perform a beam failure recovery procedure. For example, the first UE 1804 may select the first set of RACH parameters 1810*a* for the beam failure recovery procedure. The first UE 1804*a* may generate a RACH preamble using the physical root indexes of 1, 138, and 2 (corresponding to the first 3 columns of the first row of Table 4) because each starting root index can support 68 cyclic shifts (i.e., [139/2]). As part of a first RACH procedure, the first UE 1804*a* may then send the generated RACH preamble 1814 to the base station 1802, for example, in resource(s) reserved for RACH (e.g., region 712). The generated RACH preamble 1814 may indicate a beam failure recovery request. In various aspects, the generated RACH preamble 1814 may indicate a new serving beam index, for example, based on one or more resources that carry the RACH preamble 1814, the RACH preamble 1814, the cyclic shift used for the RACH preamble 1814, the root index used for the RACH preamble 1814, or another aspect associated with the RACH preamble 1814.

The base station 1802 may receive the RACH preamble 1814. The base station 1802 may determine that the RACH preamble 1814 is for a beam failure recovery procedure, e.g., based on the one or more resources that carry the RACH preamble 1814, the RACH preamble 1814, the cyclic shift used for the RACH preamble 1814, the root index used for the RACH preamble 1814, or another aspect associated with the RACH preamble 1814. As described, supra, the base station 1802 may determine an index for a new serving beam based on resource(s) that carry the RACH preamble 1814.

In aspects, the base station 1802 may then perform the beam failure recovery procedure with the first UE 1804*a*. For example, the base station 1802 may select a new serving beam. In one aspect, the base station 1802 may include a mapping that maps one or more resources that carry a RACH preamble, a RACH preamble, a cyclic shift used for the RACH preamble, a root index used for the RACH preamble, or another aspect associated with the RACH preamble to beam indexes. Accordingly, the base station 1802 may determine a new beam based on the beam index indicated by at least one of the one or more resources that carry the RACH preamble 1814, the RACH preamble 1814, the cyclic shift used for the RACH preamble 1814, the root index used for the RACH preamble 1814, or another aspect associated with the RACH preamble 1814. The base station 1802 may then communicate with the first UE 1804*a* through the new serving beam corresponding to the beam index indicated by the first UE 1804*a*.

The second UE 1804*b* may select the second set of RACH parameters 1812*b* received by the second UE 1804*b*, for example, when the second UE 1804*b* is to perform initial access, cell selection, cell reselection, loss of timing synchronization, and/or handover. The second UE 1804*b* may then perform a second RACH procedure (e.g., contention-based or non-contention based) for the initial access, cell selection, cell reselection, loss of timing synchronization, and/or handover based on the second set of RACH parameters 1812*b*. For example, the second UE 1804*b* may use the physical root indexes of 136 and 4, because each root index can support 34 (i.e., [139/4]) cyclic shift values. The second UE 1804*b* may generate a second RACH preamble 1816 and transmit the second RACH preamble 1816 to the base station 1802 for initial access, cell selection, cell reselection, loss of timing synchronization, or handover. After the second UE 1804*b* acquires timing synchronization with the base station 1802 (e.g., based on the second RACH preamble 1816), the second UE 1804*b* may use the first set of parameters 1810*b* in order to recover from beam failure, as described with respect to the first UE 1804*a*.

Figure 19:
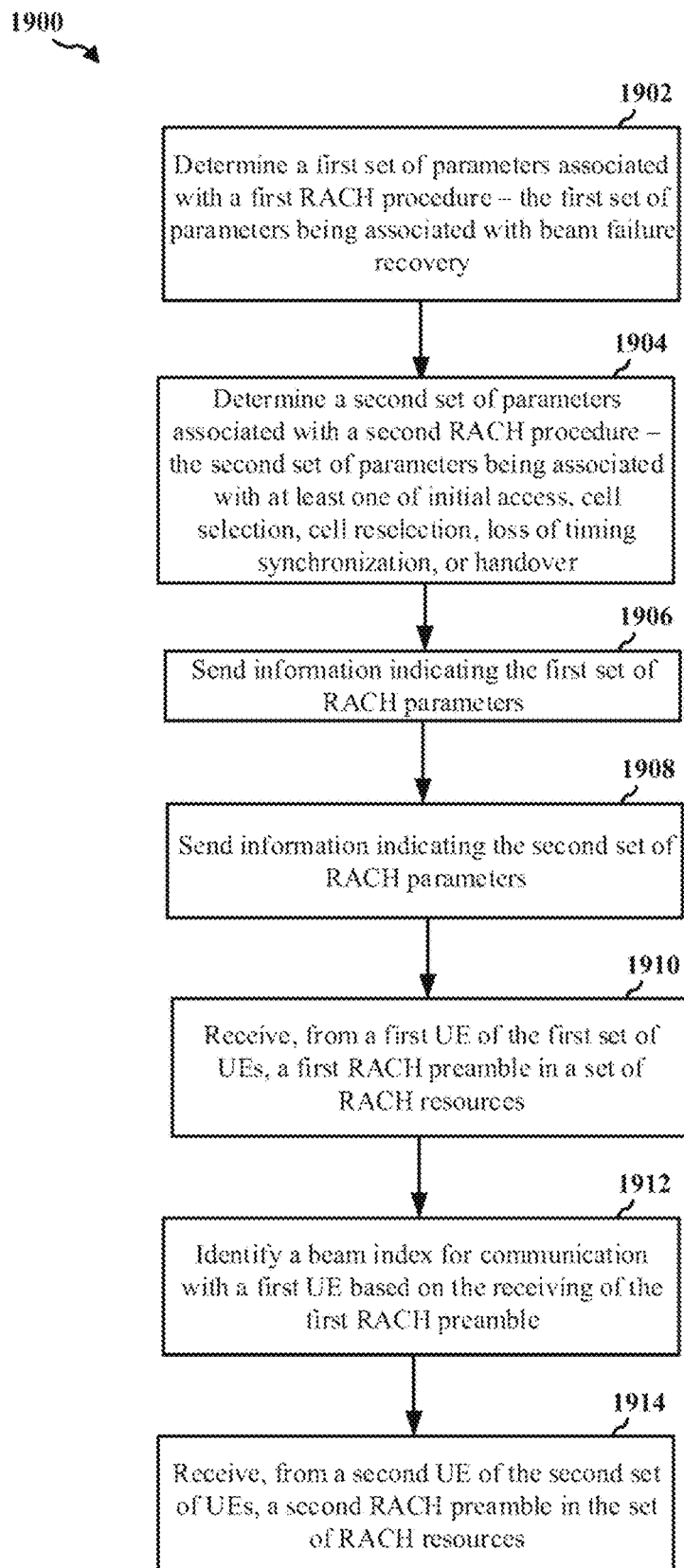
FIG. 19 is a flowchart of a method of wireless communication.

FIG. 19 is a method 1900 of wireless communication by a base station (e.g., the base station 1802). At operation 1902, the base station may determine or configure a first set of parameters associated with a first RACH procedure. For example, the base station may select a set of parameters that are associated with a RACH procedure for beam failure recovery, and the base station may identify a respective value for each parameters of the set of parameters.

The first set of parameters may be associated with beam failure recovery. In an aspect, the first set of parameters may include values indicating at least one of a root sequence index, a configuration index, a received target power, a number of cyclic shifts for each root sequence, a maximum number of RACH preamble transmissions, a power ramping step, a candidate beam threshold, and/or a frequency offset.

The first set of parameters may be for a first set of UEs that may be time synchronized with the base station. The first set of RACH parameters may be associated with a beam failure recovery procedure.

In the context of FIG. 18, the base station 1802 may determine or configure the first set of RACH parameters 1810*a-b* for a first set of UEs in the cell 1806, including the first UE 1804*a*. The first set of RACH parameters 1810*a-b* may be for use in a RACH procedure associated with beam failure recovery.

At operation 1904, the base station may determine or configure a second set of parameters associated with a second RACH procedure. The second set of parameters may be associated with at least one of initial access, cell selection, cell reselection, loss of timing synchronization, or handover.

In an aspect, the second set of parameters may include values indicating at least one of a root sequence index, a configuration index, a received target power, a number of cyclic shifts for each root sequence, a maximum number of RACH preamble transmissions, a power ramping step, a candidate beam threshold, and/or a frequency offset.

In one aspect, the available number of cyclic shifts for each root sequence in the first set of parameters is greater than the available number of cyclic shifts for each root sequence in the second set of parameters. For example, the Ncs value corresponding to a first zeroCorrelationZoneConfig value of the first set of parameters is smaller than that corresponding to the second zeroCorrelationZoneConfig value of the second set of parameters.

The second set of parameters may be for a second set of UEs that may not be time synchronized with the base station. The second set of RACH parameters may be associated with initial access, cell selection, cell reselection, loss of timing synchronization, and/or handover.

In the context of FIG. 18, the base station 1802 may determine or configure the second set of parameters 1812*a-b* for a second set of UEs in the cell 1806, including the second UE 1804*b*. The second set of parameters 1812*a-b* may be used for a second RACH procedure that is associated with at least one of initial access, cell selection, cell reselection, loss of timing synchronization, and/or handover.

At operation 1906, the base station may send information indicating the first set of RACH parameters. In one aspect, the information indicating the first set of RACH parameters may be sent through one or more of a PBCH, a control channel, a RMSI message, an OSI message, an RRC message, a handover message, or any combination thereof. In the context of FIG. 18, the base station 1802 may send the first set of RACH parameters 1810*a-b*.

At operation 1908, the base station may send information indicating the second set of parameters. In one aspect, the information indicating the second set of RACH parameters may be sent through one or more of a PBCH, a control channel, a RMSI message, an OSI message, a SIB, a MIB, a handover message, or any combination thereof. In the context of FIG. 18, the base station 1802 may send the second set of RACH parameters 1812*a-b*.

At operation 1910, the base station may receive, from a first UE, a first RACH preamble based on the first set of RACH parameters. In an aspect, the first UE may be timing synchronized with the base station. In an aspect, the first RACH preamble may be received in a set of resources reserved for RACH. In an aspect, the base station may determine that the first RACH preamble is for a beam failure recovery procedure. In the context of FIG. 18, the base station 1802 may receive, from the first UE 1804*a*, the RACH preamble 1814 for a first RACH procedure that may be associated with beam failure recovery.

At operation 1912, the base station may identify a beam index for communication with the first UE based on the receiving of the first RACH preamble. For example, the base station may determine that the first RACH preamble is for a beam failure recovery procedure, e.g., based on the one or more resources that carry the first RACH preamble, the first RACH preamble, a cyclic shift used for the first RACH preamble, a root index used for the first RACH preamble, or another aspect associated with the first RACH preamble. In aspects, the base station may then perform the beam failure recovery procedure with the first UE. For example, the base station may select a new serving beam. In one aspect, the base station may include a mapping that maps one or more resources that carry a RACH preamble, a RACH preamble, a cyclic shift used for the RACH preamble, a root index used for the RACH preamble, or another aspect associated with the RACH preamble to beam indexes. Accordingly, the base station may determine a new beam based on the beam index indicated by at least one of the one or more resources that carry the first RACH preamble, the first RACH preamble, the cyclic shift used for the first RACH preamble, the root index used for the first RACH preamble, or another aspect associated with the first RACH preamble. The base station may then communicate with the first UE through the new serving beam corresponding to the beam index indicated by the first UE based on the first RACH preamble. In the context of FIG. 18, the base station 1802 may identify a beam index for communication with the first UE 1804*a* based on the receiving of the first RACH preamble 1814.

At operation 1914, the base station may receive, from a second UE of the second set of UEs, a second RACH preamble based on the second set of RACH parameters. The second RACH preamble may be received for a second RACH procedure (e.g., contention-based RACH procedure). In an aspect, the second RACH preamble may be received in the set of resources as the first RACH preamble (e.g. code-division multiplexed with the first RACH preamble). In an aspect, the base station may determine that the second RACH preamble is for one of initial access, cell selection, cell reselection, timing reacquisition, or handover. In the context of FIG. 18, the base station 1802 may receive the second RACH preamble 1816 from the second UE 1804*b* based on the second set of RACH parameters 1812*b*.

Figure 20:
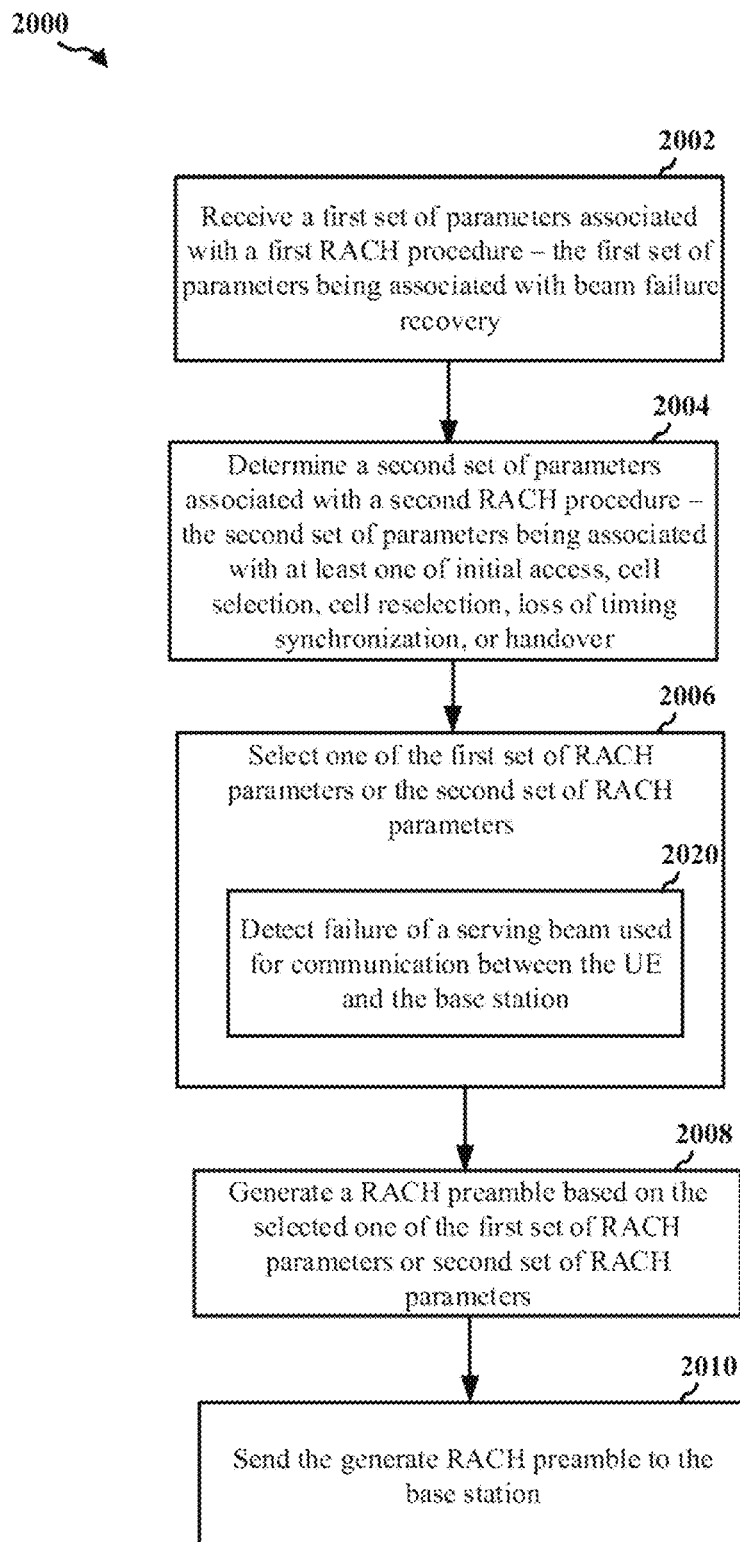
FIG. 20 is a flowchart of a method of wireless communication.

FIG. 20 illustrates a method 2000 of wireless communication for a UE (e.g., the first UE 1804*a* and/or the second UE 1804*b*). At operation 2002, the UE may receive, from a base station, a first set of parameters associated with a first RACH procedure. The first set of parameters may be associated with beam failure recovery. In an aspect, the first set of parameters may include values indicating at least one of a root sequence index, a configuration index, a received target power, a number of cyclic shifts for each root sequence, a maximum number of RACH preamble transmissions, a power ramping step, a candidate beam threshold, and/or a frequency offset.

The first set of parameters may be for a first set of UEs that may be time synchronized with the base station. The first set of RACH parameters may be associated with a beam failure recovery procedure.

In an aspect, the UE may receive information indicating the first set of RACH parameters through one or more of a PBCH, a control channel, a RMSI message, an OSI message, an RRC message, a handover message, or any combination thereof.

In the context of FIG. 18, the first UE 1804*a* may receive, from the base station 1802, the first set of RACH parameters 1810*a* for a first RACH procedure in the cell 1806. The first set of RACH parameters 1810*a* may be for use in a RACH procedure associated with beam failure recovery.

At operation 2004, the UE may receive, from the base, a second set of parameters associated with a second RACH procedure. The second set of parameters may be associated with at least one of initial access, cell selection, cell reselection, loss of timing synchronization, or handover. In an aspect, the second set of parameters may include values indicating at least one of a root sequence index, a configuration index, a received target power, a number of cyclic shifts for each root sequence, a maximum number of RACH preamble transmissions, a power ramping step, a candidate beam threshold, and/or a frequency offset.

In one aspect, the available number of cyclic shifts for each root sequence in the first set of parameters is greater than the available number of cyclic shifts for each root sequence in the second set of parameters. For example, the Ncs value corresponding to a first zeroCorrelationZoneConfig value of the first set of parameters is smaller than that corresponding to the second zeroCorrelationZoneConfig value of the second set of parameters.

The second set of parameters may be for a second set of UEs that may not be time synchronized with the base station. The second set of RACH parameters may be associated with initial access, cell selection, cell reselection, loss of timing synchronization, and/or handover.

In an aspect, the UE may receive information indicating the second set of RACH parameters through one or more of a PBCH, a control channel, a RMSI message, an OSI message, a SIB, a MIB, a handover message, or any combination thereof.

In the context of FIG. 18, the first UE 1804*a* may receive, from the base station 1802, the second set of RACH parameters 1812*a* for a first RACH procedure in the cell 1806. The second set of parameters 1812*a* may be used for a second RACH procedure that is associated with at least one of initial access, cell selection, cell reselection, loss of timing synchronization, and/or handover.

At operation 2006, the UE may select one of the first set of RACH parameters or the second set of RACH parameters. For example, the UE may detect a beam failure (e.g., radio link failure through a serving beam). The UE may identify a new beam index for a new serving beam. The UE may select the first set of RACH parameters for the beam failure recovery procedure.

In another example, the UE may determine to perform, with the base station, at least one of initial access, cell selection, cell reselection, timing synchronization reacquisition, and/or handover. Based on this determination, the UE may select the second set of parameters in order to perform a second RACH procedure for initial access, cell selection, cell reselection, timing synchronization reacquisition, and/or handover.

In the context of FIG. 18, the first UE 1804*a* may select the first set of RACH parameters 1810*a* instead of the second set of RACH parameters 1812*a* when there is a beam failure during communication with the base station 1802. Alternatively, the first UE 1804*a* may select the second set of RACH parameters 1812*a* instead of the first set of RACH parameters 1810*a* when the first UE 1804*a* is to perform one of initial access, cell selection, cell reselection, timing synchronization reacquisition, and/or handover.

In one aspect, the operation 2006 includes operation 2020. At operation 2020, the UE may detect a failure of a serving beam used for communication between the UE and the base station. For example, the UE may obtain one or more measurements indicative of channel quality through a beam used for communication between the UE and the base station. The UE may compare at least one of the measurements to a threshold. If the at least one measurement does not satisfy the threshold (e.g., does not meet the threshold), then the UE may determine that the channel is degraded and there is a radio link failure through the current serving beam. Based on the detected failure of the serving beam, the UE may determine to perform a beam failure recovery procedure through a first RACH procedure.

In the context of FIG. 18, the first UE 1804*a* may detect failure of a serving beam (e.g., the beam 525) used for communication between the first UE 1804*a* and the base station 1802.

At operation 2008, the UE may generate a RACH preamble based on the selected one of the first set of RACH parameters or the second set of RACH parameters. For example, the UE may identify a root sequence, and then the UE may cyclically shift the sequence in accordance with the available number of cyclic shifts indicated to the UE by the base station in the selected set of parameters. For example, the UE may generate a RACH preamble based on the first set of RACH parameters in order to indicate a beam failure recovery request. base station after losing time synchronization.

Illustratively, the UE may generate a RACH preamble using the physical root indexes of 1, 138, and 2 (corresponding to the first 3 columns of the first row of Table 4) because each starting root index can support 68 cyclic shifts (i.e., [139/2]). As part of a first RACH procedure, the UE may then send the generated RACH preamble to the base station, for example, in resource(s) reserved for RACH (e.g., region 712). The generated RACH preamble may be used to indicate a beam failure recovery request. In various aspects, the generated RACH preamble may indicate a new serving beam index, for example, based on one or more resources that carry the RACH preamble, the RACH preamble, the cyclic shift used for the RACH preamble, the root index used for the RACH preamble, or another aspect associated with the RACH preamble.

In the context of FIG. 18, the first UE 1804*a* may generate the RACH preamble 1814 based on the selected first set of RACH parameters 1810*a*.

At operation 2010, the UE may send the generated RACH preamble to the base station. For example, the UE may send the generated RACH preamble to the base station in a set of resources reserved for RACH, in which RACH preambles for initial access, cell selection, cell reselection, timing synchronization reacquisition, or handover may be code-division multiplexed. In the context of FIG. 18, the first UE 1804*a* may send the RACH preamble 1814 to the base station 1802.

Figure 21:
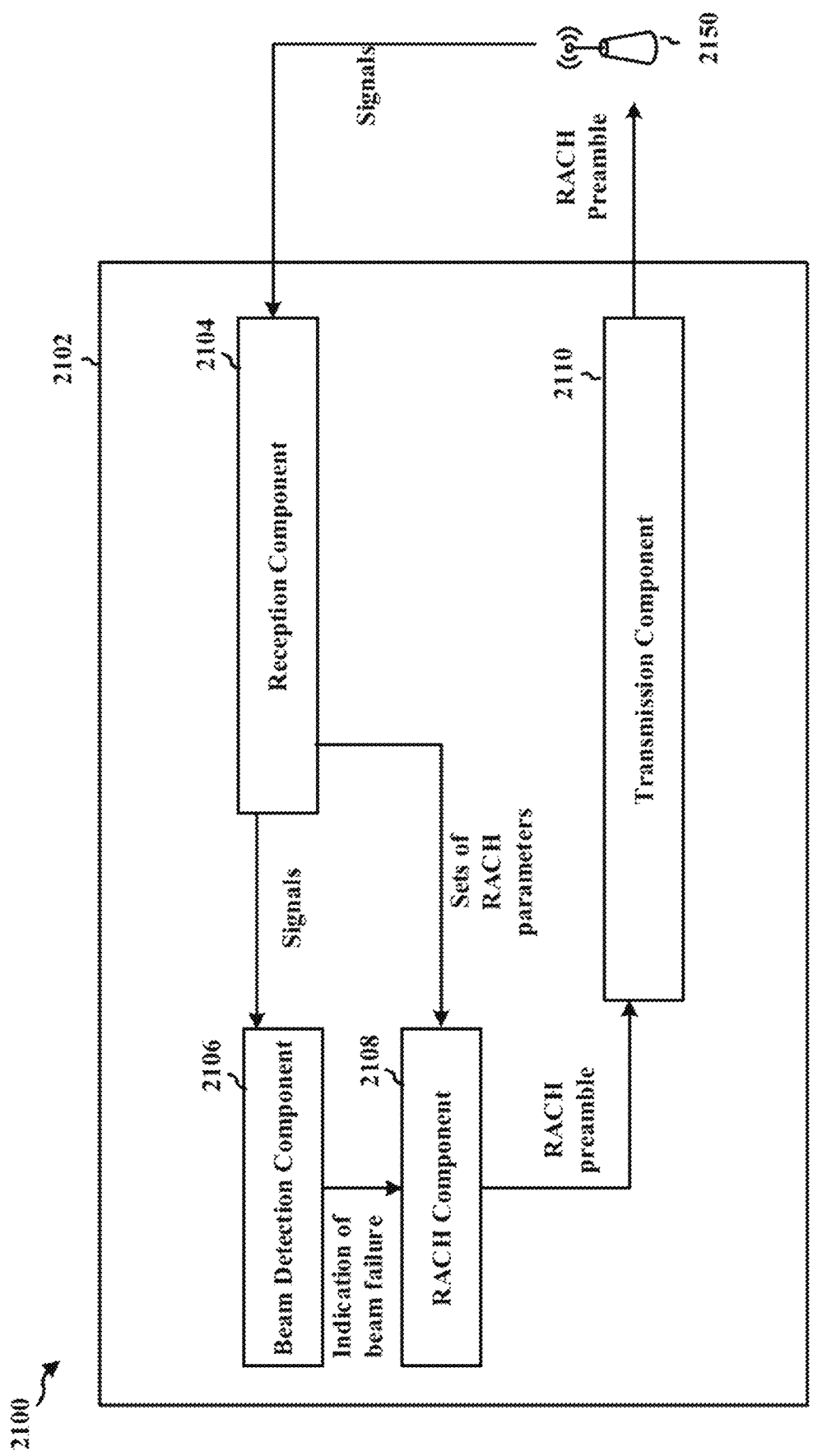
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 2102. The apparatus may be a UE. The apparatus 2102 includes a reception component 2104 that may be configured to receive signals from a mmW base station (e.g., the base station 2150). The apparatus 2102 may include a transmission component 2110 configured to transmit signals to a mmW base station (e.g., the base station 2150).

In aspects, the reception component 2104 may receive, and provide to a RACH component 2108, a first set of parameters associated with a first RACH procedure, the first RACH procedure being associated with beam failure recovery with the base station 2150. The reception component 2104 may receive, and provide to a RACH component 2108, a second set of parameters associated with a second RACH procedure, the second RACH procedure being associated with one of initial access, cell selection, cell reselection, loss of timing synchronization, or handover. The RACH component 2108 may generate a RACH preamble based on the first set of parameters or based on the second set of parameters. The RACH component 2108 may sending the generated RACH preamble to the transmission component 2110 and the transmission component 2110 may transmit the generated RACH preamble to the base station 2150, e.g., in order to indicate beam failure recovery.

In an aspect, the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure.

In an aspect, the beam detection component 2106 may detect failure of a serving beam used for communication between the apparatus 2102 and the base station 2150. The beam detection component 2106 may select the first set of parameters based on the detected failure of the serving beam, and indicate to the RACH component 2108 that the first set of parameters are to be used for a first RACH procedure.

In an aspect, the sending of the generated RACH preamble indicates at least one of a beam failure request or a second beam index corresponding to a second beam of the base station 2150. In an aspect, the first set of parameters is received via RRC signaling. In an aspect, the apparatus 2102 is time-synchronized in the cell provided by the base station 2150. In an aspect, the second set of parameters is received in a handover message, a RMSI message, or an OSI message.

The apparatus may include additional components that perform each of the blocks of the algorithm in the aforementioned flowcharts of FIG. 20. As such, each block in the aforementioned flowcharts of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
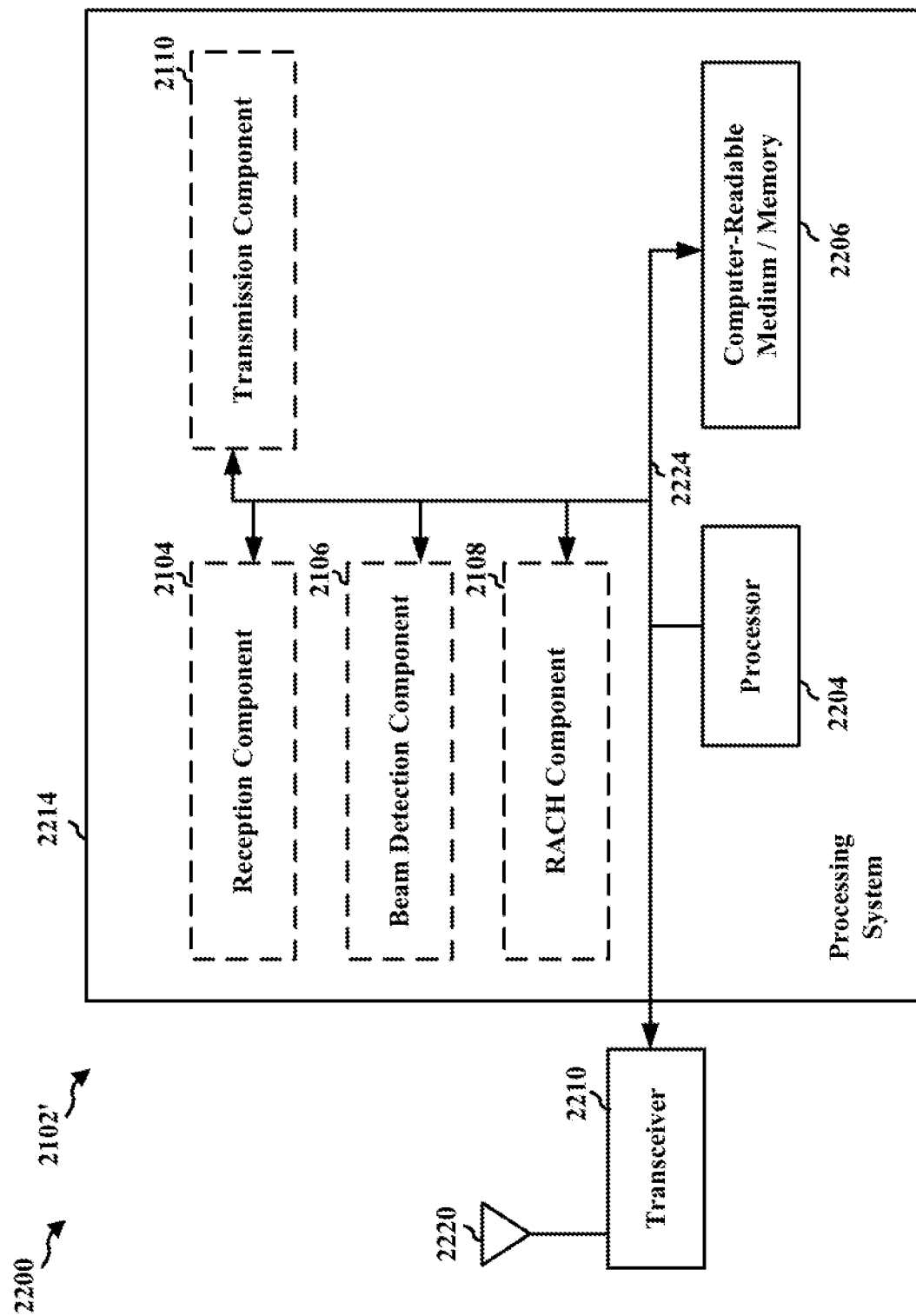
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2110, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110. The components may be software components running in the processor 2204, resident/stored in the computer readable medium/memory 2206, one or more hardware components coupled to the processor 2204, or some combination thereof.

The processing system 2214 may be a component of the UE 350 and may include the memory 360 and/or at least one of the TX processor 368, the RX processor 356, and the controller/processor 359.

In one configuration, the apparatus 2102/2102' for wireless communication includes means for means for receiving, from a base station, a first set of parameters associated with a first RACH procedure, the first RACH procedure being associated with beam failure recovery with the base station. The apparatus 2102/2102' further may include means for receiving, from the base station, a second set of parameters associated with a second RACH procedure, the second RACH procedure being associated with one of initial access, cell selection, cell reselection, loss of timing synchronization, or handover. The apparatus 2102/2102' further may include means for generating a RACH preamble based on the first set of parameters or based on the second set of parameters. The apparatus 2102/2102' further may include means for sending, to the base station, the generated RACH preamble.

In an aspect, the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure.

The apparatus 2102/2102' further may include means for detecting failure of a serving beam used for communication between the apparatus 2102/2102' and the base station; and means for selecting the first set of parameters based on the detected failure of the serving beam.

In an aspect, the sending of the generated RACH preamble indicates at least one of a beam failure request or a second beam index corresponding to a second beam of the base station. In an aspect, the first set of parameters is received via RRC signaling. In an aspect, the apparatus 2102/2102' is time-synchronized in the cell. In an aspect, the second set of parameters is received in a handover message, a RMSI message, or an OSI message.

The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 23:
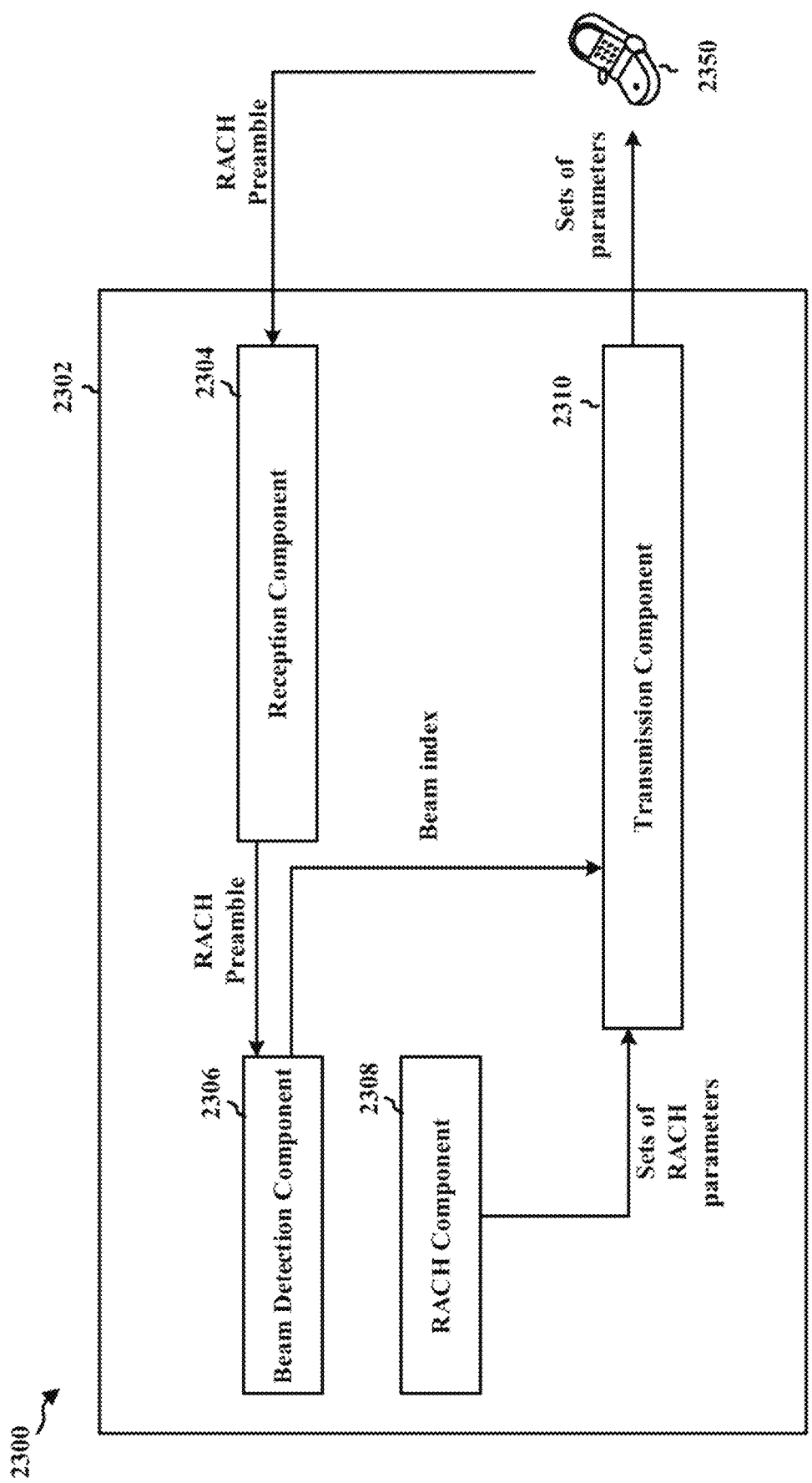
FIG. 23 is a conceptual data flow diagram illustrating the data flow between different means/components in an exemplary apparatus.

FIG. 23 is a conceptual data flow diagram 2300 illustrating the data flow between different means/components in an exemplary apparatus 2302. The apparatus may be a base station. The apparatus 2302 includes a reception component 2304 that may be configured to receive signals from a UE (e.g., the UE 2350). The apparatus 2302 may include a transmission component 2310 configured to transmit signals to a UE (e.g., the UE 2350).

In aspects, the RACH component 2308 may determine a first set of parameters associated with a first RACH procedure, the first set of parameters being associated with beam failure recovery for a first UE in the cell. The RACH component 2308 may provide the first set of parameters to the transmission component 2310, and the transmission component 2310 may send the first set of parameters to the first UE 2350.

In various aspects, the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure.

Further, the RACH component 2308 may determine a second set of parameters associated with a second RACH procedure, the second set of parameters being associated with at least one of initial access, cell selection, cell reselection, loss of timing synchronization or handover. The transmission component 2310 may send the second set of parameters in the cell for use by a second UE. In an aspect, the first UE 2350 is time-synchronized in the cell, and the second UE is time-unsynchronized in the cell. In an aspect, an available number of cyclic shifts for each root sequence in the first set of RACH parameters is greater than that in the second set of parameters. In an aspect, an available number of preambles for each time frequency resource associated with the first set of RACH parameters is greater than that in the second set of parameters.

The reception component 2304 may receive, from the first UE 2350 based on the first set of parameters, a first RACH preamble in a set of RACH resources, the first RACH preamble being associated with the beam failure recovery. The reception component 2304 may provide the first RACH preamble to the beam detection component 2306. The reception component 2304 may receive, from the second UE based on the second set of parameters, a second RACH preamble in the set of RACH resources. The beam detection component 2306 may identify a beam index for communication with the first UE 2350 based on the receiving of first RACH preamble. In an aspect, the second set of parameters is sent in a handover message, a RMSI message, or an OSI message. In an aspect, the first set of parameters is sent in an RRC message.

The apparatus may include additional components that perform each of the blocks of the algorithm in the aforementioned flowcharts of FIG. 19. As such, each block in the aforementioned flowcharts of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 24:
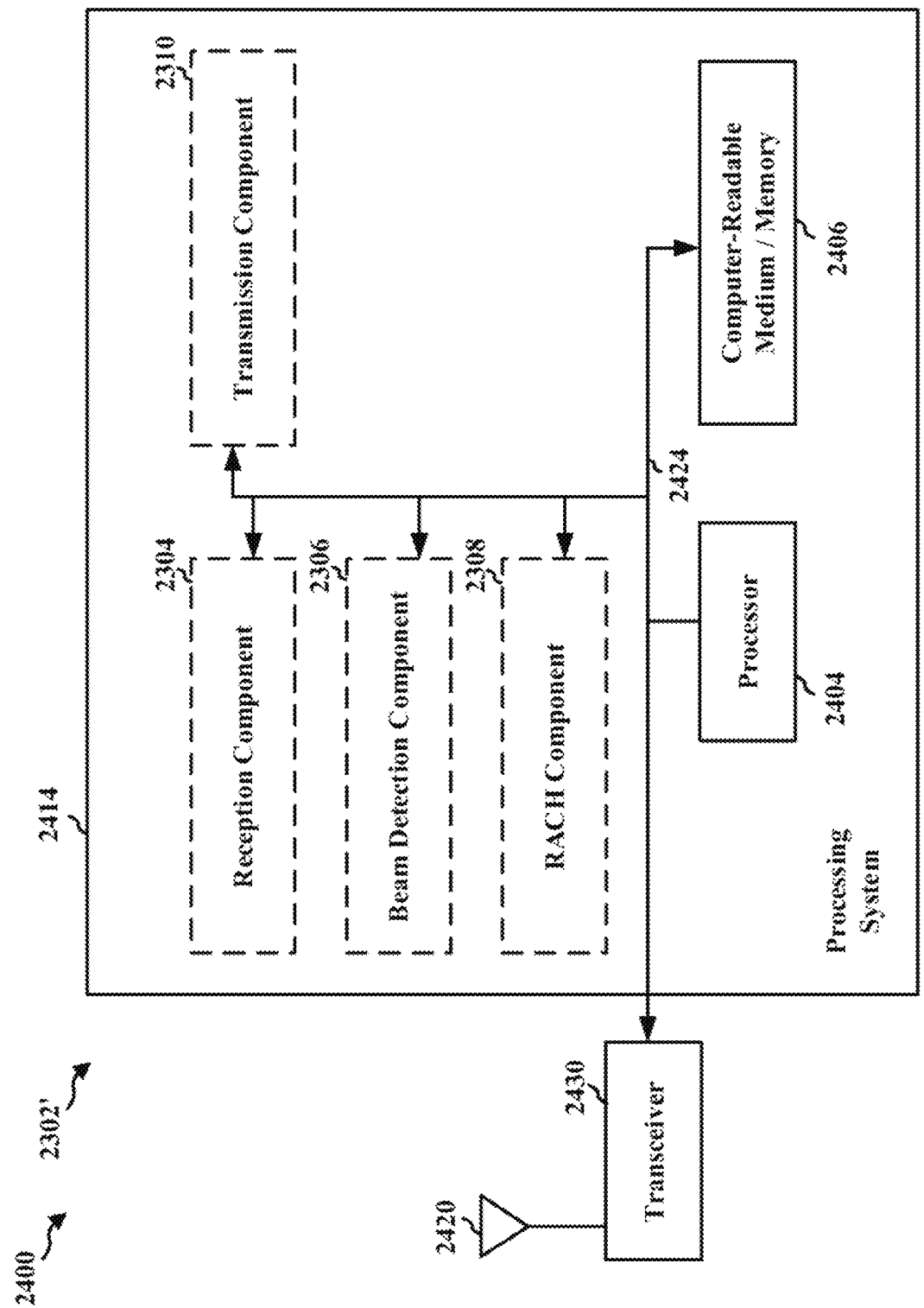
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware components, represented by the processor 2404, the components 2304, 2306, 2308, 2310, and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception component 2304. In addition, the transceiver 2410 receives information from the processing system 2414, specifically the transmission component 2310, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described supra for any particular apparatus. The computer-readable medium/memory 2406 may also be used for storing data that is manipulated by the processor 2404 when executing software. The processing system 2414 further includes at least one of the components 2304, 2306, 2308, 2310. The components may be software components running in the processor 2404, resident/stored in the computer readable medium/memory 2406, one or more hardware components coupled to the processor 2404, or some combination thereof. The processing system 2414 may be a component of the base station 310 and may include the memory 376 and/or at least one of the TX processor 316, the RX processor 370, and the controller/processor 375.

In one configuration, the apparatus 2302/2302' for wireless communication includes means for determining a first set of parameters associated with a first RACH procedure, the first set of parameters being associated with beam failure recovery for a first UE in a cell provided by the apparatus 2302/2302'. The apparatus 2302/2302' may include means for sending the first set of parameters to the first UE.

In an aspect, the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure.

The apparatus 2302/2302' may include means for determining a second set of parameters associated with a second RACH procedure, the second set of parameters being associated with at least one of initial access, cell selection, cell reselection, loss of timing synchronization or handover. The apparatus 2302/2302' may include means for sending the second set of parameters in the cell for use by a second UE. In an aspect, the first UE is time-synchronized in the cell, and the second UE is time-unsynchronized in the cell. In an aspect, an available number of cyclic shifts for each root sequence associated with the first set of RACH parameters is greater than an available number of cyclic shifts for each root sequence associated with the second set of parameters. In an aspect, an available number of preambles for each time frequency resource associated with the first set of RACH parameters is greater than an available number of preambles for each time frequency resource associated with the second set of parameters. The apparatus 2302/2302' may include means for receiving, from the first UE based on the first set of parameters, a first RACH preamble in a set of RACH resources, the first RACH preamble being associated with the beam failure recovery; and means for receiving, from the second UE based on the second set of parameters, a second RACH preamble in the set of RACH resources. The apparatus 2302/2302' may include means for identifying a beam index for communication with the first UE based on the receiving of first RACH preamble. In an aspect, the second set of parameters is sent in a handover message, a RMSI message, or an OSI message. In an aspect, the first set of parameters is sent in a RRC message.

The aforementioned means may be one or more of the aforementioned components of the apparatus 2302 and/or the processing system 2414 of the apparatus 2302' configured to perform the functions recited by the aforementioned means. As described supra, the processing system 2414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station providing a cell, the method comprising:
   determining a first set of parameters associated with a first random access channel (RACH) procedure, the first set of parameters being associated with beam failure recovery using the first RACH procedure for a first user equipment (UE) in the cell, and the first set of parameters including at least two parameters associated with the beam failure recovery using the first RACH procedure that are different from at least two corresponding parameters included in a second set of parameters associated with a second RACH procedure to be used for initial access in the cell that is different from the first RACH procedure; and
   sending at least one of the first set of parameters or the second set of parameters for use by the first UE,
   wherein the at least one of the first set of parameters or the second set of parameters is sent via broadcast, and the other of the first set of parameters or the second set of parameters is to be sent via radio resource control (RRC) signaling.

2. The method of claim 1, wherein the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure.

3. The method of claim 1, further comprising:
   determining the second set of parameters associated with the second RACH procedure, the second set of parameters being associated with at least one of initial access, cell selection, cell reselection, loss of timing synchronization, or handover; and
   sending the second set of parameters in the cell for use by a second UE.

4. The method of claim 1, wherein the first set of parameters are to be used by the first UE when the first UE is time-synchronized in the cell, and second set of parameters are to be used by the first UE when the first UE is time-unsynchronized in the cell.

5. The method of claim 1, wherein an available number of cyclic shifts for each root sequence associated with the first set of parameters is greater than an available number of cyclic shifts for each root sequence associated with the second set of parameters.

6. The method of claim 1, wherein an available number of preambles for each time frequency resource associated with the first set of parameters is greater than an available number of preambles for each time frequency resource associated the second set of parameters.

7. The method of claim 3, further comprising:
   receiving, from the first UE based on the first set of parameters, a first RACH preamble in a set of RACH resources, the first RACH preamble being associated with the beam failure recovery; and
   receiving, from the second UE based on the second set of parameters, a second RACH preamble in the set of RACH resources.

8. The method of claim 7, further comprising:
identifying a beam index for communication with the first UE based on the receiving of first RACH preamble.

9. The method of claim 1, wherein the second set of parameters is sent in a handover message, a remaining minimum system information (RMSI) message, or an other system information (OSI) message.

10. The method of claim 1, wherein the first set of parameters is sent in a radio resource control (RRC) message that excludes the second set of parameters.

11. A method of wireless communication by a user equipment (UE), the method comprising:
receiving, from a base station via radio resource control (RRC) signaling, a first set of parameters associated with beam failure recovery with the base station using a first random access channel (RACH) procedure, the first RACH procedure being associated with the beam failure recovery with the base station;
receiving, from the base station via broadcast, a second set of parameters including at least two parameters associated with initial access different from at least two corresponding parameters associated with the beam failure recovery included in the first set of parameters, the second set of parameters being associated with the initial access using a second RACH procedure, the second RACH procedure being different from the first RACH procedure and being associated with the initial access;
generating a RACH preamble based on the first set of parameters when the UE is to perform the first RACH procedure for the beam failure recovery or based on the second set of parameters when the UE is to perform the second RACH procedure for the initial access; and
sending, to the base station, the generated RACH preamble.

12. The method of claim 11, wherein the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure.

13. The method of claim 11, further comprising:
detecting failure of a serving beam used for communication between the UE and the base station after performing the second RACH procedure; and
selecting the first set of parameters to perform the first RACH procedure instead of the second set of parameters based on the detected failure of the serving beam.

14. The method of claim 11, wherein the sending of the generated RACH preamble indicates at least one of a beam failure request or a second beam index corresponding to a second beam of the base station.

15. The method of claim 11, wherein the first set of parameters is received via a radio resource control (RRC) signaling message that excludes the second set of parameters.

16. The method of claim 11, wherein the UE is time-synchronized in the cell when the RACH preamble is generated based on the first set of parameters for the first RACH procedure.

17. The method of claim 11, wherein the second set of parameters is received in a handover message, a remaining minimum system information (RMSI) message, or an other system information (OSI) message.

18. An apparatus configured to provide a cell, the apparatus comprising:
means for determining a first set of parameters associated with a first random access channel (RACH) procedure, the first set of parameters being associated with beam failure recovery using the first RACH procedure for a first user equipment (UE) in the cell, and the first set of parameters including at least two parameters associated with the beam failure recovery using the first RACH procedure that are different from at least two corresponding parameters included in a second set of parameters associated with a second RACH procedure to be used for initial access in the cell that is different from the first RACH procedure; and
means for sending at least one of the first set of parameters or the second set of parameters for use by the first UE,
wherein the at least one of the first set of parameters or the second set of parameters is sent via broadcast, and the other of the first set of parameters or the second set of parameters is to be sent via radio resource control (RRC) signaling.

19. The apparatus of claim 18, wherein the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure.

20. The apparatus of claim 18, further comprising:
means for determining the second set of parameters associated with the second RACH procedure, the second set of parameters being associated with at least one of initial access, cell selection, cell reselection, loss of timing synchronization or handover; and
means for sending the second set of parameters in the cell for use by a second UE.

21. The apparatus of claim 18, wherein the first set of parameters are to be used by the first UE when the first UE is time-synchronized in the cell, and the second set of parameters are to be used by the first UE when the first UE is time-unsynchronized in the cell.

22. The apparatus of claim 18, wherein an available number of cyclic shifts for each root sequence associated with the first set of RACH parameters is greater than an available number of cyclic shifts for each root sequence associated with the second set of parameters.

23. The apparatus of claim 18, wherein an available number of preambles for each time frequency resource associated with the first set of RACH parameters is greater than an available number of preambles for each time frequency resource associated with the second set of parameters.

24. The apparatus of claim 20, further comprising:
means for receiving, from the first UE based on the first set of parameters, a first RACH preamble in a set of RACH resources, the first RACH preamble being associated with the beam failure recovery; and means for receiving, from the second UE based on the second set of parameters, a second RACH preamble in the set of RACH resources.

25. The apparatus of claim 24, further comprising:
means for identifying a beam index for communication with the first UE based on the receiving of first RACH preamble.

26. The apparatus of claim 18, wherein the second set of parameters is sent in a handover message, a remaining minimum system information (RMSI) message, or an other system information (OSI) message.

27. The apparatus of claim 18, wherein the first set of parameters is sent in a radio resource control (RRC) message that excludes the second set of parameters.

28. An apparatus for wireless communication by a user equipment (UE), the apparatus comprising:
means for receiving, from a base station via radio resource control (RRC) signaling, a first set of parameters associated with beam failure recovery with the base station using a first random access channel (RACH) procedure, the first RACH procedure being associated with the beam failure recovery with the base station;
means for receiving, from the base station via broadcast, a second set of parameters including at least two parameters associated with initial access different from at least two corresponding parameters associated with the beam failure recovery included in the first set of parameters, the second set of parameters being associated with the initial access using a second RACH procedure, the second RACH procedure being different from the first RACH procedure and being associated with the initial access;
means for generating a RACH preamble based on the first set of parameters when the UE is to perform the first RACH procedure for the beam failure recovery or based on the second set of parameters when the UE is to perform the second RACH procedure for the initial access; and
means for sending, to the base station, the generated RACH preamble.

29. The apparatus of claim 28, wherein the first set of parameters indicates at least one of a root sequence index associated with the first RACH procedure, a configuration index associated with the first RACH procedure, a received target power associated with the first RACH procedure, a number of cyclic shifts for each root sequence associated with the first RACH procedure, a number of maximum preamble transmission associated with the first RACH procedure, power ramping step associated with the first RACH procedure, candidate beam threshold for the first RACH procedure and PRACH frequency offset associated with the first RACH procedure.

30. The apparatus of claim 28, further comprising:
means for detecting failure of a serving beam used for communication between the UE and the base station after performing the second RACH procedure; and
means for selecting the first set of parameters to perform the first RACH procedure instead of the second set of parameters based on the detected failure of the serving beam.

* * * * *